(12) United States Patent
Voegele et al.

(10) Patent No.: US 12,448,210 B2
(45) Date of Patent: Oct. 21, 2025

(54) AUTOMATED PALLET PROFILING

(71) Applicant: Lineage Logistics, LLC, Irvine, CA (US)

(72) Inventors: Caitlin Voegele, San Francisco, CA (US); Daniel Thomas Wintz, San Francisco, CA (US); Haig Atikian, Boston, MA (US); Daniël Walet, Oakland, CA (US); Maxwell Micali, Berkeley, CA (US); Chloe Mawer, San Francisco, CA (US); Ben Philipsen, Herentals (BE); Stef Raeymakers, Herentals (BE); Natalie Novitsky, Durham, NC (US); Michael Lingzhi Li, Cambridge, MA (US); Elliott Gerard Wolf, Oakland, CA (US); Gabe Judson, Holland, MI (US); Tim McMahon, Omaha, NE (US); Steve Hansen, Omaha, NE (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 18/634,168

(22) Filed: Apr. 12, 2024

(65) Prior Publication Data
US 2024/0300741 A1   Sep. 12, 2024

Related U.S. Application Data

(63) Continuation of application No. 17/234,776, filed on Apr. 19, 2021, now Pat. No. 12,049,361.

(51) Int. Cl.
*H04N 23/73* (2023.01)
*B65G 1/137* (2006.01)
(Continued)

(52) U.S. Cl.
CPC ......... *B65G 1/1371* (2013.01); *B65G 1/1376* (2013.01); *G06T 7/0006* (2013.01);
(Continued)

(58) Field of Classification Search
CPC .. B65G 1/1371; B65G 1/1376; G06T 7/0006; G06T 2207/20221; H04N 7/181;
(Continued)

(56) References Cited

U.S. PATENT DOCUMENTS

| | | | | |
|---|---|---|---|---|
| 4,563,863 A | * | 1/1986 | Humphrey | B65B 11/045 53/556 |
| 6,496,806 B1 | | 12/2002 | Horwitz et al. | |

(Continued)

FOREIGN PATENT DOCUMENTS

| | | |
|---|---|---|
| CN | 109154825 A | 1/2019 |
| CN | 111278750 A | 6/2020 |

(Continued)

OTHER PUBLICATIONS

Cloud9Perception.com [online], "Machine Vision Systems—Perception hardware & software," available on or before Sep. 25, 2019, via Internet Archive: Wayback Machine URL<https://web.archive.org/web/20190925155457/https:/cloud9perception.com/>, retrieved on May 13, 2020, URL<https://cloud9perception.com/>, 4 pages.

(Continued)

*Primary Examiner* — Patrick H MacKey
(74) *Attorney, Agent, or Firm* — Barnes & Thornburg LLP

(57) ABSTRACT

Systems and methods for profiling a pallet in a warehouse can include a turntable that rotates the pallet, conveyor belts that move the pallet, and a vertical profiling structure, having cameras mounted at different locations, in a stationary position proximate to a side of the turntable. A photo (Continued)

booth can also be used to provide uniform lighting. A computing system can instruct a conveyor belt to automatically route the pallet onto the turntable, instruct the cameras to capture image data of the pallet as it rotates on the turntable, receive the image data, and retrieve image-based models of the pallet that were trained using images of pallets having unique identifiers. The computing system can determine, based on applying the image-based models to the image data, whether the pallet's unique identifier is identifiable, and transmit, to a warehouse management system, a notification indicating whether the unique identifier is identifiable.

20 Claims, 21 Drawing Sheets

(51) Int. Cl.
  *G06T 7/00* (2017.01)
  *H04N 7/18* (2006.01)
(52) U.S. Cl.
  CPC ............. *H04N 7/181* (2013.01); *H04N 23/73* (2023.01); *G06T 2207/20221* (2013.01)
(58) Field of Classification Search
  CPC ...... H04N 23/73; G06V 10/141; G06V 10/12; G06V 10/143; G06V 10/147; G06V 10/16; G06V 20/64; G06V 30/10; G05B 19/4189
  See application file for complete search history.

(56) References Cited

U.S. PATENT DOCUMENTS

| | | | |
|---|---|---|---|
| 9,826,213 | B1 | 11/2017 | Russell |
| 10,491,881 | B1 | 11/2019 | Russell et al. |
| 10,598,574 | B2 | 3/2020 | Von Drasek et al. |
| 10,616,553 | B1 | 4/2020 | Russell et al. |
| 10,643,038 | B1 | 5/2020 | McCalib, Jr. et al. |
| 10,984,378 | B1* | 4/2021 | Eckman ........... G06K 19/06131 |
| 11,111,077 | B2* | 9/2021 | Kim ..................... B65G 1/1373 |
| 11,120,267 | B1 | 9/2021 | Pellegrino et al. |
| 11,893,786 | B1 | 2/2024 | Preiswerk et al. |
| 2002/0130778 | A1 | 9/2002 | Nicholson |
| 2004/0150815 | A1* | 8/2004 | Sones ................ G01N 21/9054 356/239.4 |
| 2006/0287759 | A1 | 12/2006 | Charych |
| 2009/0169353 | A1* | 7/2009 | Townsend ............. B23P 19/041 414/222.11 |
| 2012/0057022 | A1 | 3/2012 | Nechiporenko et al. |
| 2017/0091957 | A1 | 3/2017 | Driegen et al. |
| 2017/0301004 | A1 | 10/2017 | Chirnomas |
| 2018/0245316 | A1 | 8/2018 | Forcash |
| 2018/0327196 | A1 | 11/2018 | Sullivan |
| 2018/0370046 | A1 | 12/2018 | Hance |
| 2018/0370727 | A1 | 12/2018 | Hance |
| 2019/0016543 | A1 | 1/2019 | Turpin |
| 2019/0152634 | A1 | 5/2019 | Almogy |
| 2019/0361125 | A1 | 11/2019 | Sorensen |
| 2020/0273131 | A1 | 8/2020 | Martin, Jr. et al. |
| 2021/0326544 | A1 | 10/2021 | Jackson et al. |
| 2022/0219846 | A1* | 7/2022 | Jackson ................. G06V 20/52 |
| 2022/0258987 | A1 | 8/2022 | Simon et al. |
| 2022/0332504 | A1 | 10/2022 | Voegele et al. |
| 2022/0375243 | A1 | 11/2022 | Li et al. |
| 2023/0059103 | A1 | 2/2023 | Jackson et al. |

FOREIGN PATENT DOCUMENTS

| | | |
|---|---|---|
| JP | 2021039002 A * | 3/2021 |
| KR | 20100108776 A | 10/2010 |

OTHER PUBLICATIONS

GitHub.com [online], "YOLO: Real Time Object Detection", Nov. 2019, retrieved on May 13, 2020, 2020, retrieved from URL<https://github.com/pjreddie/darknet/wiki/YOLO:-Real-Time-Object-Detection, 13 pages.
International Search Report and Written Opinion in International Appln. No. PCT/US2022/025298, mailed on Jul. 21, 2022, 16 pages.
Pal, "16 OpenCV Functions to Start your Computer Vision journey (with Python code)", Analytics Vidhya, Mar. 25, 2019, 40 pages.
PointCloudLibrary.io [online], "Point Cloud Library", retrieven on May 13, 2020, retrieved from URL<https://pointcloudlibrary.github.io/>, 3 pages.
Robotics.org [online], "Voxel Perception Module," Oct. 2017, retrieved on May 13, 2020, retrieved fromURL<https://www.robotics.org/product-catalog-detail.cfm/Cloud-9-Perception-LP/Voxel-Perception-Module/productid/4810>, 2 pages.
Universal-Robots.com [online], "Universal Robots UR5," available on or before Feb. 23, 2018, via Internet Archive: Wayback Machine URL<https://web.archive.org/web/20180223235559/https:/www.universal-robots.com/products/ur5-robot/>, retrieved on May 13, 2020, URL<https://www.universal-robots.com/products/ur5-robot/>, 7 pages.
Universal-Robots.com.com [online], "Technical details,", available on or before May 13, 2020, via Internet Archive: Wayback MachineURL<https://web.archive.org/web/20190117030009/https:/www.universal-robots.com/media/1801303/eng_199901_ur5_tech_spec_web_a4.pdf>, retrieved on May 13, 2020, URL<https:/www.universal-robots.com/media/1801303/eng_199901_ur5_tech_spec_web_a4.pdf>, 2 pages.
Wikipedia.org[online], "Convolutional Neural Network", retrieved on May 13, 2020, retrieved fromURL<https://en.wikipedia.org/wiki/Convolutional_neural_network>, 35 pages.
Wikipedia.org[online], "TensorFlow", retrieved on May 13, 2020, retrieved from URL<https://en.wikipedia.org/wiki/TensorFlow>, 8 pages.

* cited by examiner

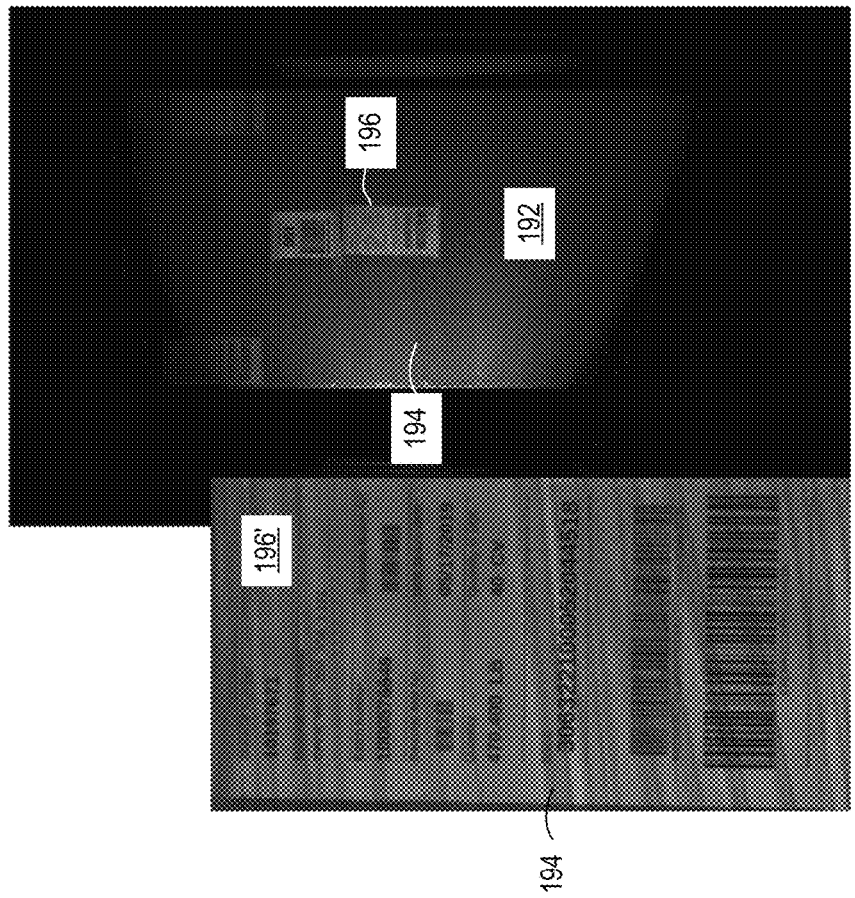
FIG. 1C

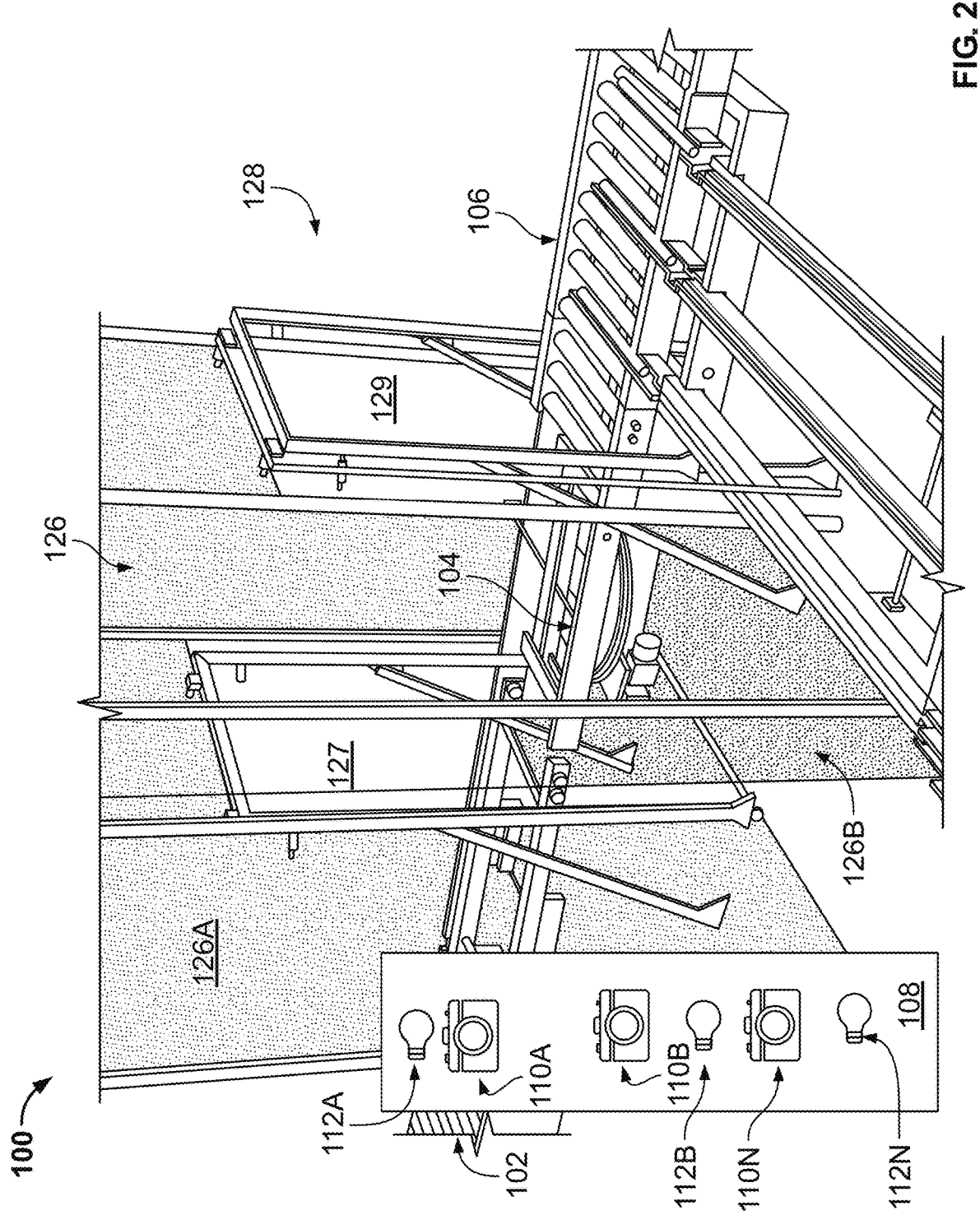

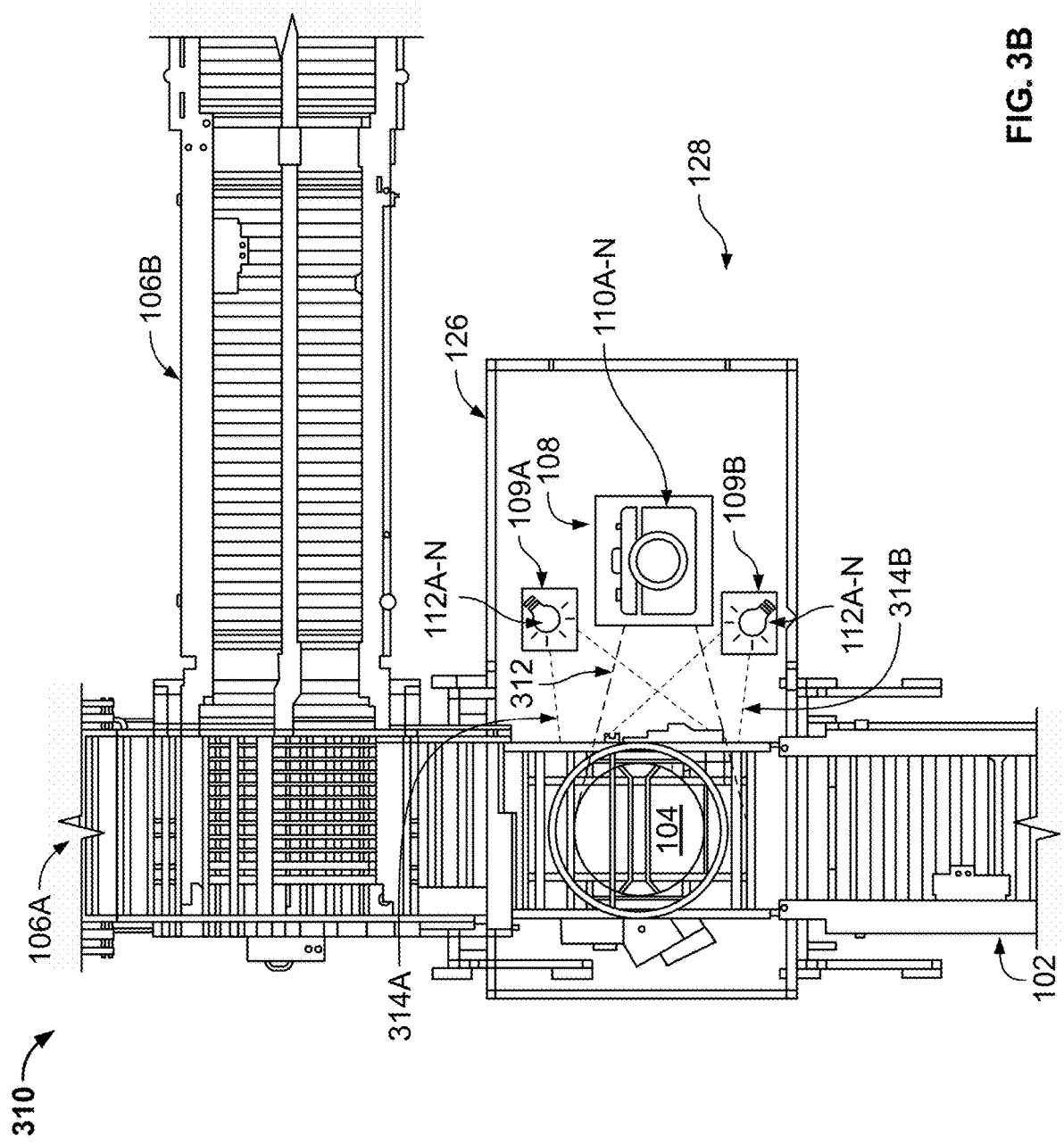

AUTOMATED PALLET PROFILING

CROSS-REFERENCE TO RELATED APPLICATIONS

This application is a continuation of U.S. patent application Ser. No. 17/234,776, filed Apr. 19, 2021, which is incorporated in its entirety herein.

TECHNICAL FIELD

This document describes automatically profiling items, such as pallets as they are received at a warehouse environment or other storage facility.

BACKGROUND

A warehouse or similar storage facility can receive thousands of items a day for storage. Such items can include pallets, crates, bins, or other objects that can be stored in the warehouse. Items entering the warehouse may have unique information that can impact where the items are stored, for how long the items are stored, etc. The items can also have unique identification information that can be used throughout a supply chain.

Items can be stored in the warehouse for short or temporary periods of time. Items can also be stored in the warehouse for longer periods of time. Items can be stored in different warehouse locations depending on characteristics of the items. For example, a storage location can be chosen for an item based on the storage location being able to accommodate a height, weight, and/or size of the item. As another example, a storage location can be designated for all items of a particular customer. As yet another example, a storage location can be chosen for an item that has a temperature storage requirement (e.g., the item needs to be in cold storage).

Storage and other item characteristics can be identified for each item in a variety of ways. For example, the storage characteristics can be received from a previous supply chain user, such as a vendor who delivers the storage items to the warehouse for storage. Sometimes, this information can include human-made errors. Sometimes, this information can be inaccurate once the items arrive at the warehouse, since unexpected events can occur while the items are in transit. A pallet, for example, can arrive at the warehouse damaged, leaning, and/or missing containers or other contents. Information about the pallet that was determined by a vendor before shipment to the warehouse can therefore be inaccurate. The inaccurate information can be used to find a storage location that is less efficient or optimal. Moreover, reliance on the inaccurate information can result in damage going unseen, which can negatively impact the supply chain and customer satisfaction. Changes to the item during shipment or delivery (e.g., dents, a broken pallet, a missing box, etc.) may not be accounted for once the item is in the warehouse and ready to be moved to a storage location. The item may or may not be inspected again once entering the warehouse.

As another example, storage or other item characteristics can be determined by a warehouse worker. The warehouse worker can inspect an item as it enters the warehouse and manually input information about the item into a computing system, such as a warehouse management system. The warehouse worker can also use a handheld scanner, camera(s), or similar device to inspect the item and gather information about the item's storage characteristics. Human inspection can cause a delay in warehouse efficiency and in moving incoming items for storage. The warehouse worker may err in inspecting and/or recording information about the item. Some characteristics may not be readily noticeable to the human eye. The warehouse worker can also be working quickly to be able to inspect a queue of items, so the warehouse worker may not see or record item and storage characteristics. Moreover, the warehouse worker can enter incorrect values into the computing system if rushing to inspect all the items in the queue within a given time period.

Item characteristics can also be identified by cameras or other scanning devices that are positioned throughout the warehouse. For example, as an item moves in the warehouse, cameras can capture images of the item and send those images to a computing system for processing. The cameras may not capture clear images of the item and/or may not capture all sides/angles of the item. The computing system may not be able to adequately identify storage and other item characteristics for that item, which can result in warehouse inefficiencies.

SUMMARY

This document generally describes systems, methods, apparatus, devices, and techniques for profiling items, such as pallets in a warehouse. The disclosed technology can include a combination of warehouse components and scanning devices configured to capture image data of a pallet from multiple angles. For example, the disclosed technology can include on and off conveyor belts, a rotating turntable, and a vertical pole having one or more stationary cameras. The vertical pole can be positioned a threshold distance away from the rotating turntable so as to permit a sufficient field of view for each camera to capture images of the pallet (i.e., image capturing entire width of pallet). The vertical pole can remain stationary, such that the one or more cameras configured thereto capture images of the pallet from a same distance, angle, and field of view (FOV). A photo booth or similar light-neutralizing structure can be positioned around the rotating turntable to provide consistent and uniform lighting for capturing images of pallets regardless of the lighting conditions in the ambient environment (i.e., dock area in warehouse). One or more lights (e.g., red lights, strobe lights) can be positioned inside the photo booth and/or to the vertical pole to illuminate the rotating turntable and pallet thereon, and particular lighting configurations (e.g., wavelength of emitted light from light source, polarized filter, strobe duration, light intensity) and/or camera configurations (e.g., shutter speed, polarized lens filter) can be used to achieve consistent and reliable images in spite of highly variable pallet conditions (e.g., frost, layers of transparent and semi-transparent plastic wrap). For example, the lighting can be offset and angled from the vantage point of the cameras (e.g., approximately 45 degree offset) to reduce glare in captured images. The photo booth and lighting can provide for brighter, clearer images of the pallet to be captured by the cameras.

A computing system can control operation of components of the disclosed technology that are used to profile the pallet (e.g., the cameras, the turntable, the on and off conveyor belts, the lights, etc.). For example, a pallet can be loaded onto the on conveyor belt (e.g., upon first entering the warehouse). The pallet can be automatically aligned as it moves down the on conveyor belt, and can then be automatically moved onto the turntable. The computing system can control the turntable to center the pallet thereon, which can permit images of the pallet to be captured from a same/similar distance from around the pallet as the pallet is rotated on the turntable. The turntable can rotate at a predetermined speed, and can include pauses at various angles of rotation (e.g., pause every 15, 30, 45, 60, or 90 degree rotation) to capture images of the pallet at those orientations relative to the cameras. Alternatively and/or additionally, the pallet may be continuously rotated and images can be captured at various orientations, without pausing the turntable's rotation. The computing system can receive image data from cameras and, using image analysis techniques and/or machine learning models, identify information about the pallet. For example, the computing system can identify one or more labels or other unique identifiers associated with the pallet and/or its component parts (i.e., cases on pallet). In another example, the computing system can determine the dimensions of the pallet (e.g., height, width, depth), types of items included in the pallet, quantities of those items, information on those specific items (e.g., date, origin, expiration), and/or other details.

The computing system can use the determined pallet information to direct subsequent treatment of the pallet, such as for inbound pallets into a warehouse to identify a specific storage location in the warehouse for the pallet. For example, the specific storage location that is identified and used for storage of a pallet can depend on the types of items contained in the pallet, specific environmental requirements for those items (e.g., temperature, humidity), and, for perishable goods, information indicating an age/expiration for the goods. In instances where some or all of those details may not be able to be discerned by the computer system with at least a threshold confidence level, the computer system can direct the pallet to a temporary storage location within a warehouse pending manual profiling of the pallet, which can be performed by a remote user via the images and other information captured of the pallet. For example, for pallets that are not able to be automatically identified, such as in the instance where there are significant visual impediments to identifying the contents of the pallet (i.e., frost, several layers of plastic wrap), the pallets can be directed to temporary storage and can be added to a queue for manual review. A manual reviewer can then use a computing device to review the images and other details captured of the pallet, and can identify the pallet and its contents, which the computing system can use to redirect the pallet into a specific, organized storage location, such as a long-term storage area.

In some implementations, instead of sending the pallet to a temporary storage location, additional images of the pallet can be captured (e.g., rotating the turntable again and taking images at different orientations) and analyzed. The cameras can capture images of the pallet, which can be processed by the computing system to identify the pallet label. If the label is unidentifiable, the pallet can be routed to the off conveyor belt for temporary storage. If the label is identified, the pallet can be routed to the off conveyor belt for organized storage.

The image data associated with the pallet can be stored for later processing. The image data can also be processed in real-time. This additional processing can be performed to determine pallet information. Some information can include but is not limited to damage, lean, box count, number of layers, contents, and pallet sizing (e.g., height, weight, overall dimensions). Pallet information identified by the computing system can be compared to pallet information that was manually inputted into a warehouse management system (WMS) and/or warehouse control system (WCS) by a warehouse worker or otherwise stored by the WMS/WCS. Comparing the pallet information can be advantageous to determine an accuracy of the information identified by the computing system.

One implementation can include a system for profiling a pallet in a warehouse. The system can include a turntable that can rotate the pallet, and first and second conveyor belts for moving the pallet in the warehouse. The first conveyor belt can automatically route the pallet onto the turntable from an initial location in the warehouse and the second conveyor belt can automatically route the pallet off of the turntable to a destination location in the warehouse. The system can also include a vertical profiling structure in a stationary position proximate to a side of the turntable, the vertical profiling structure having a plurality of cameras mounted at a plurality of different locations along the vertical profiling structure. The plurality of cameras can capture images of the pallet as the pallet rotates on the turntable, the images providing multiple different views of the pallet from a plurality of different vantage points provided by the cameras being mounted to the vertical profiling structure at the plurality of different locations. The system can also include a computing system that can profile the pallet and control operation of the turntable, the first and second conveyor belts, and the plurality of cameras. The computing system can instruct the first conveyor belt to automatically route the pallet onto the turntable, instruct the plurality of cameras to capture image data of the pallet on the turntable as the turntable rotates until a rotation cycle is complete, receive, from the plurality of cameras, the captured image data of the pallet, and retrieve, from a data store, image-based models of the pallet. The image-based models can be trained using images of pallets having unique identifiers. The computing system can also determine, based on applying the image-based models of the pallet to the captured image data of the pallet, whether a unique identifier on the pallet is identifiable, and transmit, to a warehouse management system, a notification indicating whether the unique identifier on the pallet is identifiable or unidentifiable. The notification can cause the warehouse management system to route the pallet into different storage locations based on identification of the unique identifier.

Such an implementation can optionally include one or more of the following features. For example, the plurality of cameras can be arranged along a same vertical plane with each having a substantially horizontal angle. As another example, the vertical profiling structure can be a pole, the vertical profiling structure can be laterally spaced apart from the first conveyor belt, the second conveyor belt, and the turntable such that the vertical profiling structure does not hang over any of the first conveyor belt, the second conveyor belt, and the turntable, and the vertical profiling structure can be positioned a working distance between 1.7 meters and 1.9 meters from the turntable. In some implementations, vertical profiling structure can include at least one light source vertically aligned with and offset from each of the plurality of cameras. The at least one light source can be a red light. One or more of the plurality of cameras can include at least one of a polarizer, a red light filter, and a bandpass filter. In some implementations, the vertical profiling structure can include a light source mounted at a top of the vertical profiling structure and angled downwards to illuminate a top surface of the pallet as the pallet rotates on the turntable.

As another example, the system can also include a photo booth that can enclose an area that includes the turntable and the vertical profiling structure. The photo booth can include (i) sides and a top that can prevent ambient light from entering the enclosed area and (ii) a light source to cast light on the pallet as the pallet rotates on the turntable. The light source can be laterally offset from the vertical profiling structure and angled relative to the turntable such that the light source reflects light to the plurality of cameras at an acute angle off of a top surface of the pallet. The light source can emit a certain intensity and duration of light that correlates with a predetermined shutter speed of the plurality of cameras. In some implementations, the photo booth can include a bar positioned along a top surface of the photo booth that is aligned in a direction of the first conveyor belt. The bar can include a light source and a camera. The light source can cast light on a top surface of the pallet as the pallet rotates on the turntable. The camera can capture images of the top surface of the pallet. In some implementations, the photo booth can be made of a dark fabric that can prevent ambient light from entering the enclosed area.

In some implementations, the photo booth can also include (i) a first opening in a first side of the photo booth through which the pallet can be received from the first conveyor belt onto the turntable and (ii) a second opening in a second side of the photo booth opposite the first side through which the pallet can be moved from the turntable to the second conveyor belt. In some implementations, the system can also include at least one light source attached to a vertical lighting structure, where the vertical lighting structure can be positioned within the enclosed area. The vertical lighting structure can be offset from the vertical profiling structure.

As another example, the system can include an overhead camera configured to capture images of a top surface of the pallet as the pallet rotates on the turntable. In some implementations, the system can include one or more cameras mounted near a top portion of the vertical profiling structure and angled downwards to capture images of the top surface of the pallet. In some implementations, one or more of the plurality of cameras can be mounted along a middle portion of the vertical profiling structure and parallel with a surface of the turntable to capture images of side surfaces of the pallet as the pallet rotates on the turntable. One or more of the plurality of cameras can also be mounted along a bottom portion of the vertical profiling structure and angled upwards to capture images of a bottom surface of the pallet as the pallet rotates on the turntable.

As another example, the computing system can also stitch together one or more image data of sides, top, and bottom surfaces of the pallet, and determine, based on applying the image-based models to the stitched together image data, a height of the pallet, damage to the pallet, lean of the pallet, contents of the pallet, number of rows on the pallet, and quantity of items on the pallet. As yet another example, the computer system can also center the pallet at a midpoint of the turntable, and instruct the turntable to rotate in a first direction at a constant predetermined speed. In some implementations, the predetermined speed can be based on a size of the pallet, a quantity of the cameras on the vertical profiling structure, and one or more angles of the cameras.

As another example, the computing system can generate, based on determining that the unique identifier on the pallet is not identifiable, a placeholder label for the pallet, generate a pallet profile for the pallet based using the placeholder label as an identifier for the pallet, and transmit, to an automated warehouse device, a notification with the placeholder label. The notification can cause the automated warehouse device to print the placeholder label and apply the printed placeholder label to a designated surface of the pallet.

As yet another example, the computing system can instruct, while determining whether the unique identifier on the pallet is identifiable, the first conveyor belt to automatically route a second pallet onto the turntable, instruct the plurality of cameras to capture image data of the second pallet on the turntable as the turntable rotates, receive, from the plurality of cameras, the captured image data of the second pallet, and determine, based on applying image-based models of the second pallet to the captured image data of the second pallet, whether a unique identifier on the second pallet is identifiable.

As another example, the computing system can also flag, based on determining that the unique identifier on the pallet is not identifiable, the pallet as unidentifiable. The computing system can also flag, based on determining that the unique identifier on the pallet is identifiable, the pallet as identifiable. As another example, the destination location can be at least one of an organized storage location and a temporary storage location in the warehouse. The computing system can determine the organized store location for the pallet based at least in part on an owner, item, and code data associated with the pallet. In some implementations, the unique identifier can include a barcode, label, product identifier, QR code, and SKU. In some implementations, the plurality of cameras can include three cameras. In some implementations, the plurality of cameras can be instructed to capture image data of the pallet once every time the pallet is rotated 30 degrees on the turntable. In some implementations, the plurality of cameras can be instructed to capture image data of the pallet once every time the pallet is rotated 90 degrees on the turntable. In some implementations, the plurality of cameras can be instructed to capture image data of the pallet once the pallet is rotated a first time by 30 degrees and then once every subsequent time that the pallet is rotated 90 degrees on the turntable. In some implementations, the computing system can also identify, based on applying the image-based models to the captured image data of the pallet, information about the pallet, access from the data store pre-identified information about the pallet, compare the identified information to the pre-identified information about the pallet, determine a match between the identified information and the pre-identified information about the pallet, and update a pallet profile associated with the pallet with the identified information based on determining a match between the identified and the pre-identified information.

Particular embodiments described herein can also include computer-implemented methods for profiling a pallet. The method can include instructing, by a computing system, a first conveyor belt to automatically route a pallet onto a turntable, and instructing, by the computing system, a plurality of cameras to capture image data of the pallet on the turntable as the turntable rotates until a rotation cycle is complete. The plurality of cameras can be mounted at a plurality of different locations along a vertical profiling structure that is in a stationary position proximate to a side of the turntable. The method can also include receiving, by the computing system and from the plurality of cameras, the captured image data of the pallet, the image data providing multiple different views of the pallet from a plurality of different vantage points provided by the camera being mounted to the vertical profiling structure at the plurality of different locations. The method can include retrieving, by the computing system and from a data store, image-based models of the pallet that can be trained using images of pallets having unique identifiers, determining, by the computing system and based on applying the image-based models of the pallet to the captured image data of the pallet, whether a unique identifier on the pallet is identifiable, and transmitting, by the computing system and to a warehouse management system, a notification indicating whether the unique identifier on the pallet is identifiable or unidentifiable. The notification can cause the warehouse management system to route the pallet into different storage locations based on identification of the unique identifier.

In some implementations, the method can include one or more following features. For example, the method can further include stitching together, by the computing system, one or more image data of sides, top, and bottom surfaces of the pallet, and determining, by the computing system and based on applying the image-based models to the stitched together image data, a height of the pallet, damage to the pallet, lean of the pallet, contents of the pallet, number of rows on the pallet, and quantity of items on the pallet. The method can also include centering, by the computing system, the pallet at a midpoint of the turntable, and instructing, by the computing system, the turntable to rotate in a first direction at a constant predetermined speed.

In some implementations, the vertical profiling structure can be a pole, the vertical profiling structure can be laterally spaced apart from the first conveyor belt and the turntable such that the vertical profiling structure does not hang over either the first conveyor belt or the turntable, and the vertical profiling structure can be positioned a working distance between 1.7 meters and 1.9 meters from the turntable.

As another example, the method can also include configuring, by the computing system, a light source to emit a certain intensity and duration of light that correlates with a predetermined shutter speed of the plurality of cameras. The light source can be included in a photo booth that can enclose an area that includes the turntable and the vertical profiling structure. The photo booth can include (i) sides and a top that prevent ambient light from entering the enclosed area and (ii) the light source that casts light on the pallet as the pallet rotates on the turntable.

In some implementations, the method can also include generating, by the computing system and based on determining that the unique identifier on the pallet is not identifiable, a placeholder label for the pallet, generating, by the computing system, a pallet profile for the pallet using the placeholder label as an identifier for the pallet, and transmitting, by the computing system and to an automated warehouse device, a notification with the placeholder label. The notification can cause the automated warehouse device to print the placeholder label and apply the printed placeholder label to a designated surface of the pallet.

One or more advantages can be realized from the disclosed technology. For example, a combination of a rotating turntable and stationary cameras attached to a vertical pole proximate to the turntable provides for continuous capturing of images from a uniform working distance. The vertical pole can be stationed at a particular working distance from the rotating turntable, and the cameras can be arranged at particular angles with particular FOVs. The pallet can be centered on the turntable and rotated at a constant speed. Rotating the pallet in a central location with stationary cameras, instead of rotating cameras around the pallet, can provide for more uniform images to be captured. Images can be uniformly captured from the same distance, FOV, and angles, which can make stitching together the images both easier, more efficient, and more accurate. Images can also be captured of every side of the pallet, thereby providing a more complete view of the pallet for profiling via image analysis techniques.

Furthermore, these images can provide for more comprehensive image processing. Since images can be captured of every side of the pallet, labels, text, damage, missing contents, lean, and other characteristics can be more easily identified using image processing techniques. A warehouse worker may oversee a portion of any side of the pallet when performing a manual inspection, thereby missing information that can be critical for profiling and storing the pallet. For example, the warehouse worker may not be able to get under the pallet to inspect a wood frame for damage. As a result, the pallet can be improperly stored and the damage may not be fixed. This can cause inefficiencies in the warehouse as well as increase costs throughout the supply chain.

Pallet information can also be identified more accurately and efficiently with the automated disclosed technology. Manual human inspections of every pallet that enters the warehouse can be time-consuming, inefficient, and can result in error when identifying pallet characteristics. The disclosed technology can provide for automatically profiling each pallet as it enters the warehouse and identifying at least a label associated with the pallet. Once the label is identified, the pallet can be routed for organized storage in the warehouse. Additional pallet information and characteristics can be identified from image data of the pallet at a later time (e.g., as the pallet is being routed to an organized storage location). If, at a bare minimum, the label cannot be identified from the image data, then the pallet can be routed to a temporary storage location where a warehouse worker can manually inspect the pallet and/or analyze the image data. The warehouse worker, therefore, may only inspect pallets whose labels were not identified by the disclosed technology. The warehouse worker can have a smaller working queue than if the warehouse worker had to manually inspect every pallet that enters the warehouse. The warehouse worker can therefore spend an appropriate amount of time manually inspecting the pallet, identifying the label, and determining where the pallet can be stored in the warehouse.

The disclosed technology can also be less expensive to implement in a warehouse environment or other storage facility in comparison to existing profiling systems. The vertical pole described herein can include few cameras. The pole can be positioned anywhere in the warehouse and easily moved around the warehouse. In some implementations, the pole can include one to three cameras. These cameras can be easily serviceable and maintained since they are in one location. Standalone cameras may not need to be purchased and positioned throughout the warehouse and/or affixed to components of the warehouse to perform the techniques, methods, and processes described herein. Existing profiling systems can use many cameras positioned throughout the warehouse. These cameras may not adequately capture every angle and side of the pallet as the pallet moves throughout the warehouse, thereby causing inefficiencies in the warehouse and poor pallet profiling results. Moreover, setting up, maintaining, and/or fixing cameras that are positioned throughout the warehouse can be timely and costly. The disclosed technology, on the other hand, can provide for a space-efficient, centrally located profiling system, the vertical pole. Setting up the vertical pole with the cameras can be quick and efficient. Maintenance can also be performed quickly and easily. Finally, the central location of the cameras at the vertical pole can take up less floor space in the warehouse, which can optimize space efficiency in the warehouse.

As another example, the disclosed technology can provide for offsetting lights from the cameras at the vertical pole to reduce glare. As a result, clearer images can be captured. One or more red lights can also be used to eliminate wavelengths of light other than red. By eliminating those wavelengths, image analysis techniques can be more accurately performed. The clearer the images, the easier, faster, and more accurately the computing system can identify a label in the images and other pallet characteristics. Similarly, the disclosed technology can provide for using positioning a photo booth around the rotating turntable to provide uniform lighting. The photo booth can help reduce or otherwise eliminate ambient lighting, which can be advantageous to capture clearer images of the pallet with minimal to no glare. As mentioned above, the clearer the images, the more accurate and quickly the computing system can identify the label of the pallet and route the pallet for storage.

As another example, the disclosed technology can provide for maximizing throughput. Image processing and analysis can be performed at staggered time intervals. At a minimum, a determination of whether a pallet's label is identifiable can be performed and completed by or before a first time objective. If there is still time remaining, additional processing and analysis can be performed to identify additional information about the pallet. Otherwise, the pallet can be routed to some storage location in the warehouse as another pallet is ingested and profiled. Thus, the disclosed technology can provide for quickly identifying at least the label of the pallet and for moving ingested pallets along through the profiling process and into storage. In so doing, warehouse efficiency may not be compromised by the profiling of pallets as described herein.

Moreover, the disclosed technology can provide for improving overall warehouse efficiency and optimizing on warehouse space. As mentioned, the cameras can be positioned on a singular vertical pole that can take up little space in a footprint of the warehouse. The vertical pole can be easily moved around the warehouse for scanning in different locations. Thus, warehouse space can be optimized. The singular vertical pole with cameras can also provide for more accurate images to be captured of incoming pallets. The more accurate images that are captured, the more accurate and efficient profiling of such pallets by the computing system. When the pallets are accurately and quickly profiled, they can be routed for storage in the warehouse without causing delay or holdups in a queue of incoming pallets and also throughout an entire supply chain. Consequently, overall warehouse efficiency can be improved.

The details of one or more embodiments are set forth in the accompanying drawings and the description below. Other features and advantages will be apparent from the description and drawings, and from the claims.

BRIEF DESCRIPTION OF DRAWINGS

FIG. 1C depicts example product identifiers that are identified on cases under different lighting conditions.

FIG. 2 depicts a perspective view of a photo booth of the system for profiling items in the warehouse environment.

FIG. 3B is a top view of another example configuration of a system for profiling items in the warehouse environment.

DETAILED DESCRIPTION

Figure 1A:
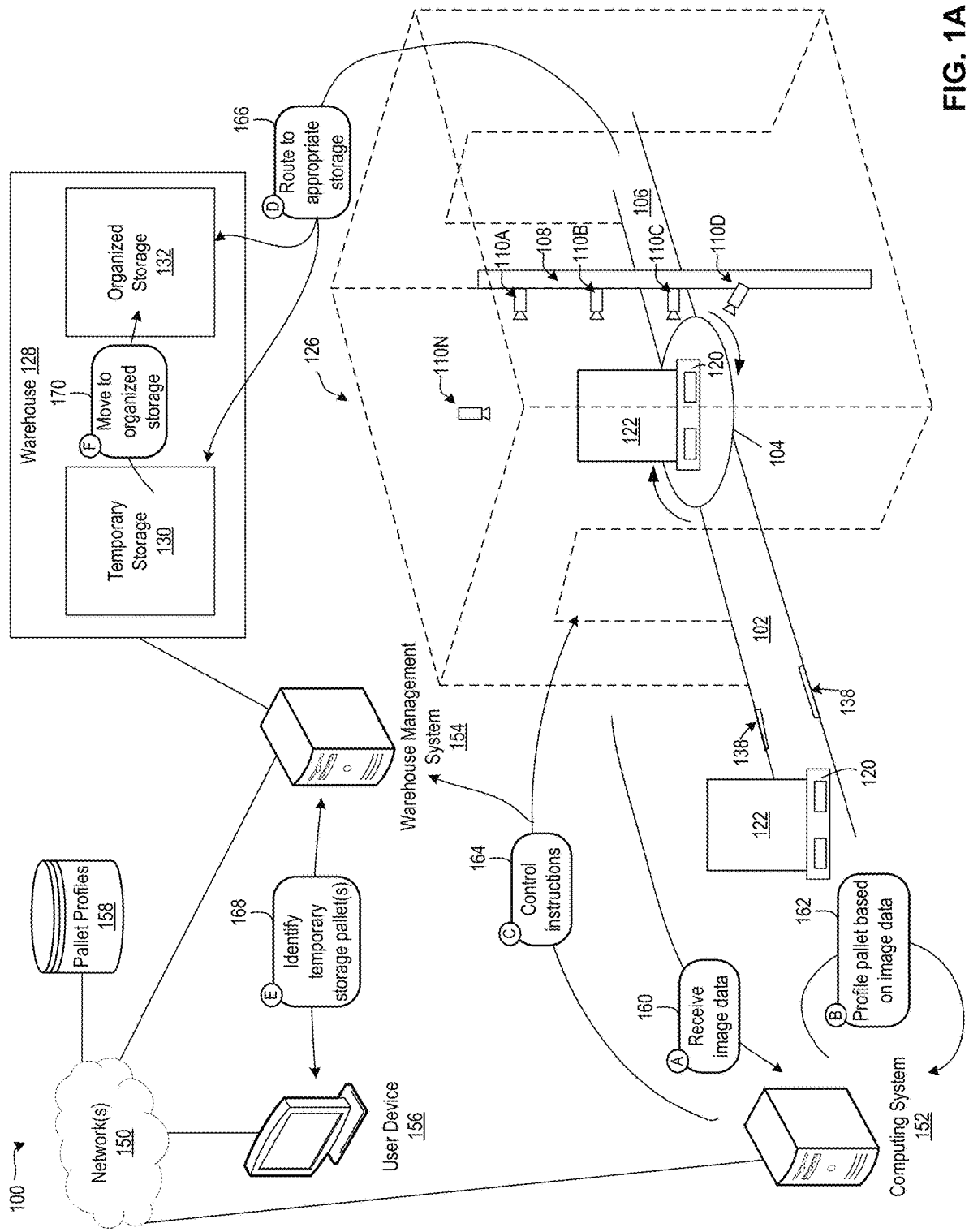
FIG. 1A is a conceptual diagram of a system for profiling items in a warehouse environment.

This document describes systems, methods, and techniques for profiling items such as pallets as they enter a warehouse environment. The disclosed technology can provide a combination of a vertical pole having stationary cameras and a rotating turntable to provide for continuous and uniform image capturing of inbound pallets. The vertical pole can take up minimal space in the warehouse and can be moved around to desired locations in the warehouse. Lights, such as and/or including red lights, can be offset from the stationary cameras and provide uniform lighting, which can result in clearer images without glare. The captured images can be received and processed by a computing system to identify a unique identifier, such as a label, of a pallet in the images. Once the label is identified, the computing system can route the pallet for storage in the warehouse environment. If the label cannot be identified, the computing system can route the pallet to temporary storage and add the captured images to a queue for a warehouse worker's review and inspection. The processes, methods, and techniques described herein can be repeated for each inbound pallet.

Referring to the figures, FIG. 1 is a conceptual diagram of a system 100 for profiling items in a warehouse environment 128. The warehouse environment 128 can be any type of storage facility or other environment for moving, routing, and/or storing items for different lengths of time. Example warehouse environments include cold storage facilities, distribution centers, and general warehouses. The system 100 includes an on conveyor belt 102, an off conveyor belt 106, a turntable 104, a vertical pole 108 (e.g., profiling structure), and a photo booth 126. The photo booth 126 can be used to provide uniform lighting conditions for better and clearer image captures, as described further in reference to FIGS. 2-3. In some implementations, the system 100 may not include the photo booth 126.

The conveyor belts 102 and 106 can be any types of conveyor belts, rollers, or other mechanisms used in a warehouse environment to move (e.g., automatically, semi-autonomous, and/or manually) and route items throughout the warehouse environment 128. The turntable 104 can be a rotatable platform. The on conveyor belt 102 can be configured/attached to the turntable 104 such that a pallet 120 having an item 122 (e.g., boxes, containers, etc.) positioned on the belt 102 can be automatically moved onto the turntable 104. The on conveyor belt 102 can receive the pallet 120 when it arrives at the warehouse 128. For example, the on conveyor belt 102 can be in or proximate to a docking bay area of the warehouse 128. The pallet 120 can be loaded off of a truck at the docking bay and automatically or manually placed (e.g., injected) onto the conveyor belt 102 (e.g., by a warehouse worker, forklift, etc.). The conveyor belt 102 can automatically move the pallet 120 towards the turntable 104.

Before the pallet 120 is moved onto the turntable 104, adjustment device(s) 138 configured to the on conveyor belt 102 can align and/or center the pallet 120 on the belt 102. As a result, the pallet 120 can be delivered onto the turntable 104 at a center or midpoint of the turntable 104. In some implementations, the pallet 120 can also be automatically centered at the midpoint of the turntable 104. Centering and aligning the pallet 120 can be advantageous to capture uniform images of the pallet 120, as described further below.

Still referring to FIG. 1, the off conveyor belt 106 can be configured/attached to the turntable 104 such that the pallet 120 can be automatically moved onto the belt 106 once images are captured of the pallet 120, as described further below. The off conveyor belt 106 can include one or more branches for routing the pallet 120 to organized storage locations 132 and/or temporary storage locations 130 in the warehouse 128. The pallet 120 can be moved along the conveyor belts 102 and 106 and/or the turntable 104 at a constant speed. In some implementations, the speed can be 2 in/sec. The pallet 120 can be moved at a faster or slower speed based on a configuration and performance of components described herein in the system 100.

The turntable 104 can be configured to rotate the pallet 120 around a z axis, in a clockwise and/or counterclockwise direction. In some implementations, the turntable 104 can rotate the pallet 120, in one direction during a first scan (e.g., pass-through) of the pallet 120 and then rotate in an opposite direction during a second scan of the pallet 120. The turntable 104 can have a slow but fluid rotation, such that images can be captured of the pallet 120 from every side/angle. For example, the turntable can rotate at a speed of 2 in/sec. One or more other rotation speeds can be used. In some implementations, a speed and/or direction of rotation can be adjusted based on a pallet that is being scanned. For example, the turntable 104 can rotate at a faster speed for a large pallet having more surface area versus a pallet that is half the size of the large pallet, thereby having less surface area.

The vertical pole 108 can include one or more cameras 110A-N. Optionally, the vertical pole 108 can also include one or more light sources, as depicted and described in reference to FIGS. 2-4. As shown in FIG. 1A, a camera 110N can also be positioned within the photo booth 126 above the turntable 104. The camera 110N can be configured to capture images of a top surface of the pallet 120. In general, the cameras 110A-N can be configured to continuously capture image data of the pallet 120 as it is rotated on the turntable 104. One or more of the cameras 110A-N can be angled at a 90 degree offset from the turntable 104. The cameras 110A-N can also be positioned at other angles offset and/or relative to the turntable 104.

The pole 108 can be a uniform height to accommodate for any size pallet that may be placed on the turntable 104. In some implementations, the pole 108 can be adjusted in height depending on a size of a pallet that is being scanned. The pole 108 can be stationary and placed a working distance away from the turntable 104. Since the pole 108 is stationary, the cameras 110A-N attached thereto can capture images of the pallet 120 from all sides based on a constant distance, field of view (FOV), and angle(s).

In some implementations, the pole 108 can include a camera positioned at a top of the pole 108 to capture images of a top of the pallet 120. The pole 108 can also include a camera positioned at a bottom of the pole 108 to capture images of a bottom of the pallet 120. Placement of such cameras can be advantageous to provide for capturing images of parts of the pallet 120 that otherwise may be difficult for a warehouse worker to inspect or see. Thus, the images can provide a more complete view of the entire pallet 120 for profiling.

The cameras 110A-N can be attached to the pole 108 at predetermined angles such that images can be captured of every side of the pallet 120 from multiple angles. The images can therefore be stitched together to generate a comprehensive image model of the pallet 120 for further processing (e.g., identifying characteristics of the pallet 120). In some implementations, one or more of the cameras 110A-N can be other types of sensing or imaging devices, including but not limited to LIDAR, 3D stereoscopic cameras, thermal sensors, and/or scanners (e.g., barcode, RFID, QR code). In yet other implementations, the pole 108 can include the one or more cameras 110A-N in addition to one or more LIDAR sensors, thermal sensors, and scanners. Locating all the cameras, sensors, and/or scanners on the single pole 108 can provide for more efficient use of space in the warehouse environment 128, as well as more time-saving, efficient, and accurate scanning and profiling of pallets.

In some implementations, the vertical pole 108 can include one camera 110A. The camera 110A, for example, can have a large FOV to capture the pallet 120 from top to bottom. The pole 108 with the one camera 110A can be positioned farther away from the turntable 104 (e.g., a greater working distance) in order to capture the pallet 120 from top to bottom. This configuration can be advantageous since it can be less costly to implement than multiple cameras. Moreover, the one camera 110A can be a high resolution camera. Profiling the pallet 120 would not require stitching together images from multiple cameras, which can reduce processing time and use less computational resources. Thus, profiling by image processing can become more efficient.

In some implementations, the vertical pole 108 can include two cameras 110A-B. The cameras 110A-B can have large FOVs and can be high resolution cameras. Profiling the pallet 120 can require stitching together images from both cameras 110A-B, which can use less processing power and computational resources than having to stitch together images from more than two cameras. As an example configuration, the pole 108 can be positioned a working distance of 1.9 m away from the turntable 104. The pole 108 can have a maximum height of 2.75 m (e.g., 108 inches). A first camera 110A can be positioned 1.6 m (e.g., 63 inches) from the bottom of the pole 108. A second camera 110B can be positioned 1.6 m from the top of the pole 108. As a result, the cameras 110A-B can have a FOV overlap of approximately 0.225 m (e.g., 8.9 inches). This FOV overlap can be advantageous to more easily, quickly, and accurately stitch together images captured by the cameras 110A-B.

Figure 4A:
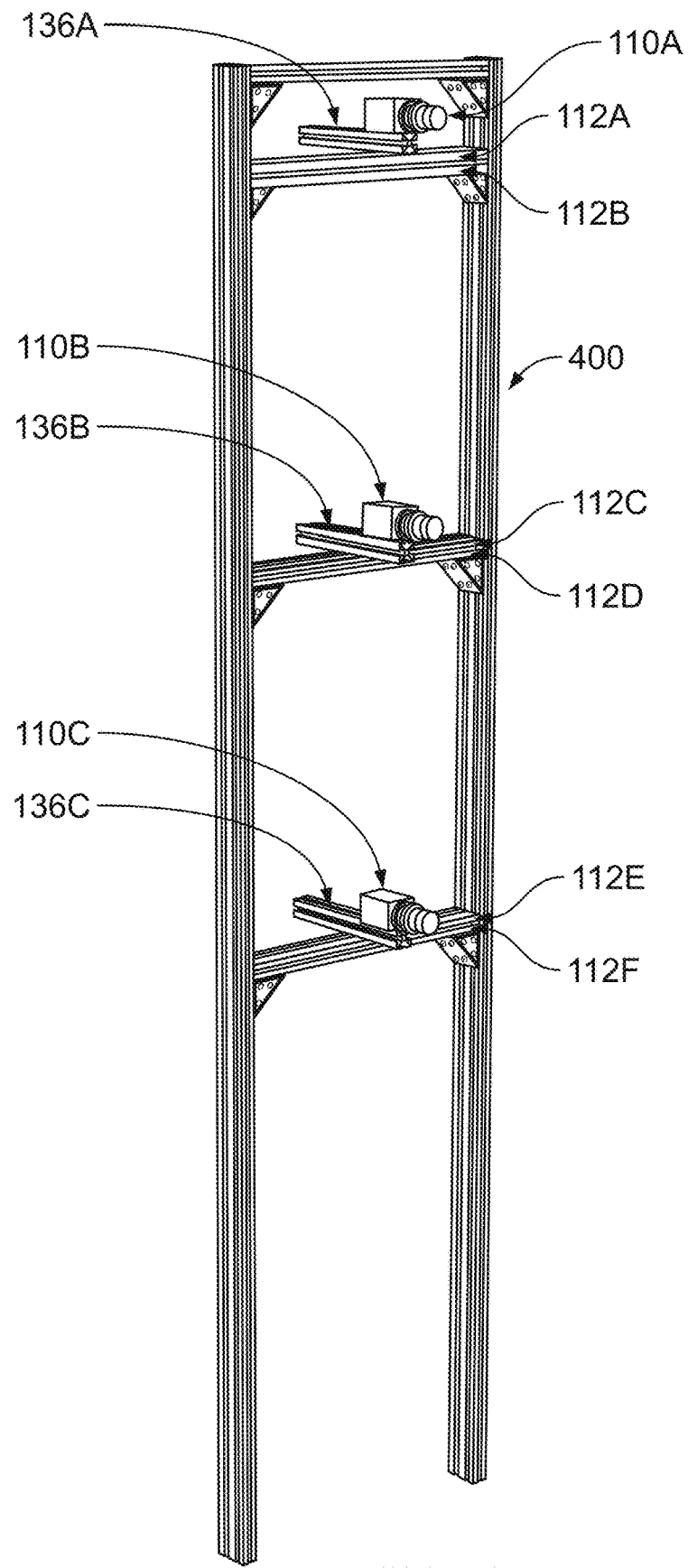
FIG. 4A depicts a camera configuration for profiling items.
Figure 4B:
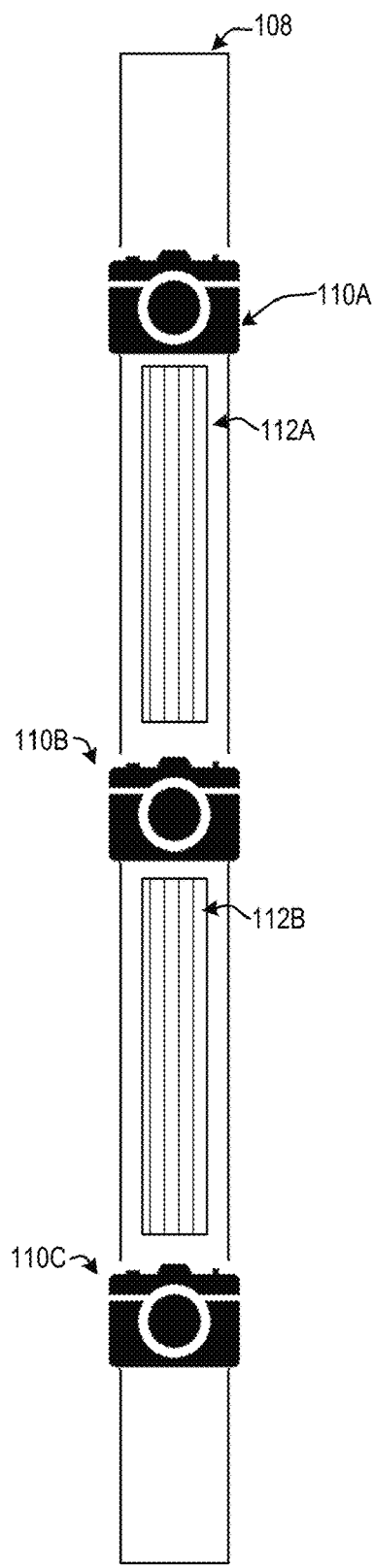
FIG. 4B depicts another camera configuration for profiling items.

In yet other implementations, the vertical pole 108 can include three cameras 110A-C, as described in reference to FIGS. 4A-B. The pole 108 can also include additional cameras 110D-N or other sensors or imaging devices.

The vertical pole 108 configuration can be advantageous because it uses less space in the warehouse environment 128 and also prevents potential imaging and profiling discrepancies that may occur when cameras rotate around a pallet. When cameras rotate around a stationary pallet, each image that is captured may be taken from different angles and/or at unequal distances from the pallet. For example, a rotating camera may move up and down around each side of the pallet. By moving up and down, the rotating camera may inherently reposition at differing distances from the pallet to capture each image. This can result in distorting the images once they are stitched together. Stitching together such images can require additional processing power and computational resources, and can result in inaccurate imaging and pixilation. As a result, pallet characteristics can be inaccurately identified or otherwise not identified.

The pole 108 configuration, on the other hand, ensures that all images are captured from an equal distance (e.g., the working distance) to the pallet 120 while the pallet 120 rotates on the turntable 104. The equally distanced images can be more easily stitched together to generate a comprehensive image of the pallet 120 for profiling and characteristic identification.

The system 100 can optionally include one or more sensors, cameras, and/or scanners that are configured to the turntable 104. For example, one or more sensors can be configured to the turntable 104 to detect and determine a weight of the pallet 120. As another example, one or more cameras, scanners, or other imaging devices can be attached to a top surface of the turntable 104 to capture one or more images or other information that is located on a bottom of the pallet 120 (e.g., damage to a bottom of a wood frame). As yet another example, the turntable 104 can have one or more motion sensors to determine a speed and/or angle at which the turntable 104 is rotated.

Still referring to FIG. 1A, the system 100 includes a computing system 152, a warehouse management system (WMS) 154, a user device 156, and a pallet profiles data store 158 in communication (e.g., wired and/or wireless) via network(s) 150. The computing system 152 can control one or more components of the system 100 to profile the pallet 120. In some implementations, the computing system 152 can be a combination of one or more computing systems, including the WMS 154. The computing system 152 can also perform image processing techniques to identify information about the pallet 120. For example, the computing system 152 can receive image data from the cameras 110A-N (step A, 160). In some implementations, the computing system 152 can instruct the cameras 110A-N when to capture images of the pallet 120 (e.g., once the pallet 120 is sensed or otherwise detected on the turntable 104). The computing system 152 can receive image data as images are captured by the cameras 110A-N. The computing system 152 can also receive image data after the pallet 120 is rotated a full 360 degrees by the turntable 104.

The computing system 152 can profile the pallet 120 based on the image data (step B, 162). As described throughout this disclosure, the computing system 152 can perform image processing and analysis techniques to identify a label or other unique identifier associated with the pallet 120. As an example, the computing system 152 can be trained to identify labels that have x dimensions ranging from 0.495-1.016 mm, height of 31.75, a quiet zone left of at least 10 times the x dimensions, and a quiet zone right of at least 10 times the x dimensions. The computing system 152 can also be trained to identify labels of different sizes. The computing system 152 can also identify information or characteristics about the pallet 120 from the image data. The computing system 152 can profile the pallet 120 as the image data is received. The computing system 152 can also profile the pallet 120 once all the image data is received (e.g., the pallet 120 was rotated a full 360 degrees on the turntable 104).

The computing system 152 can generate control instructions based on profiling the pallet 120 (step C, 164). The control instructions can be implemented by the computing system 152 to control one or more components of the system 100. For example, the control instructions can cause the pallet to be automatically moved from the turntable 104 onto the off conveyor belt 106. The pallet 120 can then be routed to an appropriate storage location (step D, 166). The control instructions can indicate the appropriate storage location. As described further below, the appropriate storage location can be determined based on whether the computing system can accurately identify the label of the pallet 120 when profiling the pallet 120 (step B, 162). If the label can be accurately identified, the pallet 120 can be routed (step D, 166) to the organized storage location 132. If the label cannot be accurately identified, the pallet 120 can be routed (step D, 166) to the temporary storage location 130.

The computing system 152 can also transmit the control instructions to the WMS 154 (step C, 164). Instructions can be sent to the WMS 154 when the label of the pallet 120 cannot be identified from the image data. When the instructions are sent to the WMS 154, the pallet 120 can also be automatically routed to the temporary storage 130 (step D, 166). The WMS 154 can communicate with the user device 156 to identify the pallet 120 that is placed in the temporary storage 130 (step E, 168). As described further below, a warehouse worker can inspect the image data of the pallet 120 in the temporary storage 130 to identify the label of the pallet 120 and an organized storage location for that pallet 120. The warehouse worker can also manually inspect the pallet in the temporary storage location 130. The user device 156 can identify or otherwise profile pallets that were previously unable to be identified. In other words, the user device 156 can receive image data of the pallet 122, wherein this image data can be provided to the WMS 154 by the computing system 152. The WMS 154 can use the image data to determine the organized storage location 132 for the pallet 122. The user device 156 can present the image data in a graphical user interface to the warehouse worker. The warehouse worker can view such image data and use the image data to perform manual and/or visual inspections of the pallet 122.

Once the pallet 120 is identified by the warehouse worker and/or the WMS 154 (step F, 170), the pallet 120 can be moved to the organized storage location 132 for that pallet 120 (step F, 170). The pallet 120 can be automatically moved from temporary storage 130 to the organized storage location 132, for example, by automated mechanical conveying system (e.g., conveyor belt), cranes, or other autonomous vehicles. The pallet 120 can also be manually moved, for example, by a warehouse worker and/or a forklift.

Figure 1B:
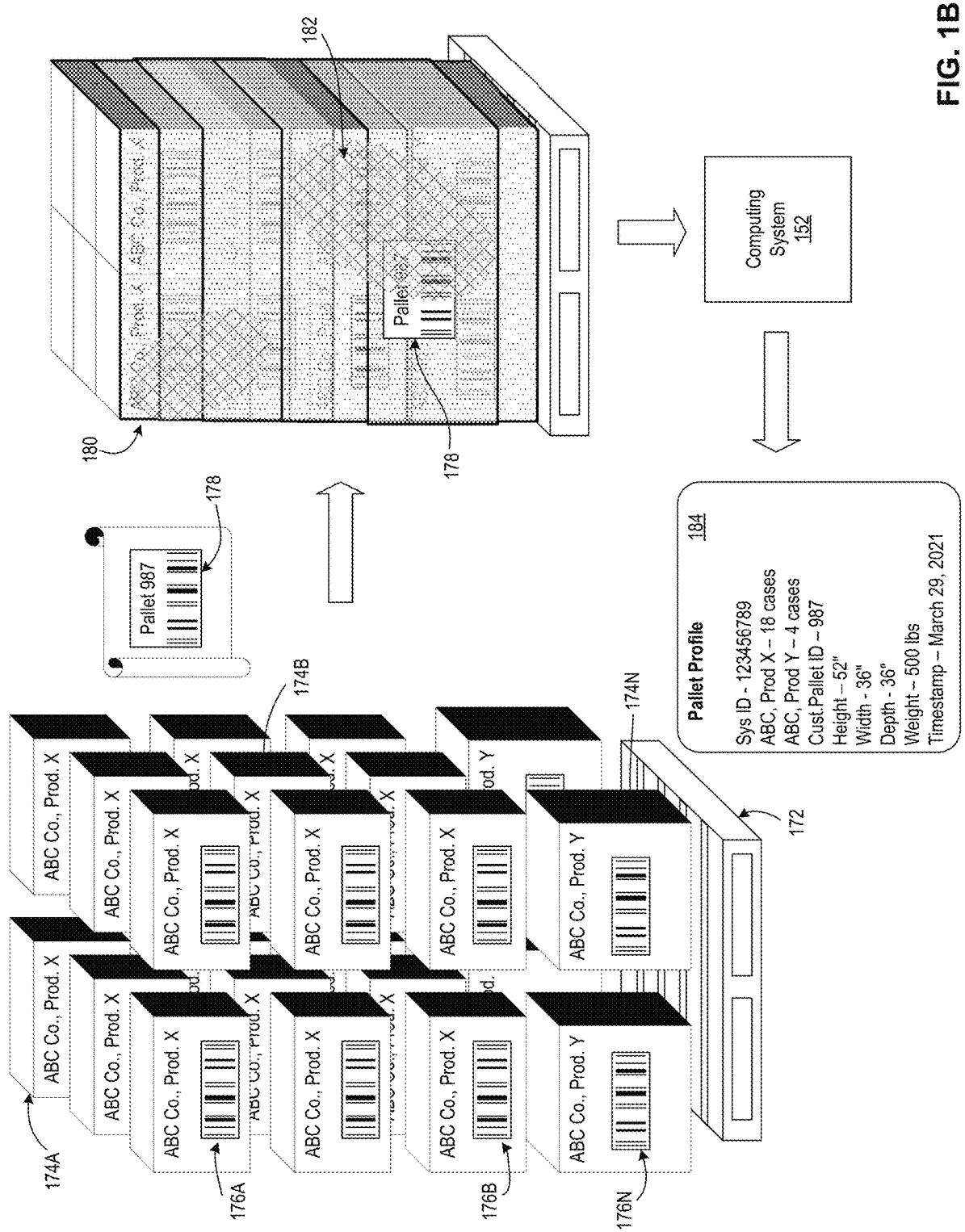
FIG. 1B depicts an example pallet of items that can be profiled in the warehouse environment.

FIG. 1B depicts an example pallet 172 of items that can be profiled in the warehouse environment. Cases 174A-N can be stacked on the pallet 172. The cases 174A-N can include quantities of products (e.g., items). Each of the cases 174A-N can have corresponding labels 176A-N (e.g., barcodes, SKUs). The labels 176A-N can identify the cases 174A-N and contents of the cases 174A-N. Each of the cases 174A-N can also have text identifying contents of the cases 174A-N, customers, and other information related to the cases. As shown, the cases 174A-N can be stacked in multiple layers on the pallet 172. Each layer on the pallet 172 can have a different quantity, type, and/or size of the cases 174A-N. Thus, each layer of cases 174A-N can be different from each other. For example, a bottom layer can include 4 large cases 174A-N that contain Product Y. A top layer can include 6 small cases 174A-N that contain Product X.

The cases 174A-N can then be wrapped together with plastic wrap 180 (e.g., transparent, semi-transparent) on the pallet 172. The pallet 172 can have its own identifier 178 (e.g., barcode, label, SKU). However, as shown in FIG. 1B, when the cases 174A-N are wrapped together, the wrap 180 can obscure one or more labels 176A-N and/or marks/text on the cases 174A-B. The wrap 180 can also obscure the pallet identifier 178. Environmental obstructions 182 (cross-hatching areas), like frost, dust, scuffs, etc., can also occur, further obstructing a clear view of the pallet identifier 178 and/or any of the labels 176A-N of the cases 174A-N. The wrap 180 and/or the environmental obstructions 182 can pose challenges for positively identifying the cases 174A-N on the pallet 172, especially when the plastic wrap 180 can reflect light to obscure the cases 174A-N beneath. Thus, as described herein, the computing system 152 can be adapted to deal with such obstructions when profiling the pallet.

Using the techniques described herein, the computing system 152 can determine a pallet profile 184 for the illustrative example pallet 172 depicted in FIG. 1C. The pallet profile 184 can include information that is determined by the computing system 152 while profiling the pallet 172. For example, the profile 184 can include information such as a system ID, a name and/or quantity of each type of product and/or case on the profile, a customer pallet ID, a height, width, depth, weight, and timestamp for when the pallet 172 was profiled. One or more additional or other pieces of information can be determined for the pallet 172 and stored in the pallet profile 184. As described throughout this document, the computer system 152 can use any of a variety of image analysis techniques to identify and determine this information from the pallets, such as OCR techniques, machine learning models, other techniques, and/or combinations thereof.

FIG. 1C depicts example product identifiers that are identified on cases under different lighting conditions. A case 186 can include a product identifier 190. The case 186 can also be wrapped in plastic wrap 188, which can cover a part or all of the product identifier 190. An image 191 of the product identifier 190 can be captured by one or more of the cameras described herein (e.g., refer to the cameras 110A-N in FIG. 1A).

The cameras can include red light filters. Moreover, one or more red strobe lights can be positioned near the case 186 to help illuminate the product identifier 190 and reduce glare from the plastic wrap 188. The cameras can be set to capture 10 decibels gain (dB), with 5 millisecond (ms) exposure and red strobe light. The cameras can also be configured with 630 nanometer (nm) bandpass filters. The image 191 results, which shows a clear image of the product identifier 190. The plastic wrap 188 may not cause glare or otherwise obstruct an ability to read the product identifier in the image 191 using the techniques described herein.

On the other hand, case 192 is set in different lighting and exposure conditions. The case 192 includes a product identifier 196, which can be beneath a layer of plastic wrap 194. The cameras can be set to capture 10 dB gain, with 2 ms exposure and red strobe light. The cameras can also have 630 nm bandpass filters. As shown, image 196' has a less clear depiction of the product identifier 196. Moreover, portions of the product identifier are obscured by the plastic wrap 194 in the image 196'. In some implementations, the computing system described herein can still profile the pallet 192 based on the image 196' of the product identifier 196. However, the camera and lighting conditions can be adjusted such that the cameras can be exposed for a longer period of time. As a result, a clearer, well-lit image can be captured of the product identifier, as shown with regards to the image 191, using the techniques described herein. This image can be used by the computing system to more accurately profile the pallet and identify information about the pallet.

In some alternative embodiments, a camera lens can be configured with a polarizing filter. Moreover, an LED light source can be positioned offset from the camera lens to reduce glare in the lens, as described throughout this disclosure. The LED light source can shine a red light on a pallet. In some implementations, the LED light source can shine a white light and a polarizing film can be applied to the light source to filter out all wavelengths except for those that correspond to red light. The polarizing film can therefore be configured to the LED light source. By using the polarizing filter on the camera lens, the LED light source, and the polarizing film, wavelengths of light other than red light can be filtered out. Under red light settings, the camera can generate clearer images of the pallet with reduced or no glare. The images can be easier to analyze by the computing system, as described herein.

Using the polarizing filter, the LED light source, and the polarizing film can result in the camera capturing light having wavelengths between 620-650 nm. These wavelengths can be correspond to red light. Thus, the pallet can be imaged under red light settings, which can provide for easier and more accurate image analysis as performed by the computing system.

FIG. 2 depicts a perspective view of a photo booth 126 of the system 100 for profiling items in the warehouse environment 128. The photo booth 126 depicted in FIG. 2 is an example configuration. A variety of other configurations can be utilized, as described throughout this disclosure. The photo booth 126 can be made from a dark material (e.g., cloth) that may be used in other photography settings. The dark material can be advantageous to prevent ambient light from entering the enclosed area and/or obstructing the cameras 110A-N from capturing clear, uniformly lit images of a pallet.

As shown in the example configuration of FIG. 2, the photo booth 126 can enclose an area around the turntable 104. The booth 126 can be formed with two walls 126A and 126B. The wall 126A can include an opening 127 that a pallet can pass through when moving from the conveyor belt 102 onto the turntable 104. The wall 126B can include an opening 129 that the pallet passes through when moving from the turntable 104 to the off conveyor belt 106. The openings 127 and 129 may not be covered by materials, such as fabrics, plastic, flaps, or doors. In fact, the openings 127 and 129 can be sized to match a vertical height and a width of a largest pallet that may go through the photo booth 126, in some implementations. The openings 127 and 129 can otherwise be sized to match sizing of pallets that enter the photo booth 126. Thus, the size of the pallet can block out any light that may come through the openings 127 and 129 as the pallet rotates on the turntable 104. In some implementations, the booth 126 can also include a top portion that connects the walls 126A and 126B. The booth 126 can also include side walls such that the booth 126 can form a completely enclosed area around the turntable 104, thereby allowing no ambient light to enter the enclosed area.

In the example of FIG. 2, the vertical pole 108 can be positioned a set working distance away from the turntable 104 between the walls 126A and 126B. The cameras 110A-N can be vertically aligned along the pole 108. Moreover, lights 112A-N can be vertically aligned along the pole 108. The lights 112A-N can be offset from the cameras 110A-N to reduce or otherwise avoid glare in lens of the cameras 110A-N and to provide uniform lighting on the turntable 104.

Figure 3A:
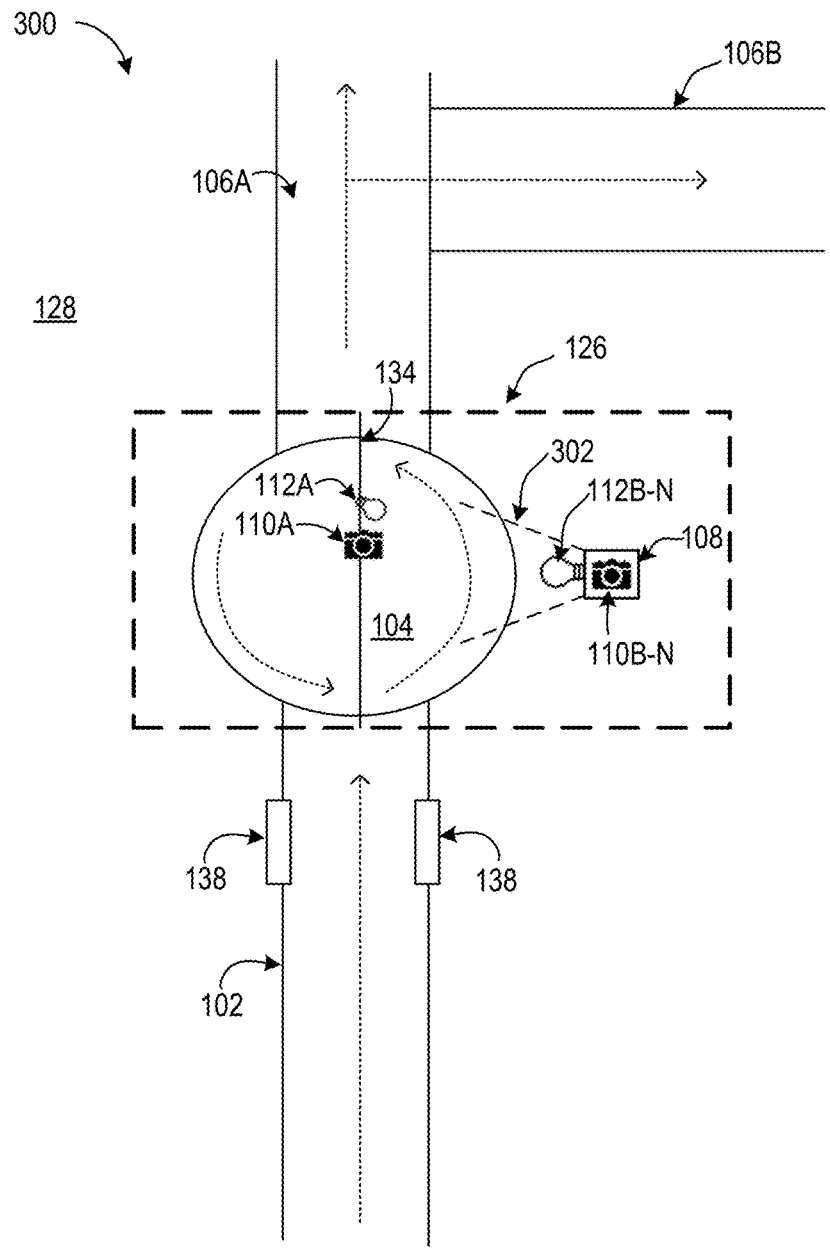
FIG. 3A is a top view of an example configuration of the system for profiling items in the warehouse environment.

FIG. 3A is a top view of an example configuration of a system 300 for profiling items in the warehouse environment 128. In this example, the off conveyor belt comprises belts 106A and 106B. The belt 106A can route a pallet to an organized storage location in the warehouse 128. The belt 106B can route the pallet to a temporary storage location in the warehouse 128. Moreover, in this example system 300, the photo booth 126 is a full enclosure around the turntable 104. The booth 126 has sides and a top to prevent ambient light from entering the full enclosure.

The booth includes a bar 134 positioned over and across a center of the turntable 104. The bar can include one or more overhead cameras 110A and one or more overhead lights 112A. The overhead camera 110A can be configured to capture images of a top of a pallet as it rotates on the turntable 104. The light 112A can also provide uniform lighting of the top of the pallet. The vertical pole 108 (e.g., frame, vertically oriented support structure) can include one or more cameras 110B-N and one or more lights 112B-N for capturing images of sides of the pallet as it rotates on the turntable 104. As depicted in this example, the cameras 110B-N and the lights 112B-N can be mounted to the pole 108 and oriented toward the turntable 104 (and pallet to be illuminated and imaged while on top of the turntable 104), resulting in the same or similar orientation and field of view/illumination 302 for the cameras 110B-N and lights 112B-N. The lights 112B-N can be mounted to the pole 108 in an arrangement so that they are vertically and/or horizontally spaced from the cameras 110B-N, and can be provided in any of a variety of ratios relative to the cameras 110B-N (e.g., each camera can have two lights around it to provide uniform lighting from perspectives of each camera). As mentioned above, the lights 112A-N can also be offset from the cameras 110A-N to minimize or otherwise avoid glare in the lens of the cameras 110A-N, as described in the examples below in FIGS. 3B-C.

FIG. 3B is a top view of another example configuration of a system 310 for profiling items in the warehouse environment 128. Like the other examples discussed above, the photo booth 126 can enclose an entire area around the turntable 104, and can include a top surface providing full enclosure of the area around the turntable 104 (and cameras 110A-N and lights 112A-N). Here, the vertical pole 108 includes the cameras 110A-C. The lights 112A-N can be attached to a separate vertical light support structures 109A-B (e.g., poles, post, structure) and laterally offset from the vertical pole 108 having the cameras 110A-N. The light support structures 109A-B can also be arranged at an angle and/or working distance that is different from the angle and/or working distance of the pole 108, which can result in the cameras 110A-N having a field of view 312 that is different from the field of illumination 314A-B for the lights 112A-N. The example system 310 can include a top down camera and lights (not depicted) that are located above the turntable 104, similar to the description above with regard to FIG. 3A. By offsetting the lights 112A-N to have fields of illumination 314A-B with different angles relative to the turntable 104 from the field of view 312 for the cameras 110A-N, the system 310 illuminate the turntable 104 while minimizing glare in the lens of the cameras 110A-N, which can increase the fidelity and clarity of images of pallets captured by the cameras 110A-N and, as a result, the accuracy of pallet profiling performed by the system 310.

Figure 3C:
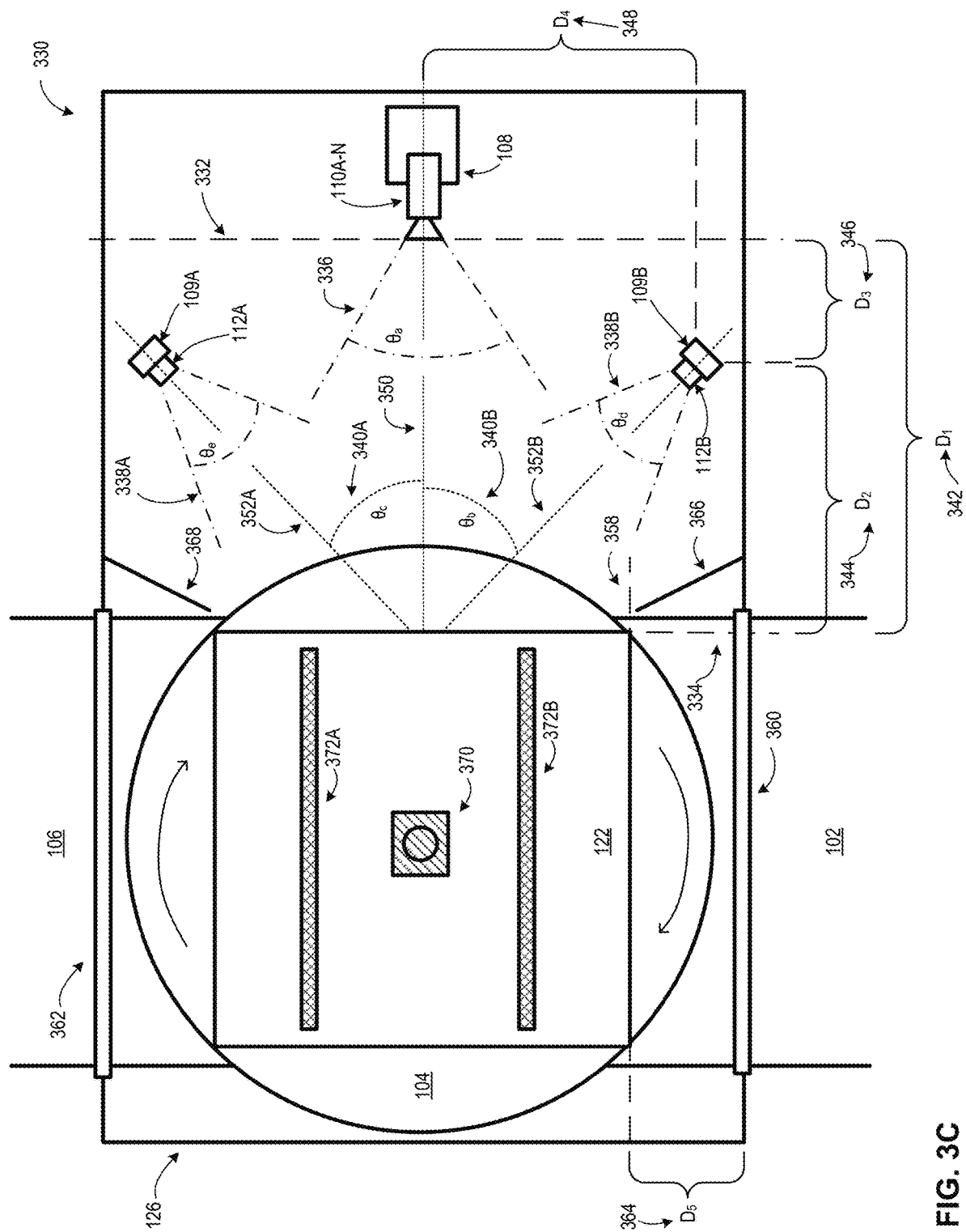
FIG. 3C is a top view of another example configuration of a system for profiling items in the warehouse environment.

FIG. 3C is a top view of another example configuration of a system 330 for profiling items in the warehouse environment. The system 330 is depicted with the photo booth 126, but it may be possible to use the system 330 without a photo booth. The system 330 further includes cameras 110A-N mounted on the vertical pole 108. The cameras 110A-N can be modularly mounted to the vertical pole 108 such that the cameras 110A-N can be moved up and down and/or left and right on the vertical pole 108. Changing camera positioning can be advantageous to accommodate different configurations of cameras 110A-N (i.e., different fields of view) and for capturing image data of different sized pallets. For example, when a shorter pallet is rotated on the turntable 104, the cameras 110A-N can be moved closer together on the vertical pole 108 and/or lower on the vertical pole 108. As another example, when a taller pallet is rotated on the turntable 104, the cameras 110A-N can be moved to have greater vertical distances between them along the pole 108 such that a top to a bottom of the pallet can be captured by the cameras 110A-N. Other variations and/or configurations of the camera 110A-N mounting on the pole 108 are also possible.

Lighting elements, 112A and 112B, are positioned at offset angles from the cameras 110A-N. Each of the lighting elements 112A and 112B, which can each include one or more individual lighting units (e.g., one or more light bars) can be mounted to light poles 109A and 109B, respectively. For example, two vertically oriented light bars can be mounted to each of the light poles 109A and 109B. In some implementations, one or more of the light poles 109A and 109B can have additional or fewer light bars mounted thereon. A quantity of light elements per pole 109A and 109B can be based on any of a variety of factors, such as camera settings, size of the pallet 122, one or more distances between the light poles 109A and 109B and the pallet 122, each other, and/or the cameras 110A-N, and/or one or more angles of the light poles 109A and 109B relative to the pallet 122 (discussed further below).

Although the lighting elements 112A-B are shown mounted to the poles 109A-B, they can alternatively be mounted to a frame of the photo booth 126.

The cameras 110A-N on the vertical pole 108 can be positioned a distance $D_1$ (342) from a front plane 334 of the pallet 122 that is facing and being imaged by the cameras 110A-N. The distance $D_1$ (342) can be selected based on a variety of factors, such as an expected size range for pallets 122 being imaged (e.g., height, width), a quantity of cameras 110A-N on the vertical pole 108, a type of camera lens used with the cameras 110A-N, and/or camera settings, such as field of view (FOV) 336 of the cameras 110A-N. The cameras 110A-N can be oriented toward the pallet 122 along a vertical plane 350 that bisects at or near the midpoint of the turntable 104 and/or pallet 122, and that extends in a substantially orthogonal direction from the turntable 104 and/or pallet 122. The FOV 336 can be oriented along the plane 350 and can have angle $\theta_a$ that can be selected in combination with the distance the $D_1$, to ensure that the entire pallet 122 can be captured by the cameras 110A-N. For example, the vertical pole 108 can be moved to different distances $D_1$ to accommodate for one or more changes to the system 330, such as cameras 110A-N being changed and the resulting angle $\theta_a$ for the FOV 336 changing.

Each of the lighting elements 112A and 112B can be positioned a distance $D_2$ (344) from the plane 334 of the pallet 122. The lights 112A and 112B can also be positioned a distance $D_3$ (346) in front of a plane 332 corresponding to the lens of the cameras 110A-N. In some instances, the lighting elements 112A-B can be positioned behind the plane 332, resulting in the distance $D_2$ being greater than the distance $D_1$. Each of the lighting elements 112A-B can also be positioned a distance $D_4$ (348) away and offset from the cameras 110A-N and the plane 350. The lights 112A and 112B can be oriented along planes 352A-B that are different from and offset from by plane 350 of the cameras 110A-N at angles $\theta_b$ and $\theta_c$ (340A-B), which can be the same or different for each of the lighting elements 112A-B. The angles $\theta_b$ and $\theta_c$ can be selected, for example, to provide for ample illumination for the cameras 110A-N to reliably capture clear images of the pallet 122 within the photo booth 126 while at the same time minimizing glare. The lighting elements 112A-B can have fields of illumination 338A-B that are oriented along the planes 352A-B with angles $\theta_d$ and $\theta_e$ across which light is emitted/cast by the lighting elements 112A-B. The positioning and angles of orientation for the lighting elements 112A-B can be offset from the position and orientation of the cameras 110A-N (e.g., offset distances $D_3$ and $D_4$, and offset angles $\theta_b$ and $\theta_c$), which can assist in improving the quality of images captured by the cameras 110A-N (e.g., reducing glare in the images). The lighting elements 112A-B can be positioned to be outside of the FOV 336 for the cameras 110A-N, and to be distanced and oriented relative to the pallet 122 so that the fields of illumination 338A-B, either individually or collectively, adequately illuminate the entire width of the pallet 122. For example, each lighting element 112A-B can be positioned and oriented so that they each cast light across the entire width of the pallet 122 (based on their field of illumination 338A-B). In another example, each lighting element 112A-B can be positioned and oriented to only illuminate a portion of the width of the pallet 122 so that, collectively, they provide full illumination of the entire width of the pallet 122. The offset angles $\theta_b$ and $\theta_c$ (340A-B) based on the orientation 352A-B of the lighting elements 112A-B can be any of a variety of angles between 0° and 90°, such as 15°, 30°, 45°, 60°, 75°, less than 45°, greater than 45°, any of a variety of ranges (e.g., 1°-15°, 15°-30°, 30-45°, 45°-60°, 60°-75°, 75°-89°, or any combinations thereof), and/or other angles or ranges between 0° and 90°.

The lighting elements 112A-B can have the same field of illumination 338A-B, and same positioning and orientation reflected across and on opposing sides of the plane 350. For example, the distance $D_4$ can be equidistant for both the lights 112A and 112B. In other instances, one of the lights 112A can have a different field of illumination 338A, a different orientation 352A with a different angle 340A, and/or can have a shorter distance $D_3$ and/or $D_4$ away and offset from the cameras 110A-N than the other light 112B.

The distances $D_2$ and $D_3$ can be equal. For example, the lights 112A and 112B can be equidistant from both the plane 332 of the cameras 110A-N and the plane 334 of the pallet 122. In some instances, the distance $D_2$ can be greater than the distance $D_3$. In other instances, the distance $D_3$ can be greater than the distance $D_2$. Moreover, as described throughout, the lights 112A and 112B can readily be moved (e.g., backwards or forwards) and/or rotated at different angles.

The lighting elements 112A-B are depicted in FIG. 3C as being positioned outside of the width of pallet 122 (i.e., distance $D_4$ is greater than half of width of pallet 122), as indicated on one side by the plane 358, which can assist with increasing the angles 340A-B achieved and with reducing the potential glare for images captured by the cameras 110A-N. Alternatively, the lighting elements 112A-B can be positioned at or on the perimeter/width of the pallet 122 (i.e., distance $D_4$ is set to approximately half of width of pallet 122), and/or can be positioned inside of the perimeter/width of the pallet 122 (i.e., distance $D_4$ is less than half of width of pallet 122). Such adjustments of the lighting elements 112A-B at or inside of the plane 358 can permit, for example, for the dimensions of the photo booth 126 to be reduced and to be more compact.

The photo booth 126 can include openings 360 and 362 through which the pallet 122 can be received into the photo booth 126 for imaging via conveyor 102, and transported out of the photo booth 126 after imaging is completed via conveyor 106. The openings 360 and 362 can be sized and shaped so as to accommodate the maximum dimension for the pallet 122 within a threshold margin (e.g., 5% dimension margin, 10% dimension margin, 20% dimension margin) so as to minimize the amount of ambient light received through the openings 360 and 362 into the photo booth 126. Additionally, the dimensions and configuration of the photo booth 126 relative to the turntable 104, the conveyors 102/106, and the openings 360/362 can be configured to minimize a distance $D_5$ between the edge of the pallet 122 (plane 358) and the openings 360/362. By minimizing this distance $D_5$, the sides of the pallet 122 facing the openings 360 and 362 can serve to block much of the ambient light that would otherwise be received into the photo booth 126, and which could otherwise interfere with imaging of the pallet 122 by the cameras 110A-N. In some instances, the photo booth 126 can additionally include opaque light shields 366 and 368 adjacent to the openings 360 and 362 that can substantially fill a space between the pallet 122 and the openings 360 and 362 (i.e., span most, all, or more of distance $D_5$), to further block ambient light that is not blocked by the pallet 122 itself. The light shields 366/368 can extend a vertical span within the photo booth 126, such as the height of the pallet 122, the full height of the photo booth 126, and/or other vertical spans. The light shields 366/368 can be configured to block the ambient light without interfering with or otherwise contacting the pallet 122 on the conveyors 102/106, and/or the turntable 104. The light shields 366/368 can additionally be made of and/or coated with a non-reflective material or color, which can reduce inadvertent light reflections during the image capturing process.

Although the openings 360 and 362 are shown as overlapping the conveyors 102 and 106, respectively, so that the entirety of the turntable 104 is contained within the photo booth 126, other configurations are also possible, such as portions of the openings 360 and 362 overlapping portions of the turntable 104 while still permitting for full rotation of the pallet 122 without obstruction/contact between the walls of the openings 360/362 and the pallet 122. Such a configuration could further reduce the distance $D_5$ and also reduce the ambient light received into the photo booth 126 via the openings 360/362. The photo booth 126 is configured in the depicted example without doors at the openings 360 and 362, which can help to increase throughput of pallets via the system 330 by not having to wait for delays associated with opening and closing doors, and can also make the system 330 more robust by reduces potential points of failure (e.g., failure from automated doors malfunctioning/breaking). In some instances, though, the photo booth 126 may be configured to include automated doors at the openings 360 and 362 that can additionally shield ambient light from entering the photo booth 126.

Also depicted in FIG. 3C is an example overhead camera 370 and overhead lighting elements 372A-B, which can be mounted to and suspended from a top surface/ceiling of the photo booth 126. The overhead camera 370 can be considered to be part of the cameras 110A-N, and can be centered over the pallet 122 and/or turntable 104. Although one overhead camera 370 is depicted, more than one overhead camera can be used and spaced apart so as to cover the top surface of the pallet 122, such as with the cameras 110A-N mounted to the post 108. The overhead lighting elements 372A-B can be spaced apart and offset from the camera 370, similar to the cameras 112A-B with regard to the cameras 110A-N. The lighting elements 372A-B may be mounted to a common mounting structure as the camera 370, and may have the same distance from the top surface of the pallet 122 and the same orientations as the camera 370. Alternatively, the discussion above with regard to positioning and orienting the lighting elements 112A-B to be offset from the cameras 110A-N can apply to the overhead lighting elements 372A-B with regard to the overhead camera 370.

Any of a variety of lighting elements and lighting settings can be used for the lights 112A-B and 372A-B. For example, the lights 112A-B and 372A-B can be configured to emit light within the visible spectrum, such as monochromatic light within the visible spectrum (i.e., red light with a wavelength between 610 nm-750 nm, orange light with a wavelength between 595 nm-610 nm, yellow light with a wavelength between 580 nm-595 nm, and/or others) and/or polychromatic light combining multiple different wavelengths (e.g., "white" light combining light from the visible spectrum, other combinations of polychromatic light). For example, the lights 112A-B and 372A-B can be configured to emit red light with a wavelength of approximately 610 nm, 615 nm, 625 nm, 650 nm, 675 nm, 700 nm, 725 nm, 750 nm, and/or other variations of red light. The lights 112A-B and 372A-B may additionally and/or alternatively be configured to emit light outside of the visible spectrum, such as infrared light (e.g., wavelength above 750 nm), ultraviolet light (e.g., between 100 nm and 400 nm), and/or other portions of the non-visible spectrum. The lights 112A-B and 372A-B can emit light in pulses and/or strobes that coincide with images being captured by the cameras 110A-N and 370. For example, the pulse duration may include, for example, 50 μs, 100 μs, 200 μs, 250 μs, 500 μs, 750 μs, 1 ms, 2 ms, 5 ms, 25 ms, 50 ms, 100 ms, 500 ms, 750 ms, 0.01 s, 0.05 s, 0.10 s, 0.5 s, 0.75 s, 1.0 s, 1.5 s, and/or other durations. The shutter speed used by the cameras 110A-N and 370 can correspond to (or be shorter or longer than) the pulse duration used for the lights 112A-B and 372A-B, such as being the same as the pulse duration. The cameras 110A-N and 370 can use any of a variety of aperture settings, such as f/2, f/4, f/6, f/8, f/12, f/16, f/22, and/or other aperture settings. The greater the f-stop number (i.e., "f/8") the smaller the aperture, the less light that is let into the camera's image sensors, and the greater the depth of field for the image captured (i.e., the more items of varying depths that are captured in focus). The converse is true for smaller f-stop numbers. The aperture settings and/or shutter speed can be selected to reliably capture clear images of the pallet 122 (i.e., images with contents of pallet 122 that are in focus and without blurring/glare) based on, for example, any one or more of the distances $D_1$, $D_2$, $D_3$, and $D_4$ as well as the angles 340A and 340B of the lights 112A and 112B.

The cameras 110A-N can be positioned at least a threshold distance away from the pallet 122 and the turntable 104, such as being positioned such that the distance $D_1$ is at least 0.5 m, 0.75 m, 1.0 m, 1.2 m, 1.4 m, 1.5 m, 1.7 m, 1.8 m, 2 m, and/or other threshold distances away. Such greater distances may, for example, permit for the cameras 110A-N to capture images of the entire surface of the pallet 122 facing the cameras 110A-N with camera settings (i.e., aperture, shutter speed) that provide for greater image reliability and usability across a group of pallets that will vary in their size, shape, makeup, condition, materials, and/or other details. For example, a mid-level aperture (e.g., f/6, f/8, f/11) can be used to permit for a faster shutter speed (e.g., 50 μs, 100 μs, 200 μs, 250 μs, 500 μs) to be used while also capturing images with a greater depth of field (i.e., greater range of depth away from camera is captured in focus).

For high contrast imaging, which can provide for better machine vision and automated analysis, the lights 112A-B and 372A-B can illuminate the turntable 104 and pallet 122 with a single wavelength (e.g., red light instead of white light). For example, red lighting elements and/or red light filters can be applied to the lights 112A-B and 372A-B to reject all other wavelengths but red, thereby emitting monochromatic light that may bring into focus details of interest, such as labels, barcodes, and other product identifiers. Such red lights can, for example, be advantageous to avoid glare that might occur from the lighting reflecting on plastic wrap or other parts of the pallet and items thereon, and/or to remove ambient lighting that otherwise can interfere with details in an image. In one example, the lights 112A-B and 372A-B can be red light-emitting diodes (LEDs) with any of a variety of configurations, such as being 225 mm in length, positioned approximately 1.7 m (e.g., 67 in) away from the turntable 104, and having a 45 degree emission angle with an approximate light coverage of 1.4 m (field of illumination). When the emission angles are sharp enough with respect to FOVs of the cameras 110A-N and 370, glare can be avoided or otherwise mitigates in the lens of the cameras 110A-C. While polarizers can be used for the lights 112A-B and 372A-B and/or for the cameras 110A-N and/or 370, they may not be needed with the lights 112A-B and 372A-B having greater angles relative to the orientation of the cameras 110A-N and/or 370. With the configurations described herein, the cameras 110A-C can use any of a variety of lens lengths, such as a 35 mm lens length, and/or any of a variety of focal lengths, such as f/4. The lights 112A-B and 372A-B can also be flood lights that can be, for example, approximately 330 mm in length. In some configurations, the lights 112A-B and 372A-B can be strobe lights that are placed in front of the pallet 120. The cameras 110A-C can also have polarizers and/or wide angle lens. The lights 112A-B and 372A-B can have a 10 dB gain, and/or other dB of gain. The cameras 110A-N and 370 can be set to any of a variety of exposure lengths (e.g., 0.5 s-5.0 ms) and/or with a bandpass filter (e.g., 600 nm bandpass filter, 630 nm bandpass filter, 800 nm bandpass filter).

A bandpass filter can also be applied to the cameras 110A-N and/or 370 to reduce different types of wavelengths that are captured by the cameras 110A-N and/or 370. The bandpass filter can be advantageous, for example, with high contrast imaging techniques, such as black and white imaging techniques. Such filters can provide for illuminating sensors of the cameras 110A-N and/or 370 to capture clearer, sharper images of a pallet on the turntable 104. Polarizing optics can also be applied to the lights 112A-B and/or 372A-B, and/or the cameras 110A-N and/or 370. Polarizing optics can help reduce or eliminate glare from the wrappings on the pallets. Polarizing optics can also improve contrast of labels, such as barcodes.

Any one or more of the systems 300, 310, and 330 in FIGS. 3A-C can be combined to perform the techniques described herein. Moreover, FIGS. 3A-C depict example configurations of the photo booth 126. The photo booth 126 can include one or more other alternative implementations, as described throughout this disclosure.

Figure 4C:
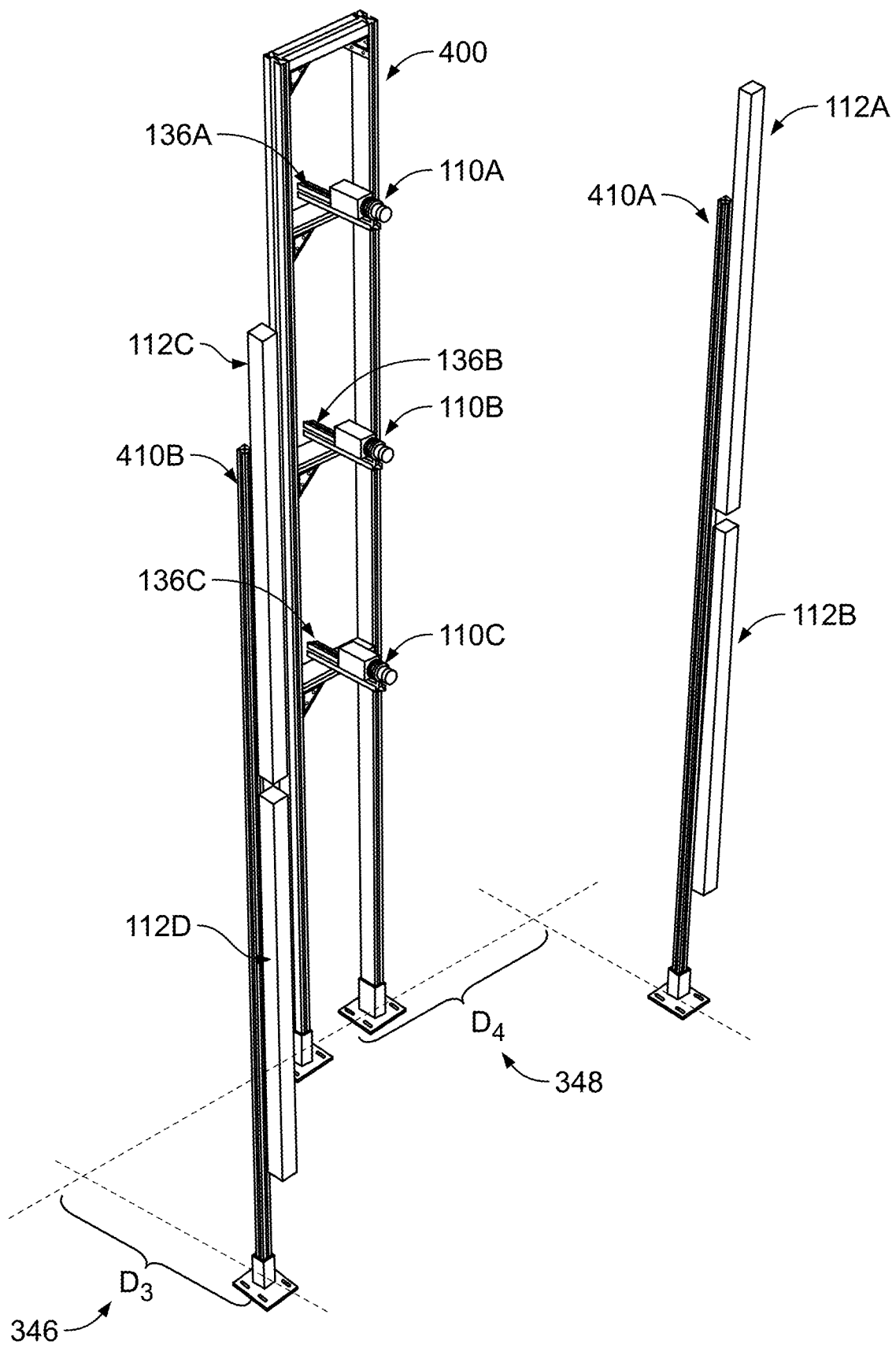
FIGS. 4C, 4D and 4E depicts another camera and lighting configuration for profiling items.
Figure 4E:
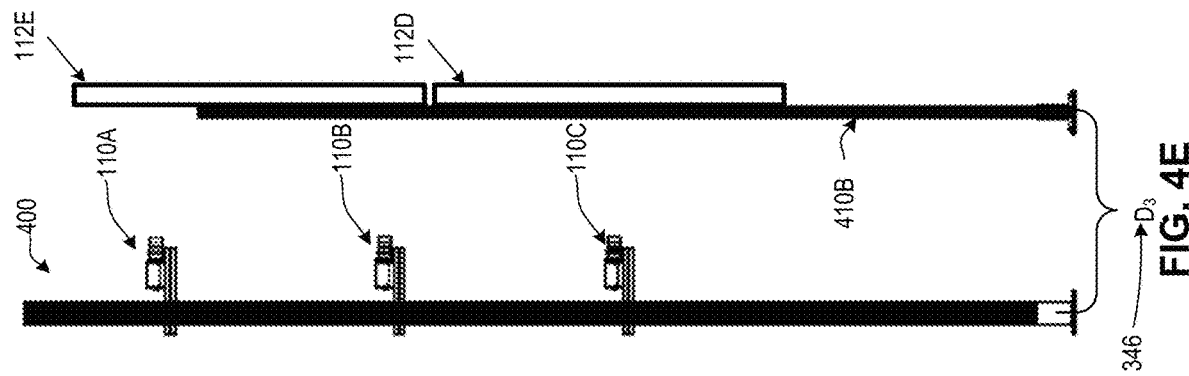
Figure 4D:
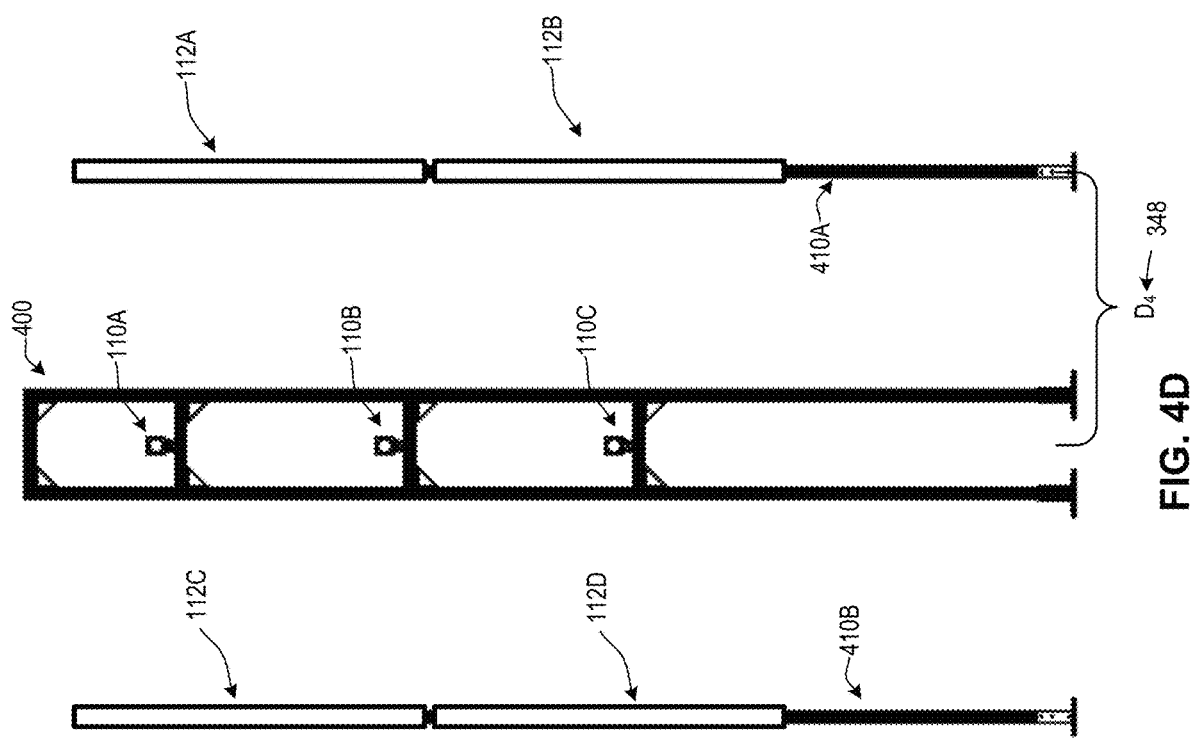

FIG. 4A depicts a camera configuration for profiling items. In this example, a structure 400 can have the cameras 110A-C aligned on horizontal poles 136A, 136B, and 136C, respectively. Two lights can be horizontally positioned below each of the cameras 110A-C. In some implementations, one light can be horizontally positioned above a camera and one light can be horizontally positioned below the camera. As show, lights 112A-B are horizontally positioned below the camera 110A, lights 112C-D are horizontally positioned below the camera 110B, and lights 112E-F are horizontally positioned below the camera 110C. In some implementations, the lights 112A-F may not be on the structure 400. Instead, as depicted in FIGS. 4C-E, the lights 112A-F can be positioned on a separate vertical pole structure than the structure 400. Moreover, in some implementations, the lights 112A-F can be attached to a frame of a photo booth structure that can enclose an area where a pallet is imaged, as described herein.

The cameras 110A-C can be set to one or more different configurations. For example, 65 MP cameras can be used. 65 MP cameras can have a 65 MP sensor with 9344×7000 resolution. Using 18 mm lens, the cameras can be positioned 1 m away from the turntable (e.g., working distance). The cameras can have FOVs of 1.661 m×1.244 m, thereby capturing 2.81 pixels of a pallet label per 0.5 mm. If the cameras are positioned 1.5 m away, the FOVs can be 2.491 m×1.244 m. If the cameras are positioned 1.7 m away, as described throughout this disclosure, the cameras can have FOVs of 2.823 m×2.115 m, thereby capturing 1.65 pixels of the pallet label per 0.5 mm. Using 21 mm lens, the cameras can be positioned 2 m away from the turntable. The FOVs can be 2.847 m×2.133 m, thereby capturing 1.65 pixels of the pallet label per 0.5 mm.

As another example, 127 MP cameras can be used. 127 MP cameras can have a 127.6 MP sensor and 13400×9528 resolution. Thus, such cameras can generate high resolution images and/or be placed at farther working distances from the turntable than 65 MP cameras. Using 55 mm lens, the cameras can be positioned 3.5 m away from the turntable. The cameras can have FOVs of 2.941 m×2.091 m, thereby capturing 2.28 pixels of the product label per 0.5 mm. When the cameras are positioned 1.7 m away, the FOVs can be 1.47 m×1.05 m, thereby capturing 4.56 pixels of the product label per 0.5 mm. Using 21 mm lens, the cameras can be positioned 1.5 m away from the turntable. The cameras can therefore have FOVs of 2.135 m×1.6 m. When the cameras are positioned 2 m away, the FOVs can be 2.847 m×2.133 m. Thus, the cameras can capture 1.65 pixels of the product label per 0.5 mm.

FIG. 4B depicts a camera configuration for profiling items. In this example configuration of the pole 108, three cameras 110A, 110B, and 110C can be positioned vertically along the pole 108. As described herein, the cameras 110A-C can be moved up and down and/or left and right on the pole 108. Placement of the cameras 110A-C can depend on a working distance of the pole 108 from the turntable described herein. Placement of the cameras 110A-C can also depend on size of a pallet being imaged and/or placement, positioning, and/or distances of one or more separate lighting structures, as described throughout this disclosure. The pole 108 can also include light bars (e.g., strobe lights) 112A-B that are vertically along the vertical pole 108. As shown, the light bar 112A can be positioned between the camera 110A and the camera 110B. The light bar 112B can be positioned between the camera 110B and the camera 110C. One or more additional or fewer light bars can be positioned along the vertical pole 108. Moreover, as described in reference to FIGS. 4C-E, one or more light bars can be positioned along a separate vertical pole that can be offset and positioned a certain distance away from the cameras 110A-C. The lights 112A-B can be positioned around the cameras 110A-C as shown in FIG. 4B to provide uniform lighting for FOVs of the cameras 110A-C.

As described in reference to FIG. 3C, one or more of the lights 112A-F can be red lights. Moreover, red filters or bandpass filters can be applied to the cameras 110A-C as described herein.

In some implementations, one or more of the cameras 110A-C can be tilted at certain angles. For example, one of the cameras 110A-C can be tilted at a 30 degree angle. One or more or all of the cameras 110A-C can be tilted at 90 degree angles. In some implementations, the cameras 110A-C can also be positioned at varying heights along the vertical pole 108.

In some implementations, the pole may have only two cameras, 110A-B. The cameras 110A-B can have 65 MP sensors. The cameras 110A-B can have 1.375 m×1.22 m FOVs with 33 mm lens. When the pole 108 is placed a working distance of 1.9 m from the turntable, the cameras 110A-B can have FOVs of 1.6 m×1.22 m. Pallet label dimensions from this working distance can be 2.86 pixels per 0.5 mm. When the pole 108 is placed a working distance of 1.7 m from the turntable, the cameras 110A-B can have FOVs of 1.45 m×1.09 m FIGS. 4C-E depicts another camera and lighting configuration for profiling items, with FIG. 4C showing a perspective view, FIG. 4D showing a front view (from the perspective of the turntable and/or pallet being imaged), and FIG. 4E showing a side view. In this example, the vertical profiling structure 400 (e.g., the vertical pole 108 described throughout) includes 3 cameras 110A-C. The cameras 110A-C can be mounted along the horizontal mounting structures 136A-C, as described in reference to FIG. 4A. In this example, vertical light mounting structures 410A-B (e.g., the light pole 108 described throughout) can be positioned and offset at distances $D_3$ (346) and $D_4$ (348) from the vertical profiling structure 400, as described above with regard to FIG. 3C. The vertical structures 410A-B can each include two light bars 112A-112B and 112C-D that can be vertically aligned along the vertical structures 410A-B. In some implementations, the light bars 112A-D can be affixed at positions along the vertical structures 410A-B so that they span the height of the pallet when it is positioned on top of the turntable 104 and/or the conveyors 102/106. As a result, the light bars 112A-D can provide light along an entire vertical height of a tallest pallet. As an illustrative example, if the biggest pallet is 49 inches tall, then the vertical structure can be 48-50 inches tall such that the light bars 112A-D positioned thereon can provide uniform lighting from a top to a bottom of the pallet.

Figure 5A:
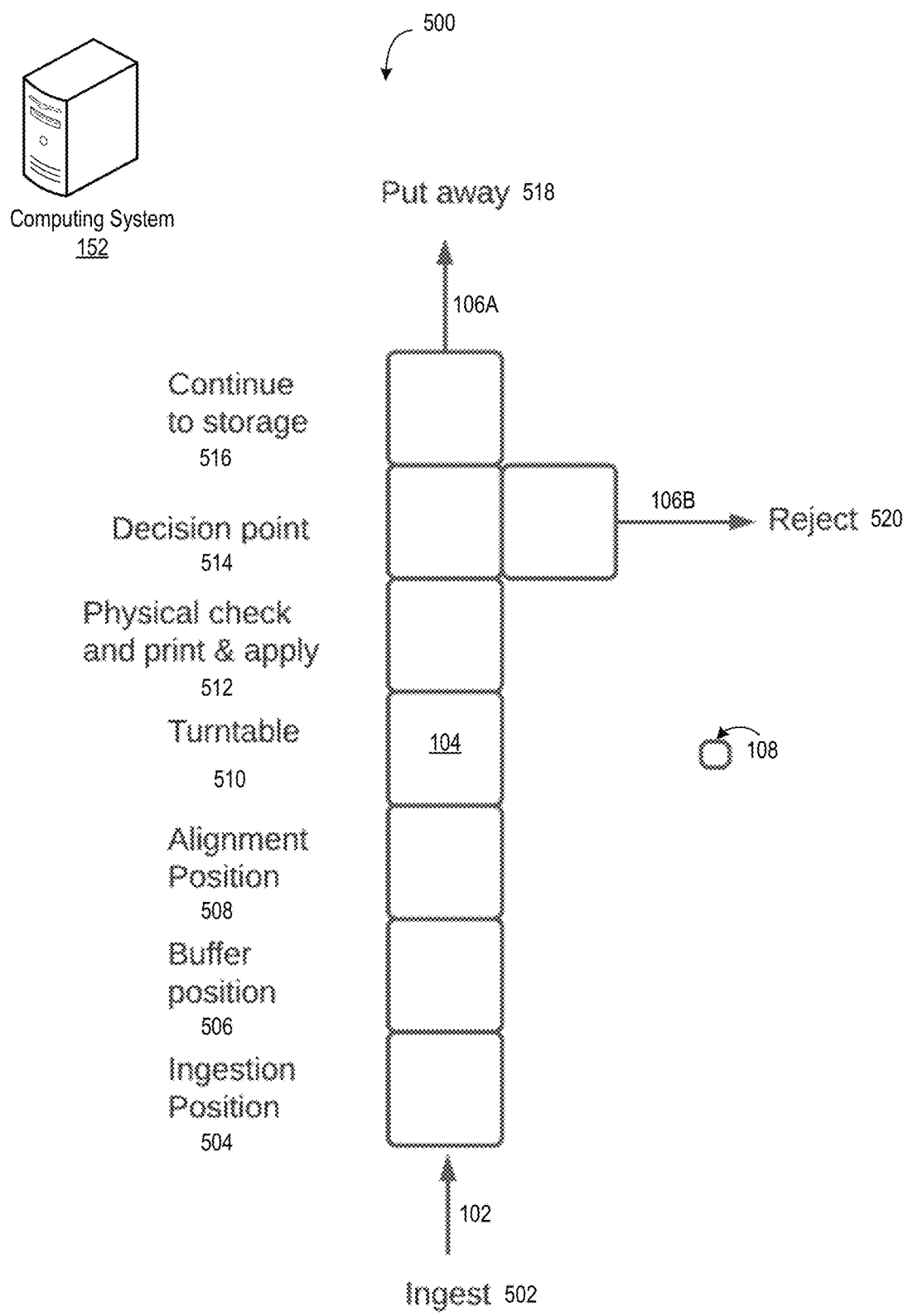
FIG. 5A is a block diagram of a process for profiling an item using the techniques described herein.
Figure 5B:
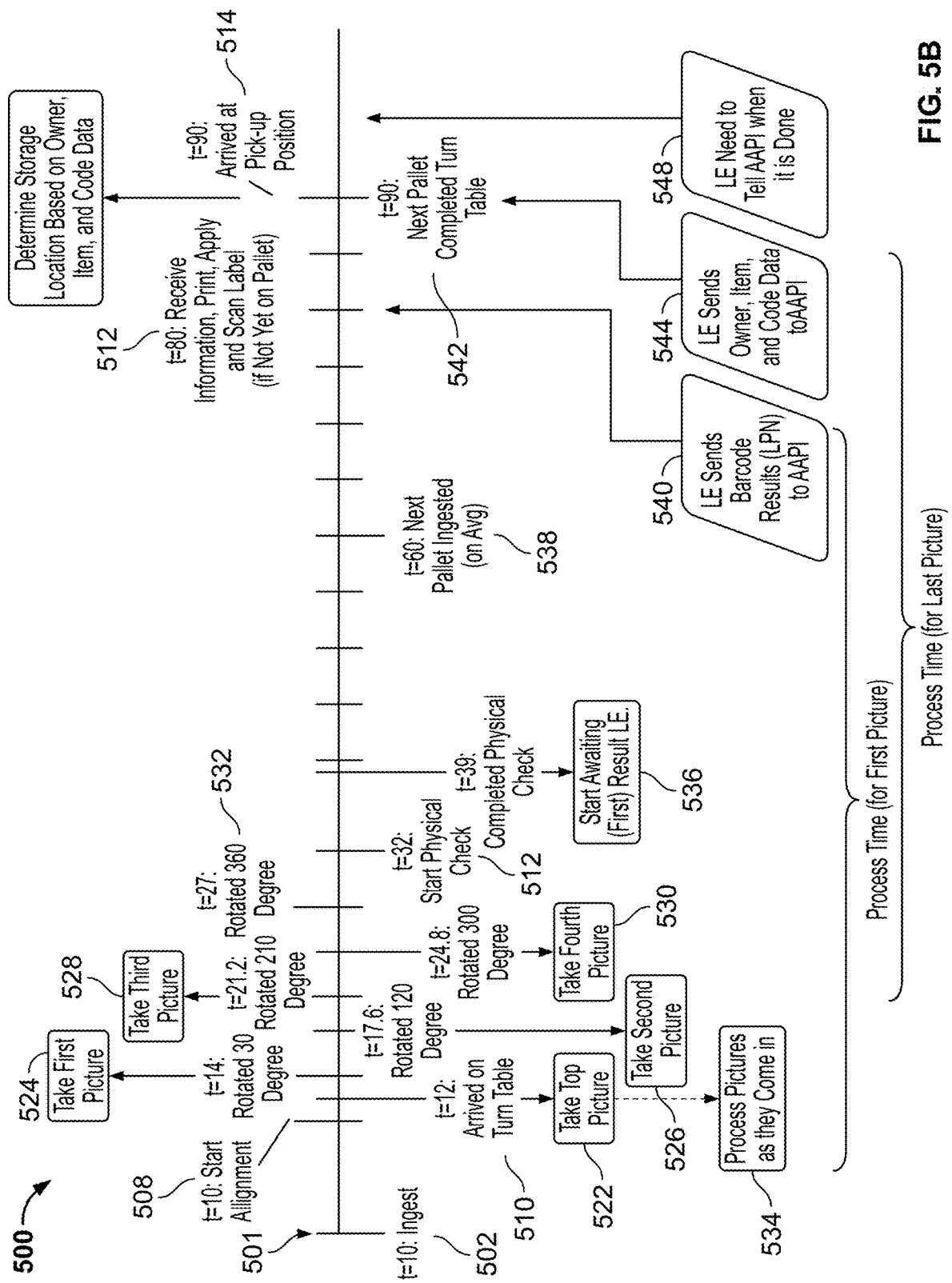
FIG. 5B is a timeline of the process for profiling an item in reference to FIG. 5A.

FIG. 5A is a block diagram of a process 500 for profiling an item using the techniques described herein. FIG. 5B is a timeline 501 of the process 500. One or more blocks of the process 500 can be performed by the computing system 152. The process 500 can also be performed by one or more other computing systems, computers, servers, remote servers, and/or computing devices. For simplicity and illustrative purposes, the process 500 is described from the perspective of the computing system 152.

Referring to the process 500 in both FIGS. 5A-B, a pallet can be ingested (502) at an ingestion position 504. As described throughout this disclosure, the pallet can be put on the on conveyor belt 102. As soon as the pallet is ingested (502), the computing system 152 can start a clock or timer. The clock or timer can operate in seconds. In some implementations, the clock or timer can operate in milliseconds.

For a predetermined length of the conveyor belt 102, the pallet can be in a buffer position 506. The buffer position 506 can provide a window of time for one or more of the components described herein to reset and/or for computational resources to be reallocated such that the components can be ready to profile the pallet.

At an alignment position 508, the pallet can be aligned or otherwise straightened on the conveyor belt 102. As a result, the pallet can enter the turntable 104 at a turntable position 510 without being angled in a particular direction. Alignment devices (e.g., refer to FIG. 1) can be positioned along sides the conveyor belt 102 at the alignment position 508. Such devices can align or straighten the pallet on the conveyor belt 102. Alignment can start after the buffer position 506, at a time of t=10 seconds.

Once aligned, the pallet can be routed onto the turntable 104. In the turntable position 510, cameras on the vertical pole 108 can capture images of the pallet as it is rotated. The pallet can arrive at the turntable position at t=12 seconds. At this point, a top picture of the pallet can be taken (522). As the pallet is rotated, additional pictures of different sides of the pallet can be captured. For example, at time=14, the pallet can be rotated 30 degrees and a first side picture can be taken of the pallet (524). At t=17.6, the pallet can be rotated 120 degrees and a second side picture can be taken (526). At t=21.2, the pallet can be rotated 210 degrees and a third side picture can be taken (528). At t=24.8, the pallet can be rotated 300 degrees and a fourth side picture can be taken (530). By t=27 seconds, the pallet can be rotated a full 360 degrees (532). The captured pictures can be transmitted to the computing system 152 and processed as they are received by the computing system 152 (534). In some implementations, the images can be processed once all of the images of the pallet are captured (e.g., by t=27 seconds, once the pallet has been fully rotated and images of every side of the pallet have been captured). The point at which a first picture of the pallet is processed can begin a timer indicating a processing time of that picture. For example, as depicted in the timeline 501, the first picture can be processed beginning at t=12 seconds and can complete processing by t=80 seconds. As another example, the last picture can be processed beginning at t=24.8 seconds (e.g., when the picture is captured) and can complete processing by t=90 seconds. Processing of pictures individually and/or together can be completed in one or more different timeframes based on computational resources that are available and processing power.

It should be realized that additional pictures can be taken of the pallet during a full rotation. It should also be realized that pictures can be taken at different intervals of degrees. For example, a first picture can be taken at a 30 degree interval. Subsequent pictures can then be captured at 90 degree offsets until the pallet completes a full rotation. As another example, each of the images can be captured at 90 degree offsets until the pallet completes a full rotation.

Still referring to the process 500 in FIGS. 5A-B, a physical check and print & apply can be performed (512) after the pictures of the pallet are captured and being processed. The physical check of the pallet can begin, for example, at t=32 seconds. The physical check can be performed by one or more automated warehouse devices. The devices can be configured to review the pallet and ensure that it can be safely put in a location in the warehouse. For example, the devices can check whether wooden boards of the pallet are damaged and/or whether the pallet has a lean. Damage and/or lean can comprise an ability to safely move the pallet throughout the warehouse and also to store the pallet therein.

In some implementations, the physical check can be completed by t=39 seconds. The physical check can take longer or less time, depending on a size of the pallet and/or items that are being reviewed during the physical check. Moreover, at t=39 seconds, results for processing the first picture can start to be expected (536). The results can also be expected any time before or after t=39 seconds.

Another pallet can be ingested at approximately t=60 seconds (538). On average, a new pallet can be ingested (502) every minute. One or more other timeframes can be used for ingesting pallets and profiling such pallets in the process 500.

The computing system 152 can also perform the print & apply process in 512. This process can occur at a later time, such as t=80 seconds. The print & apply process can, for example, be performed only upon the computing system 152 determining that a pallet label cannot be identified from the pictures that are processed. The computing system 152 can thus receive or determine barcode results (540). This can include applying image processing techniques to the pictures to determine whether the barcode or other unique identifier, such as the label described herein, can be identified from any of the pictures.

The print & apply process can include checking whether the label is in an exact position on the pallet that is preferred or otherwise required by the warehouse for storage. Therefore, even if the computing system 152 can identify the label from the images, the label may still be in an undesirable position/location on the pallet. Thus, the computing system can print a copy of the identified label and the printed copy can be applied to the pallet in the desired, exact position. The label can be required to be in the exact position to facilitate faster and accurate scanning of the label to identify the pallet and move the pallet around the warehouse.

If the label is identified and it is in the exact, desired position, then the computing system 152 may not have to generate, print, and apply a new label. If, on the other hand, the label cannot be identified, then the computing system 152 can automatically generate a label as a placeholder. The generated label can be assigned to the pallet, printed, and then automatically attached to the pallet in the exact, desired position. The label can be attached to the pallet by an automated warehouse device.

At t=90 seconds, the pallet can be moved to a decision point 514. At the decision point 514, the computing system 152 can determine where the pallet can be routed in the warehouse. Thus, the computing system 152 can determine a storage location of the pallet (546). The computing system 152 can determine the storage location based on receiving (e.g., from a WMS) or retrieving (e.g., from a pallet profiles data store) information associated with the pallet (544). The information can include owner information, item information, and a code data.

At this point, the computing system 152 can determine whether the label was accurately identified in the pictures. If, for example, the label was accurately identified and in the exact, desired position or the label was accurately identified but not in the exact desired position, then the computing system 152 can still determine that the label was accurately identified. The pallet can be routed to continue to storage (516) along the conveyor belt 106A. Thus, the pallet can be put away (518) in an organized storage location. At this point, the computing system 152 may or may not have identified additional information about the pallet from the pictures. The computing system 152 can identify the additional information at any time between receiving the pictures of the pallet, routing the pallet to the organized storage location, and/or once the pallet is stored at the organized storage location. Thus, the pallet can be routed to the organized storage location for put away (516) even if additional characteristics about the pallet have not yet been identified. As a result, warehouse efficiency can improve and the computing system 152 can continue to identify other pallets as they are ingested (502).

The organized storage location can be selected by the computing system 152 and based on the pallet information that was received, accessed, or retrieved (544). For example, the pallet information can indicate a particular storage location where all pallets of this same owner are to be stored. The pallet information can also indicate storage conditions that must be met for the pallet (e.g., the pallet must be stored in a cold storage area). The computing system 152 can also use the pallet information to automatically determine an optimal storage location for the pallet (e.g., height information about the pallet can limit locations where the pallet can be stored while optimizing on available space in the warehouse).

As another example, if the label was not accurately identified (e.g., the label is on the pallet but the label cannot be read from the pictures of the pallet) or a label had been generated for the pallet as a placeholder (e.g., none of the pictures indicate that a label is present on the pallet), then the computing system 152 can determine at the decision point 514 that the pallet is rejected (520). A rejected pallet is one that cannot be routed for put away (516) to an organized storage location. After all, it is uncertain where the pallet is supposed to be stored in the warehouse. The pallet can be routed down the off conveyor belt 106B to a temporary storage location. As described further below, once in temporary storage, the pallet can be manually inspected by a warehouse worker to identify the label or other characteristics about the pallet that can then be used to determine an organized storage location for the pallet. Once in temporary storage, the warehouse worker can also determine the organized storage location for the pallet based on analyzing the pictures that were captured and previously processed by the computing system 152. In some implementations, the pallet can be automatically inspected by one or more warehouse devices once in temporary storage.

At time=90 seconds, the second pallet that was ingested at t=60 seconds, can be completed a full rotation on the turntable 104 (542). At some later time in the timeline 501, the computing system 152 can determine when images are no longer being captured of a pallet and/or no more pallets are being ingested (548). The computing system 152 can also stop the clock or timer at this point. As described throughout this disclosure, the process 500 can be performed for each pallet that is entering the warehouse.

Figure 6:
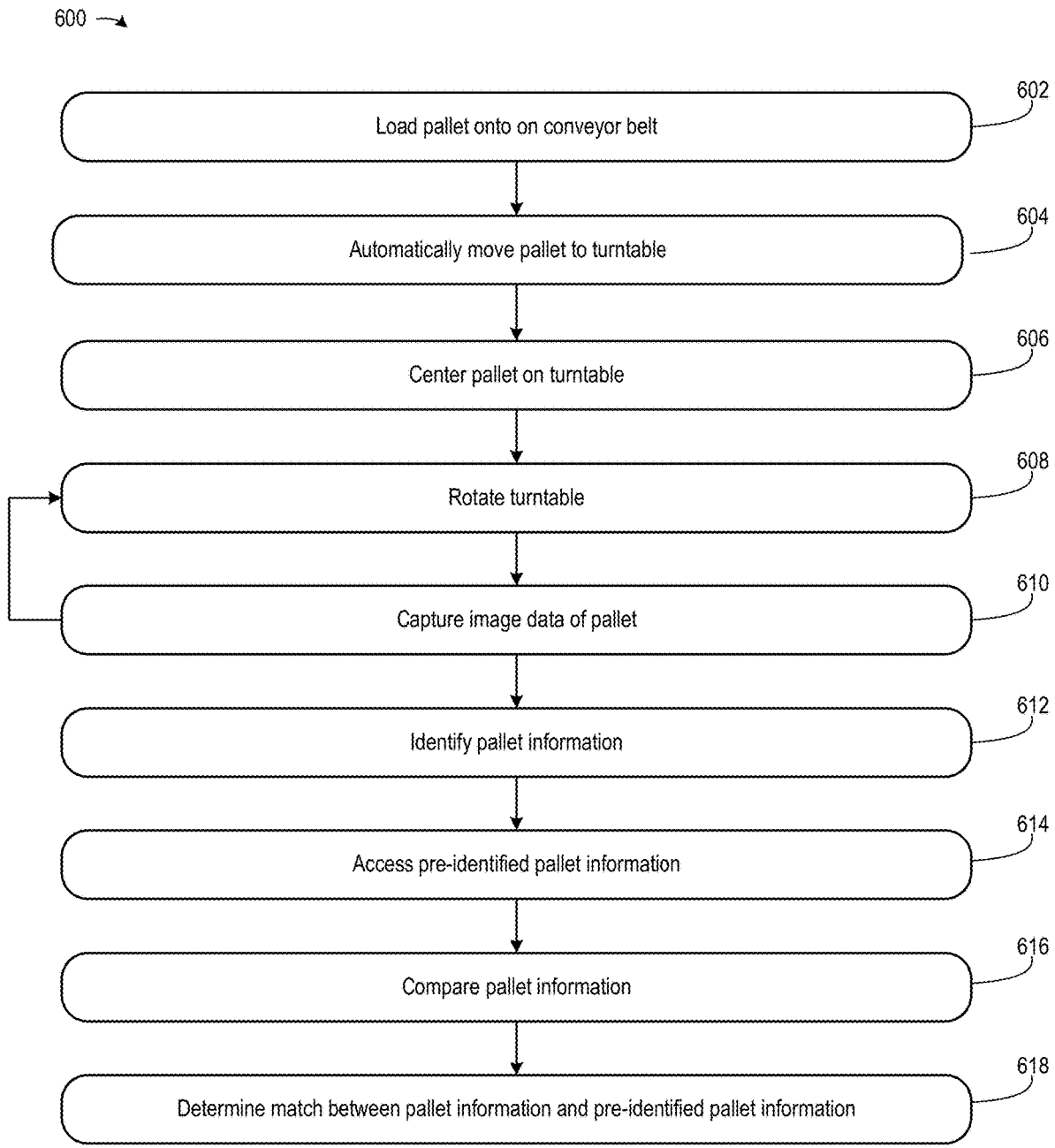
FIG. 6 is a flowchart of a process for profiling a pallet that enters the warehouse environment.

FIG. 6 is a flowchart of a process 600 for profiling a pallet that enters the warehouse environment. One or more blocks in the process 600 can be performed by the computing system 152. The process 600 can also be performed by one or more other computing systems, computers, servers, remote servers, and/or computing devices. For simplicity and illustrative purposes, the process 600 is described from the perspective of the computing system 152.

Referring to the process 600, a pallet can be loaded onto an on conveyor belt in 602. As described herein, the pallet can be automatically or manually moved onto the conveyor belt. The pallet can be placed on the conveyor belt by a human worker, a forklift, or an automated device in the warehouse that is configured to automatically move pallets around the warehouse. The pallet can then be automatically moved to a turntable in 604. Automatically moving the pallet to the turntable can include readjusting or straightening the pallet on the conveyor belt.

Once the pallet is on the turntable, the pallet can be centered (606). To center the pallet, the computing system 152 can receive image data of the pallet at a time when the pallet is injected onto the turntable. Using image analysis and processing techniques, the computing system 152 can identify a midpoint of the turntable and determine whether the pallet is positioned at the midpoint or off from the midpoint. Using machine learning and/or trained models, the computing system 152 can identify how far away the pallet is from the midpoint of the turntable and how much the pallet needs to be moved to be centered at the midpoint. The computing system 152 can then instruct components of the turntable (e.g., rollers) to automatically readjust the position of the pallet on the turntable.

Centering the pallet 120 in 606 is advantageous to ensure that the cameras described herein capture images of the pallet from uniform distances, angles, and FOVs. As a result, the images can be more easily and accurately stitched together for use in identifying a label of the pallet and profiling the pallet (e.g., identifying characteristics about the pallet, such as damage, lean, and dimensions).

After centering the pallet, the turntable can rotate (608). For example, the computing system 152 can instruct the turntable to rotate at a desired speed and/or direction. The speed and/or direction of rotation can be predetermined and applied for every pallet that is ingested. In some implementations, the speed and/or direction can be adjusted and based at least in part on a configuration of the pallet or other pallet-identifying information (e.g., size, weight, etc.).

As the turntable rotates, image data of the pallet can be captured (610). In some implementations, the turntable can continuously rotate without stopping such that images can be captured at various predetermined points along the continuous rotation. In some implementations, the turntable can rotate the pallet in increments (608) and stop such that the image data can be captured (610), then rotate the pallet again (608). 608-610 can loop until all sides of the pallet are captured by the cameras. The turntable can rotate in a variety of increments, such as every 15 degrees, 45 degrees, or 90 degrees. In some implementations, the increments of rotation can be consistent or they can be varied. Thus, as described herein, images can be captured at predetermined intervals of rotations (e.g., every 30 degrees, every 90 degrees, first at 30 degrees then every 90 degrees) until a full rotation of the pallet is completed. The images can also be captured at predetermined time intervals (e.g., every 2 seconds, every 5 seconds, etc.). Times at which images are captured can also be determined based on a speed at which the pallet is being rotated on the turntable. The images can also be captured at consistent or varied increments of rotation. For example, the turntable can initially rotate 45 degrees, the images can be captured, and then the turntable can rotate 90 degrees. Sometimes, the rotations can be dynamically determined. For example, the increments of rotation can be determined based on analysis of each captured image (e.g., refer to 612). As an illustrative example, if a certain increment of rotation caused glare to appear in the image data, then the computing system 152 can determine that the pallet should be rotated in increments of 5 degrees, or some other nominal amount, in either direction (e.g., clockwise or counterclockwise). Additional images can then be captured at the 5 degree increments of rotation and/or until a sufficiently good image of a particular side or portion of the pallet is captured in the image data.

In some implementations, some cameras can be configured to capture images of the pallet at a first time and other cameras can be configured to capture image data of the pallet at a second time, wherein the first and second times are different. Images can be captured of every side of the pallet as well as a top and a bottom of the pallet. Multiple images of each side of the pallet can also be captured. In some implementations, only one image of each side of the pallet can be captured.

As the images are captured, they can be transmitted to the computing system 152 for processing. The images can also be transmitted together to the computing system 152 once the pallet is rotated a full 360 degrees and/or all the images of the pallet are captured.

The computing system 152 can identify pallet information from the images in 612. Image processing techniques can be used to identify or otherwise detect information about the pallet. For example, a label or other unique identifier of the pallet can be identified using optical character recognition (OCR) techniques. Once the label is identified, the computing system 152 can determine other information about the pallet, such as owner information, contents of the pallet, storage location of the pallet, storage requirements, etc. Barcode detection techniques can also be used to identify the pallet. Machine learning algorithms, methods, and trained models can also be used to identify information about the pallet. As described throughout this disclosure, the computing system 152 can at least identify the label of the pallet in 612. Once identified, the label can be used to determine a storage location of the pallet. The computing system 152 can identify additional information about the pallet at a same time and/or a later time.

The computing system 152 can access pre-identified information about the pallet in 614. This information can be retrieved from a manifest that is completed by a shipper or other relevant stakeholder. For example, this information can be included in the manifest of a truck that has recently arrived to the warehouse. In some implementations, this information can be received from a WMS and/or a data store, as described throughout this disclosure. The pre-identified pallet information can include information provided to the warehouse before the pallet arrived/was delivered to the warehouse. For example, the information can be received from a vendor, customer, shipper, or other relevant stakeholder in the supply chain. In some implementations, the pre-identified pallet information can be specific to the particular pallet that is being identified. In some implementations, the pre-identified pallet information can be generic and applicable to a variety of different pallets. The variety of different pallets can include some same features. For example, the pallets can contain different types of products but they can be associated with a same customer code. The pre-identified pallet information can therefore include the customer code.

The computing system 152 can then compare the identified pallet information to the pre-identified pallet information (616). Thus, the computing system 152 can use the pre-identified information to filter down possible identifications or other information about the pallet. The computing system 152 can match the label that was identified for the pallet in 612 with the pre-identified pallet information (which can include metadata). By matching the information, the computing system 152 can link or otherwise associate the pallet with a pallet profile that is stored and used for identifying and moving the pallet in the warehouse. The computing system 152 can optionally determine whether the pre-identified pallet information is missing any of the information that was identified in 612. If so, then the computing system 152 can update the pre-identified pallet information accordingly. Comparing the information can be beneficial to efficiently generate a more accurate, up-to-date profile for the pallet without requiring human intervention or manual inspection.

The computing system 152 can determine a match between the pallet information and the pre-identified information in 618. This can include verifying one or more pieces of information about the pallet. For example, using machine learning trained models, the computing system 152 can verify that the contents of the pallet are what the pre-identified pallet information says the contents will be. The computing system 152 can also verify information such as an owner that is associated with the pallet, storage conditions, and/or a storage location.

In some implementations, the computing system 152 can also determine an accuracy of the information that was identified in 612. In matching the information, the computing system 152 can determine whether a level of accuracy in identifying the pallet information exceeds a threshold value (e.g., 90% accuracy). Where, for example, the computing system 152 is unable to identify the label of the pallet from the images, the accuracy level can be 0% or a value that is less than the predetermined threshold value. The accuracy level can also be used by the computing system 152 to determine whether the pallet can be routed to an organized storage location or a temporary storage location. If the pallet information is accurate above the predetermined threshold value, then the pallet can be automatically moved to the organized storage location. If, on the other hand, the pallet information accuracy does not exceed the predetermined threshold value (e.g., the label cannot be identified from the image data), then the pallet can be routed to the temporary storage location for further inspection and review.

Moreover, in some implementations, if accuracy is low or the pallet cannot be matched with pre-identified pallet information, the computing system 152 can optionally instruct the turntable to rotate the pallet a second time. The turntable can be rotated in an opposite direction and/or at a different speed. The turntable can also be rotated in the same direction and/or at the same speed. One or more different images can be captured of the pallet. Blocks 612-618 can be repeated based on the newly captured image data. In some implementations, pallet information can be identified in 612 by combining and/or comparing the image data received from the first profiling process and the image data received from the second profiling process. If the pallet information accuracy exceeds the threshold value after the second profiling process, then the pallet can be moved onto the off conveyor belt to the organized storage location identified by the pallet information. If the pallet information accuracy does not exceed the threshold value after the second profiling process, then the pallet can be routed onto the off conveyor belt to the temporary storage location.

Figure 7:
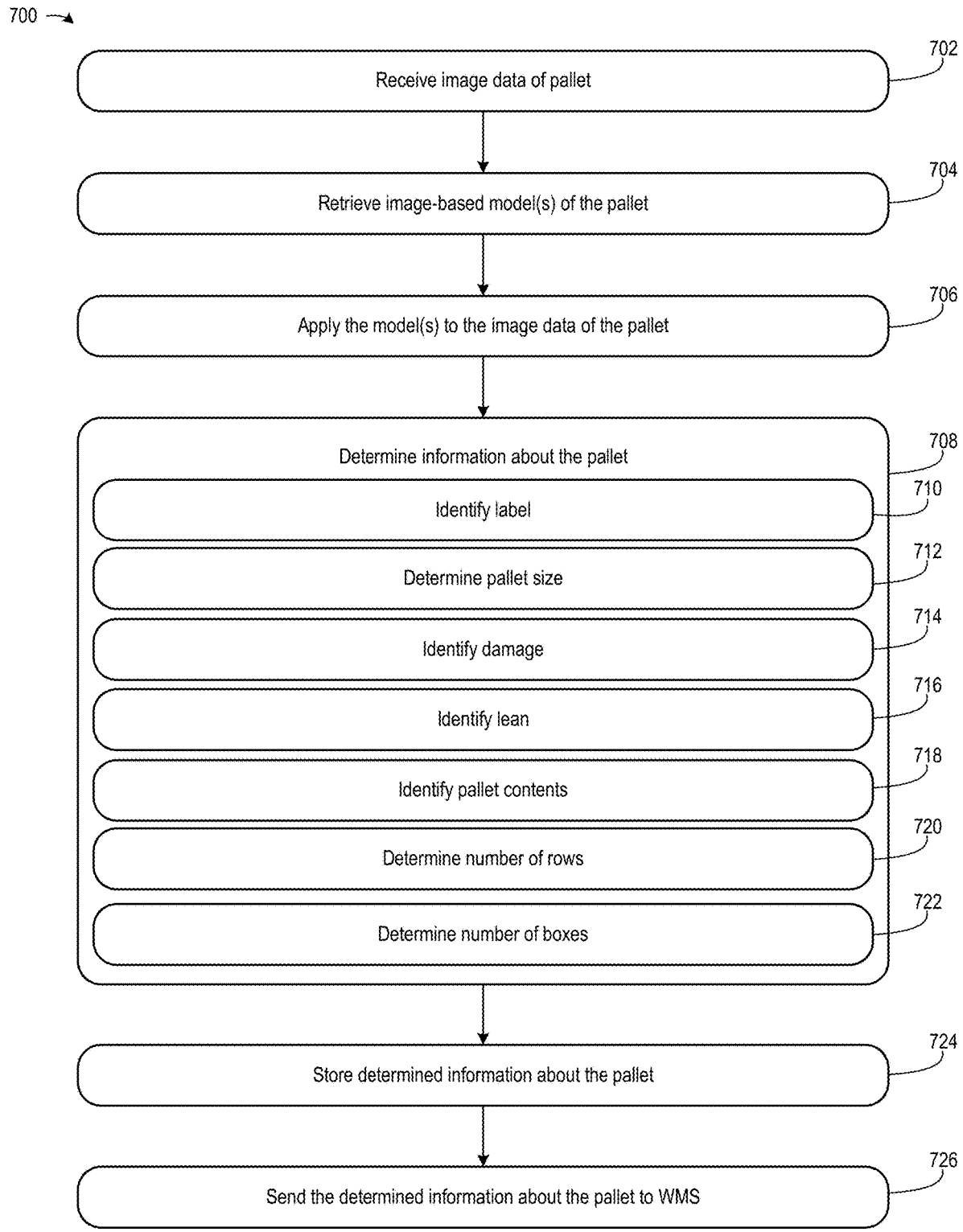
FIG. 7 is a flowchart of a process for identifying pallet information from image data of the pallet.

FIG. 7 is a flowchart of a process 700 for identifying pallet information from image data of the pallet. One or more blocks in the process 700 can be performed by the computing system 152. The process 700 can also be performed by one or more other computing systems, computers, servers, remote servers, and/or computing devices. For simplicity and illustrative purposes, the process 700 is described from the perspective of the computing system 152.

Referring to the process 700, the computing system 152 can receive image data of a pallet in 702. In some implementations, the process 700 can be performed during the process 600, when images are being captured of the pallet and transmitted to the computing system 152 as they are captured. In some implementations, the process 700 can be performed during different stages of profiling the pallet, as described in reference to FIGS. 5A-B (e.g., once all the images are captured and transmitted to the computing system 152, during physical check and print & apply 512, the decision point 514, between times t=12 seconds and t=90 seconds, etc.).

The computing system 152 can retrieve image-based models of the pallet (704). The image-based models can be stored in a pallet profile data store as described herein. The models can also be stored in one or more other data stores, databases, cloud servers, or other remote data stores and/or servers. The models can be trained using machine learning techniques. The models can be trained to identify different characteristics of the pallet from the image data. The models can be generated using different training sets of data. The models can also be trained and/or refined using image data and analysis that was performed in real-time to profile different pallets.

The computing system 152 can apply one or more of the models to the image data of the pallet in 706. By applying the models to the image data of the pallet, the computing system 152 can determine information about the pallet in 708. For example, a label of the pallet can be identified (710). The label can be identified using machine learning trained models and/or optical character recognition (OCR) techniques. OCR techniques can also be used to detect any text that may appear on the pallet. The text and/or label can be further processed (e.g., using machine learning trained models) to identify additional information about the pallet, such as a pallet name, owner information, and an organized storage location for the pallet.

A size of the pallet can also be determined in 712. Since the image data is captured from a uniform offset degree (e.g., 90 degrees), height, and working distance, the computing system 152 can more efficiently and accurately identify information such as pallet height, width, length, and/or depth. For example, a machine learning model can be trained to differentiate and identify pixels indicative of a background from pixels indicative of the pallet. The computing system 152 can use known distance information, such as the working distance, and the pixels indicative of the pallet to infer dimensions of the pallet. Height, for example, can be inferred by triangulating pixels from multiple images, wherein those pixels represent a side and a top of the pallet.

The computing system 152 can also identify damage to the pallet in 714. A model can be trained using machine learning to identify the damage. For example, the model can receive images of pallets with damage and images of pallets without damage. Machine learning techniques and algorithms can be used on the images to determine probabilities that certain features in the test image datasets are indicative of damage. This trained model can then be applied to the image data received in 702 to identify whether damage appears in any of the image data of the pallet.

Similarly, a lean of the pallet can be identified in 716. The lean of the pallet can be identified with models that are trained using machine learning techniques as described in reference to the models that are used for detecting damage.

Contents of the pallet can be identified 718. This can include retrieving or otherwise accessing pre-identified information about the pallet, which can indicate what the contents should be for the particular pallet. Machine learning techniques can also be used to determine the contents of the pallet.

Moreover, the computing system 152 can determine a number of rows on the pallet in 720 and a number of boxes (e.g., cases) on the pallet in 722. As described herein, machine learning trained models can be used. The models can be used, for example, to count a number of rows on the pallet as well as a total quantity of boxes on the pallet.

Any of 712-722 can be performed in combination. In some examples, only one or fewer than all 712-722 can be performed. Moreover, 712-722 can be performed in any order.

Still referring to the process 700, the computing system 152 can store the determined information about the pallet (724). The information can be stored in a profile associated with the pallet. The association can be made based on the identified label or other unique identifier of the pallet. As mentioned in reference to FIGS. 5A-B, if the label cannot be identified for the pallet, then a placeholder label can be generated for the pallet. The placeholder label can then be linked or associated with a new profile for the pallet, which can be populated with pallet information that is determined automatically by the computing system and/or manually by a warehouse worker.

The determined pallet information can also be sent to the WMS described herein (726). The WMS can accordingly update the pallet profile with information that is determined by the computing system 152 in 708-722. The WMS can also use the determined pallet information to move the pallet in the warehouse or make other modifications to movement, storage, or other aspects of the supply chain that are associated with this pallet. In some implementations, the computing system 152 can update the pallet profile information and then transmit the updated pallet profile to the WMS.

Figure 8:
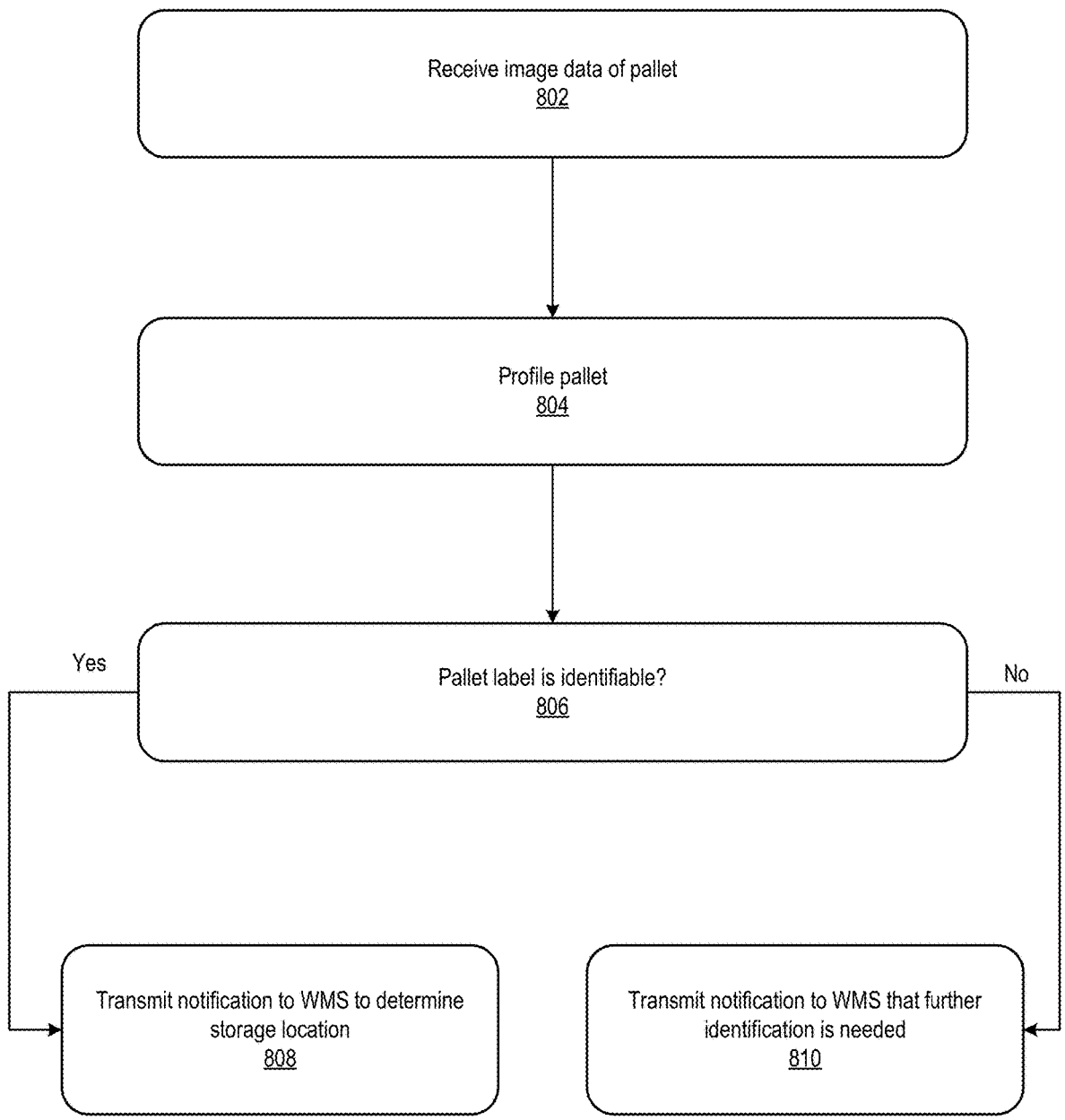
FIG. 8 is a swimlane diagram of a process for profiling and storing a pallet in the warehouse environment.

FIG. 8 is a swimlane diagram of a process 800 for profiling and storing a pallet in the warehouse environment. The process 800 is described in reference to the system 100 in FIG. 1. One or more blocks of the process 800 can be performed by the computing system 152. One or more blocks of the process 800 can also be performed by other computing systems, servers, and/or computing devices, such as the WMS 154.

Referring to the process 800, the computing system 152 can receive image data of a pallet in 802, as described throughout this disclosure. The computing system 152 can then profile the pallet in 804 (e.g., refer to FIGS. 6-7). Based on the pallet profiling, the computing system 152 can determine whether a pallet label is identifiable (806). For example, the computing system 152 can determine that the label cannot be clearly identified from the image data. As another example, the computing system 152 can determine that the label can be clearly identified.

If the label is identifiable in 806, then the computing system 152 can transmit a notification to the WMS 154 to determine a storage location for the pallet in 808. The WMS 154 can determine the storage location using the techniques described herein. For example, the WMS 154 can access a data store to determine where the identified pallet (e.g., based on a customer code, identified owner, etc.) can be stored. The WMS 154 can generate control instructions to automatically move the pallet to the identified storage location. In some implementations, the computing system 152 can determine the storage location for the pallet. Moreover, the computing system 152 and/or the WMS 154 can determine control instructions that can be used to automatically route the pallet to the determined storage location along one or more conveyor belts in the warehouse.

If the label is not identifiable in 806, then the computing system 152 can transmit a notification to the WMS 154 that further identification is needed (810). As described herein, because the pallet's label is not identifiable via image analysis and processing in 804, additional identification may be needed. For example, the WMS 154 can use stored information, pre-identified pallet information, manifests, and/or information from relevant stakeholders in the supply chain to identify the pallet.

Based on the notification in 810, the WMS 154 can also generate control instructions that can be used to automatically route the pallet to a temporary storage location along one or more conveyor belts in the warehouse. The pallet can be kept in temporary storage until it can be identified by the WMS 154 and/or by a warehouse worker. For example, as described herein, the computing system 152 and/or the WMS 154 can provide the image data of the pallet to a user device (e.g., the user device 156) of the warehouse worker. The user device can output the image data at a graphical user interface (GUI) display. The warehouse worker can then review the image data and/or manually inspect the pallet in the temporary storage location in order to identify one or more features or information about the pallet.

In some implementations, and as described in reference to FIGS. 5A-B, the computing system 152 and/or the WMS 154 can generate a placeholder label for the pallet when the pallet cannot be identified in 806. In 810, the placeholder label can be transmitted to the WMS 154 and/or the warehouse worker's device. The warehouse worker can use the placeholder label to locate the pallet in the temporary storage location. The warehouse worker can then review the pallet, identify information about the pallet from manual inspection, and provide the identified information as input to the user device. The identified information can then be stored, by the computing system 152 and/or the WMS 154 in association with the placeholder label. The placeholder label, therefore, can become the unique identifier of the pallet in the warehouse. Information collected or determined about the pallet can be linked or otherwise associated to the placeholder label.

The process 800 can be repeated for each pallet that enters the warehouse and/or each pallet that is ingested and profiled, as described throughout this disclosure. Moreover, in some implementations, the process 800 for a first pallet may not finish before the process 800 of a second pallet begins (e.g., refer to FIG. 5B). Starting the process 800 for the second pallet while the process 800 of the first pallet is still being executed can be advantageous to maximize throughput and maintain warehouse efficiency. As an example, the warehouse worker at the user device 156 can be identifying the first pallet during the process 800 while at the same time, the computing system 152 can be profiling the second pallet in 804. As mentioned, performing the process 800 at a same time for multiple pallets can be advantageous to improve warehouse efficiency and to move the pallets to their designated organized storage locations to avoid bottlenecks or other holdups in the warehouse.

Figure 9:
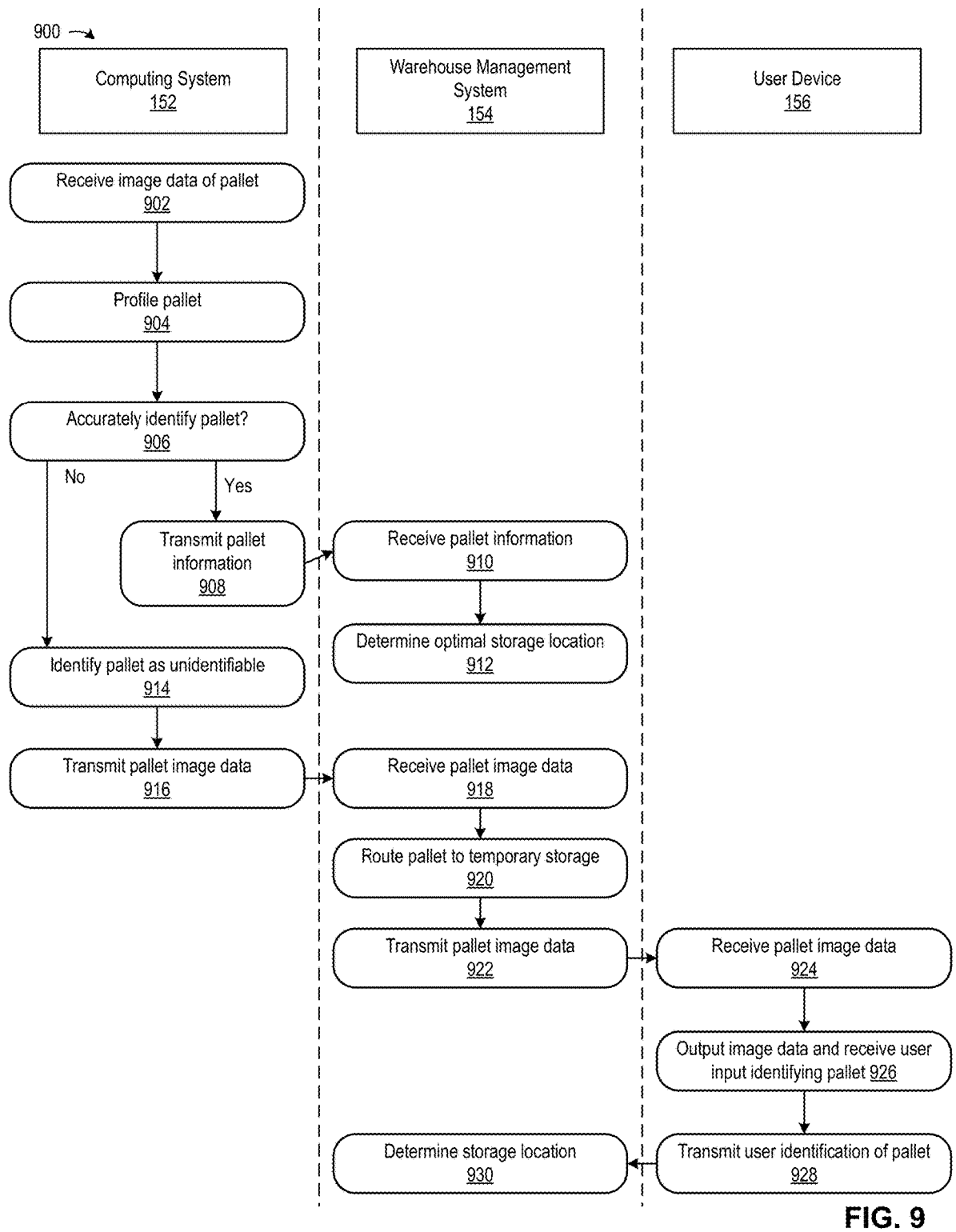
FIG. 9 is a swimlane diagram of a process for determining a storage location for a profiled pallet.

FIG. 9 is a swimlane diagram of a process 900 for determining a storage location for a profiled pallet. The process 900 is described in reference to the system 100 in FIG. 1. One or more blocks of the process 900 can be performed by the computing system 152, the WMS 154, and the user device 156. One or more blocks of the process 900 can be performed by other computing systems, servers, and/or computing devices.

Referring to the process 900, the computing system 152 can receive image data of the pallet in 902 as described throughout this disclosure. The computing system 152 can then profile the pallet using the image data (904) (e.g., refer to FIGS. 6-8). Once profiled, the computing system 152 can determine whether the pallet can be accurately identified (906). As described herein, at a minimum, the computing system 152 can determine whether a label on the pallet was identified. The computing system 152 can also determine whether any identifying information about the pallet that can be used for storing the pallet can be identified.

If the pallet can be accurately identified, then information about the pallet that was identified during profiling can be transmitted to the WMS 154 (908). For example, the computing system 152 can determine that the image data includes a clear capture of the label. Using image processing techniques and analysis, the computing system 152 can therefore detect the label and determine information about the pallet from the label, such as the owner and storage requirements/information. The information transmitted to the WMS 154 can include the image data, the clear capture of the label, and information that is identified from the computing system 152 analyzing the label in the image data. In some implementations, the computing system 152 can merely determine that the image data includes a clear capture of the label but the computing system 152 may not perform image analysis techniques on the clear capture of the label. Instead, the computing system 152 can transmit the clear capture of the label to the WMS 154 and the WMS 154 can perform image analysis techniques on the clear capture to identify information about the pallet.

The WMS 154 can receive the pallet information in 910. The WMS 154 can determine an optimal storage location for the pallet based on the pallet information (912). The pallet information can include owner, item type/name, and the label. The WMS 154 can also determine the optimal organized storage location based on other information. As an example, the computing system 152 can identify the pallet by its owner by analyzing the clear capture of the label. The owner name/identifier can be communicated to the WMS 154. The WMS 154 can look up the owner in a data store that can store information about warehouse customers. The stored information about the owner can indicate where pallets for that owner are stored and/or what storage conditions must be satisfied. Using such information, the WMS 154 can determine what organized storage location the pallet should be routed to.

Referring back to 906, if the pallet cannot be accurately identified, then the computing system 152 can identify the pallet as unidentifiable (914). The computing system 152 can flag the image data associated with the pallet. As described herein, the computing system 152 can flag the pallet as unidentifiable when the computing system 152 cannot identify any label on the pallet and/or the pallet has a label, but the image data does not include a clear capture of the label that can be used for accurate image analysis. When the pallet is flagged, the computing system 152 can also indicate whether the pallet has a label or not. This indication can make it easier and quicker for a warehouse worker to determine what they need to be looking for during their manual inspection of the pallet.

When the pallet cannot be identified by the computing system 152, the computing system 152 can transmit the pallet image data to the WMS 154 in 916. The WMS 154 can receive the pallet image data in 918. The WMS 154 can route the pallet to a temporary storage location in 920. For example, the WMS 154 can be instructed by the computing system 152 to route the pallet to temporary storage. In some implementations, the WMS 154 can determine that since the pallet was flagged as unidentified, the pallet can be automatically routed to the temporary storage location. In some implementations, the computing system 152 can instruct the pallet to be routed to the temporary storage location. Once in temporary storage, the pallet can be put into a queue for review by a warehouse worker.

The WMS 154 can then transmit the pallet image data to the user device 156 (922). The user device 156 can receive the pallet image data in 924. The user device 156 can then output the image data in 926. In 926, the user device 156 can also receive user input identifying the pallet. In some implementations, as described throughout, the warehouse worker can manually inspect and analyze the image data at the user device 156 (e.g., refer to FIG. 8). Furthermore, the warehouse worker can manually inspect the pallet and provide input to the user device 156 about one or more features that the warehouse worker identified on the pallet. If, for example, the label is blurry in the images, the warehouse worker can look at the actual pallet and identify the barcode (e.g., by scanning the label, taking another picture of the label, and/or inputting the label information into the user device 156).

The user device 156 can then transmit user identification of the pallet to the WMS 154 in 928. Using the user identification of the pallet, the WMS 154 can determine a storage location (e.g., organized storage location) for the pallet (928), as described throughout this disclosure. Furthermore, as described throughout, the WMS 154 and/or the computing system 152 can then execute instructions that cause the pallet to be moved to the determined, organized storage location.

Figure 10:
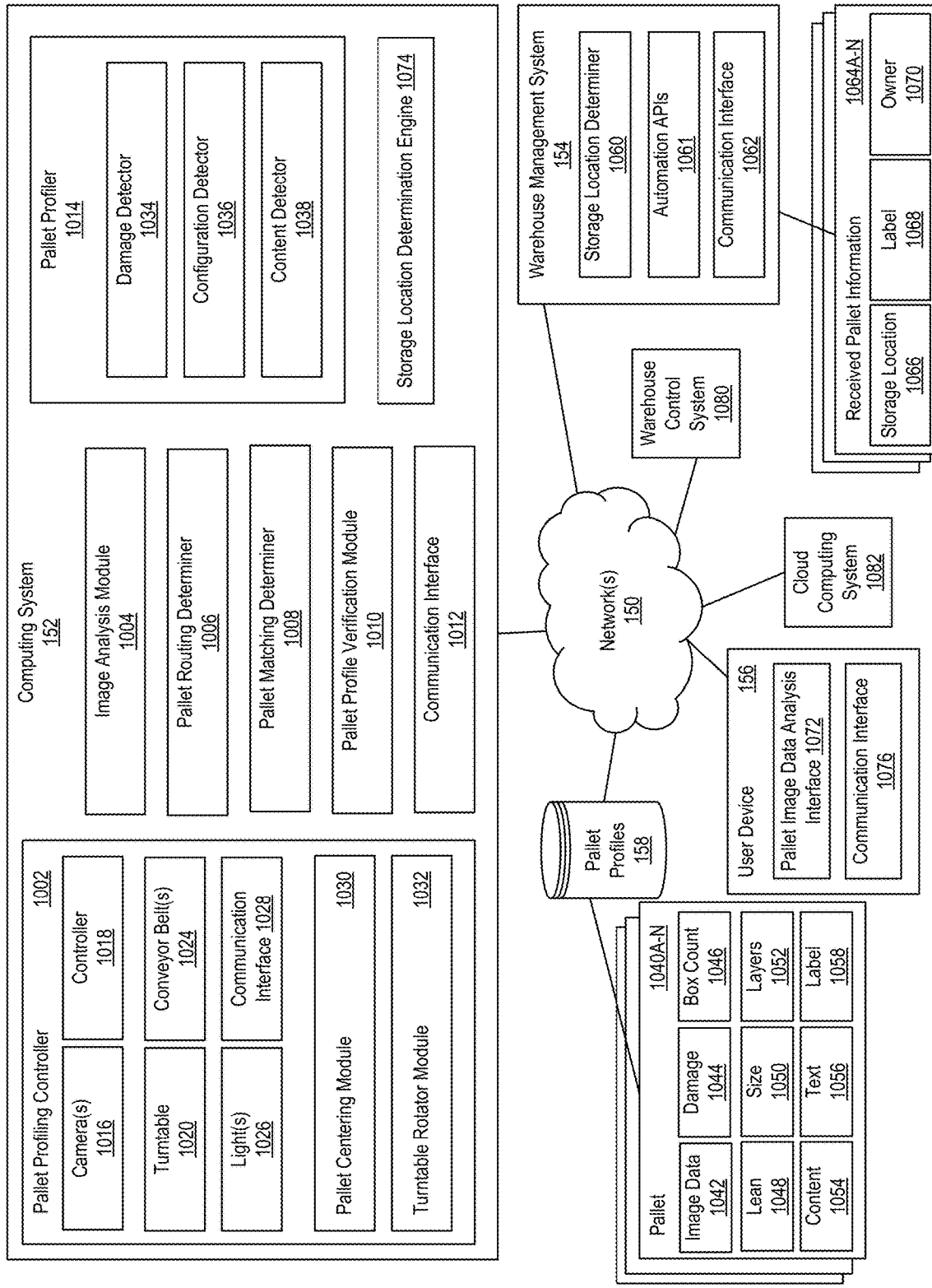
FIG. 10 is a system diagram depicting system components that can be configured to perform any of the techniques described herein.

FIG. 10 is a system diagram depicting system components that can be configured to perform any of the techniques described herein. The system can include the computing system 152, the WMS 154, the user device 156, and the pallet profiles data store 158 in data communication via the network(s) 150. In some implementations, one or more of such system components can be one computer, computing system, server, remote server, node of servers, and/or device. For example, the computing system 152 and the WMS 154 can be part of a same computing system.

The computing system 152 can be configured to profile pallets as they enter the warehouse, as described throughout this disclosure. The computing system 152 can include a pallet profiling controller 1002, image analysis module 1004, pallet routing determiner 1006, pallet matching determiner 1008, pallet profile verification module 1010, communication interface 1012, a pallet profiler 1014, and a storage location determination engine 1074. In some implementations, the computing system 152 can be a combination of one or more other components and/or systems, such as the WMS 154, a warehouse control system (WCS) 1080, and/or a cloud computing system 1082. In some implementations, one or more of the components of the computing system 152 can be part of other systems, such as the WMS 154, the WCS 1080, and/or the cloud computing system 1082. For example, the pallet profiling controller 1002 can be part of the WCS 1080. The WCS 1080 can be configured to control physical components in the warehouse, such as conveyor belts, cameras, and turntable, and to determine what components in the warehouse perform certain functions. As another example, the pallet profiler 1014 can be part of the cloud computing system 1082. The cloud computing system 1082 can be configured to perform processing of image data to determine information about a scanned pallet.

Referring to the computing system 152, the pallet profiling controller 1002 can be configured to control operation of components that are used for routing the pallet and capturing images of the pallet. The controller 1002 can include one or more cameras 1016 (e.g., the cameras 110A-N depicted throughout), a controller 1018, a turntable 1020, one or more conveyor belts 1024 (e.g., the on conveyor belt 102 and the off conveyor belt 106 depicted throughout), one or more lights 1026 (e.g., the lights 112A-N depicted throughout), a communication interface 1028, a pallet centering module 1030, and a turntable rotator module 1032. The communication interface 1028 can provide for the controller 1002 to communicate with one or more of the systems, devices, and components described herein. The pallet profiling controller 1002 can be used to control the camera(s) 1016, turntable 1020, conveyor belts 1024, and lights 1026.

Instructions for controlling these components can be executed by the controller 1018 of the pallet profiling controller 1002. For example, instructions executed by the controller 1018 can cause automatic rotation of the turntable 1020, turning on/off the light(s) 1026, slowing down/speeding up the conveyor belt(s) 1024, and prompting the camera(s) 1016 to capture images of the pallet as it is rotated on the turntable 1020. As an illustrative example, the controller 1002 can selectively turn on or off one or more of the camera(s) 1016. This determination can be based on whether features of the pallet can be clearly identified from one or more images of the pallet. As another illustrative example, the controller 1002 can turn off an overhead light 1026 and/or increase brightness of lights 1026 that illuminate sides of the pallet instead of the top of the pallet. The controller 1002 can also turn on and off red lights, which may or may not be used for every pallet that is profiled (e.g., the red lights can be used for pallets that are wrapped in cellophane or another material that can cause a glare in the camera 1016 lens). As yet another illustrative example, the controller 1002 can control the conveyor belts 1024 to route the pallet to an organized storage location or a temporary storage location.

Still referring to the controller 1002, the pallet centering module 1030 can be configured to center the pallet at a midpoint of the turntable 1020, as described throughout this disclosure. The pallet centering module 1030 can also be configured to instruct alignment device(s) of the on conveyor belt 1024 to align and adjust the pallet while the pallet is on the belt 1024 being automatically moved to the turntable 1020.

The turntable rotator module 1032 can be configured to determine a degree of rotation, a speed of rotation, and/or a direction of rotation of the turntable 1020, as described herein. The module 1032 can determine when to begin rotation of the turntable 1020. For example, the module 1032 can determine that the turntable 1020 can remain stationary until the pallet is detected to be centered and/or otherwise on the turntable 1020. One or more sensors positioned on a surface of the turntable 1020 can sense weight of the pallet to identify when the pallet is on the turntable 1020. In some implementations, the module 1032 can determine that the turntable 1020 can be continuously rotating, regardless of whether the pallet is on the turntable 1020. The module 1032 can send instructions to the controller 1018 to adjust movement/rotation of the turntable 1020.

The module 1032 can also determine a degree of rotation based at least in part on a size of the pallet and any pre-identified information about the pallet. For example, the module 1032 can determine that the turntable 1020 should rotate at a smaller degree of rotation (e.g., slower rotation) such that the cameras 1016 can more accurately capture images of an entire surface area of a large pallet. A larger degree of rotation (e.g., faster rotation) can be used, for example, for a pallet having less surface area.

The module 1032 can modulate the speed of rotation of the turntable 1020 based at least in part on receiving indications from one or more sensors of a weight of the pallet, the size of the pallet, and pre-identified information. For example, a large pallet may require the turntable 1020 to move at a slower speed than a pallet that is half the size of the large pallet because there is more surface area to be captured by the cameras 1016. In some implementations, rotating the pallet at a slower speed can be advantageous to capture more images of the pallet that can be stitched together. When the cameras 1016 are low resolution cameras, the slower speed can be advantageous to ensure that the images are not blurry. When the cameras 1016 are high resolution cameras, the module 1032 can determine a faster speed at which to rotate the turntable 1020. After all, the higher resolution cameras 1016 can capture sharper images despite the speed. The faster speed of rotation can also be advantageous to increase efficiency and reduce time needed in profiling pallets that enter the warehouse.

The image analysis module 1004 can be configured to receive image data that is captured by the cameras 1016. The module 1004 can perform image analysis techniques on such image data to identify information about the pallet. As described herein, during a profiling process, the module 1004 can at least detect a product label or other unique identifier from the image data. The module 1004 can be trained using one or more machine learning models to identify different types of labels from the image data. The module 1004 can also be configured to perform object detection techniques and optical character recognition (OCR) to not only detect the label but also to determine information associated with the label. Using similar techniques, the module 1004 can determine text on the pallet and any other identifying characteristics about the pallet. For example, as described herein, the module 1004 can use machine learning trained models to detect different features of the pallet from the image data. One or more of such models can be used for detecting damage to contents, lean, height, weight, dimensions, contents, damage to the pallet, temperature of contents, text, etc. Information identified by the image analysis module 1004 can be transmitted to the pallet profiles data store 158 and stored in a profile associated with the pallet, as described further below.

The pallet routing determiner 1006 can determine where the pallet can be moved after images are captured. The determiner 1006 can receive identified information from the image analysis module 1004. Using that information, the determiner 1006 can determine whether the pallet should be moved to an organized storage location or temporary storage. If the pallet should be moved to organized storage, the determiner 1006 can determine a particular location in organized storage based on the information from the image analysis module 1004. The determiner 1006 can also access pre-identified information about the pallet from the pallet profiles data store 158 to determine where to store the pallet in organized storage. Once the determiner 1006 identifies where to store the pallet, the determiner 1006 can generate instructions for routing the pallet. The instructions can then be transmitted to the pallet profiling controller 1002 and executed by the controller 1018.

The pallet matching determiner 1008 can be configured to match information identified by the image analysis module 1004 with pre-identified information associated with the pallet. For example, the determiner 1008 can receive information from a vendor indicating characteristics about the pallet before the pallet arrived at the warehouse. The determiner 1008 can associate this information with the pallet's profile in the pallet profiles data store 158. The determiner 1008 can also associate this information with the information determined by the image analysis module 1004.

In some implementations, the determiner 1008 can use information identified by the module 1004 to identify a profile for the pallet that is already stored in the pallet profiles data store 158. Once the profile is identified, the determiner 1008 can update any of the information in the profile with the information identified by the image analysis module 1004.

In some implementations, the determiner 1008 can identify that no profile currently exists for the pallet or that a profile cannot be matched to the pallet. In such situations, the determiner 1008 can generate a profile for the pallet and store the identified information therein (e.g., refer to the placeholder label described throughout this disclosure, FIGS. 5-8).

The pallet profile verification module 1010 can be configured to determine an accuracy of the information identified by the image analysis module 1004. The pallet profile verification module 1010 can receive pre-identified pallet information (e.g., received from an owner, vendor, or other relevant stakeholder in the supply chain), information identified by warehouse workers during manual inspection of the pallet, and the information identified by the image analysis module 1004. Using such information, the module 1010 can determine whether accurate/up-to-date information is stored in the profile associated with the pallet. The module 1010 can compare the information and determine and assign accuracy confidence values to the information. If the pallet profile contains information whose accuracy confidence value is below a predetermined threshold value (e.g., vendor information indicated no damage but the image analysis module 1004 identified damage), the module 1010 can flag the pallet to be reviewed by a warehouse worker.

The communication interface 1012 can be configured to provide for communication of the computing system 152 with other systems, devices, and components via the network(s) 150.

Still referring to the computing system 152, the pallet profiler 1014 can be configured to determine one or more characteristics about the pallet that can impact storage of the pallet. The pallet profiler 1014 can make such determinations using the image data that is captured by the cameras 1016. Moreover, the pallet profiler 1014 can make such determinations using machine learning trained models as described throughout this disclosure. The profiler 1014 can include a damage detector 1034, a configuration detector 1036, and a content detector 1038.

The damage detector 1034 can be configured to identify any indications of damage from the image data using the techniques, methods, and processes described throughout this disclosure. The detector 1034 can also be configured to identify any gaps and/or voids where boxes, containers, or other items are expected to be on the pallet. Such gaps/voids can indicate missing and/or damaged items. Damage can occur to the pallet or its contents while in transit to the warehouse. Damage can occur to the pallet itself (e.g., a broken deck board, warped wooden frame, etc.). Damage can also occur to one or more items stacked on the pallet. The detector 1034 can be trained to identify features in the image data indicative of different types of damage. Such detection techniques can be advantageous to reduce human error since it can be challenging and/or time consuming for a human to accurately identify all types of damage that can occur to the pallet and/or its contents.

The configuration detector 1036 can be configured to determine configuration information about the pallet from the image data and/or the information determined by the image analysis module 1004. The detector 1036 can determine a size of the pallet (e.g., length, height, and width) using the techniques described herein. The detector 1036 can also be trained to determine a lean of the pallet, a number of layers or rows of items on the pallet, and a quantity of items on the pallet. The detector 1036 can apply machine learning trained models to make each of these determinations.

The content detector 1038 can be configured to determine content information about the pallet from the image data and/or the information determined by the image analysis module 1004. In some implementations, the detector 1038 can determine how many boxes or items are on the pallet (e.g., box count). The detector 1038 can make such a determination based at least in part on information identified by the damage detector 1034 and/or the configuration detector 1036. In some implementations, the content generator 1038 can determine what items/objects are stored on the pallet. The generator 1038 can also use the identified information from the module 1004 and pre-identified information about the pallet to confirm, verify, or otherwise determine what items are on the pallet and/or what items should be on the pallet. In some implementations, the content generator 1038 can also identify and translate text, barcodes, QR codes, and/or other unique identifiers that are associated with the pallet and/or individual items on the pallet.

The storage location determination engine 1074 can be configured to determine where to store the pallet in the warehouse. The engine 1074 can automatically make such a determination, using the techniques described herein. The determined storage location can then be transmitted to the WMS 154. In some implementations, the computing system 152 may not have the storage location determination engine 1074. Instead, the storage location can be determined by the WMS 154, as described below.

Pallet information that is determined and/or identified by the computing system 152 can then be stored in the pallet profiles data store 158. The data store 158 can include data records for each of the pallets 1040A-N that enter the warehouse.

An example pallet profile 1040A-N can include image data 1042, damage 1044, box count 1046, lean 1048, size 1050, layers 1052, content 1054, text 1056, and label 1058. Each of the information 1042-1058 can be determined by one or more components of the computing system 152. One or more of the information 1042-1058 can also be determined by a warehouse worker at the user device 156, the WMS 154, and/or any other relevant stakeholders in the supply chain (e.g., vendor, owner, customer, etc.).

In some implementations, the computing system 152 can store less than all of the images that were captured by the cameras 1016 in the pallet profile 1040A-N. For example, an image that clearly captures a label of the pallet can be stored in the image data 1042. Other images for that pallet can be discarded. Sometimes, images of the pallet can be captured by one or more stakeholders in the supply chain. Such images can be stored in the image data 1042. The image analysis module 1004 of the computing system 152 can then access such images and perform image analysis techniques to identify information about the pallet. When the label of the pallet may not be clearly identified from the image data 1042, all the captured images can be stored in the image data 1042 so that the warehouse worker can analyze the images to identify information about the pallet. If the worker can accurately identify information about the pallet from the images, one or more of the images can be saved in the image data 1042 and other images (e.g., blurry images) can be discarded. In some implementations, if the worker cannot identify information from the images but can identify information via a manual inspection of the pallet, all of the images can be discarded from the image data 1042.

The WMS 154 can include a storage location determiner 1060 and a communication interface 1062. The WMS 154 can be configured to manage information about and operation of the warehouse and the warehouse's components. In some implementations, the WMS 154 can be part of the computing system 152, the WCS 1080, and/or the cloud computing system 1082, as mentioned above. In some implementations, the WMS 154 can include the WCS 1080, the cloud computing system 1082, and/or automation application programming interfaces (APIs) 1061. The communication interface 1062 can be configured to provide for communication between the components described herein.

The storage location determiner 1060 can be configured to identify a storage location for the pallet. As described throughout this disclosure, the determiner 1060 can identify whether the pallet can be stored in temporary storage or an organized storage location. The determiner 1060 can also identify which storage location in organized storage location to store the pallet. In some implementations, the determiner 1060 can also generate instructions for routing the pallet to the identified storage location. The determiner 1060 can communicate the identified storage location and/or the instructions to the pallet profiling controller 1002 for execution by the controller 1018.

The determiner 1060 can receive pallet information 1064A-N, which can be used to determine the optimal storage location for the pallet. The received pallet information 1064A-N can include a storage location 1066, label 1068, and owner 1070.

The pallet profile 1040A-N can sometimes indicate where pallets of a particular type and/or owner should be stored (e.g., the storage location 1066). The determiner 1060 can use this information to designate or assign the pallet a particular organized storage location in the warehouse. The determiner 1060 can also update the storage location 1066 to the organized storage location that is selected for the pallet. Moreover, the label 1068 and/or the owner 1070 can include requirements or other specifications for storing the particular pallet. This information can also be used to select a particular organized storage location in the warehouse for the pallet.

The user device 156 can be used by a warehouse worker to review identified information about the pallet and/or to identify information about the pallet. The user device 156 can be a computing system, a computing device, a computer, laptop, tablet, smartphone, mobile phone, or other similar mobile device. Using the user device 156, the user can view information about the pallet that was identified by the computing system 152. Using the user device 156, the warehouse worker can, for example, verify information that was identified by the computing system 152. The warehouse worker can also match information identified by the computing system 152 with information stored in the pallet profile 1040A-N. The warehouse worker can identify information that was not identified by the computing system 152 (e.g., the computing system 152 missed or otherwise did not try to identify damage or box count) and/or information that could not be identified by the computing system 152 (e.g., the computing system 152 attempted but failed to identify the label of the pallet because the image data was blurry).

The user device 156 can include a pallet image data analysis interface 1072 and a communication interface 1076. The communication interface 1076 can provide for communication between any of the components described herein.

The pallet image data analysis interface 1072 can be configured to present the image data captured by the cameras 1016. The interface 1072 can also present information about the pallet that was identified by the computing system 152 and/or any information that is known about the pallet (e.g., information that is stored in pallet profiles data store 158 and/or determined by the WMS 154, the WCS 1080, and/or the cloud computing system 1082). The warehouse worker can review the image data and try to identify information about the pallet from such data. For example, the warehouse worker can provide input to the interface 1072 that includes visual observations that the warehouse worker made when manually investigating the pallet and/or from viewing the image data presented in the interface 1072.

In some implementations, the interface 1072 can include tags or flags on the image data to assist the warehouse worker in more efficiently inspecting the pallet (e.g., via manual inspection of the pallet). For example, the interface 1072 can present a flag on a blurry image of a side of the pallet where the label is located. The warehouse worker can then more quickly determine which side of the pallet to manually inspect based on the flagged image.

Figure 11A:
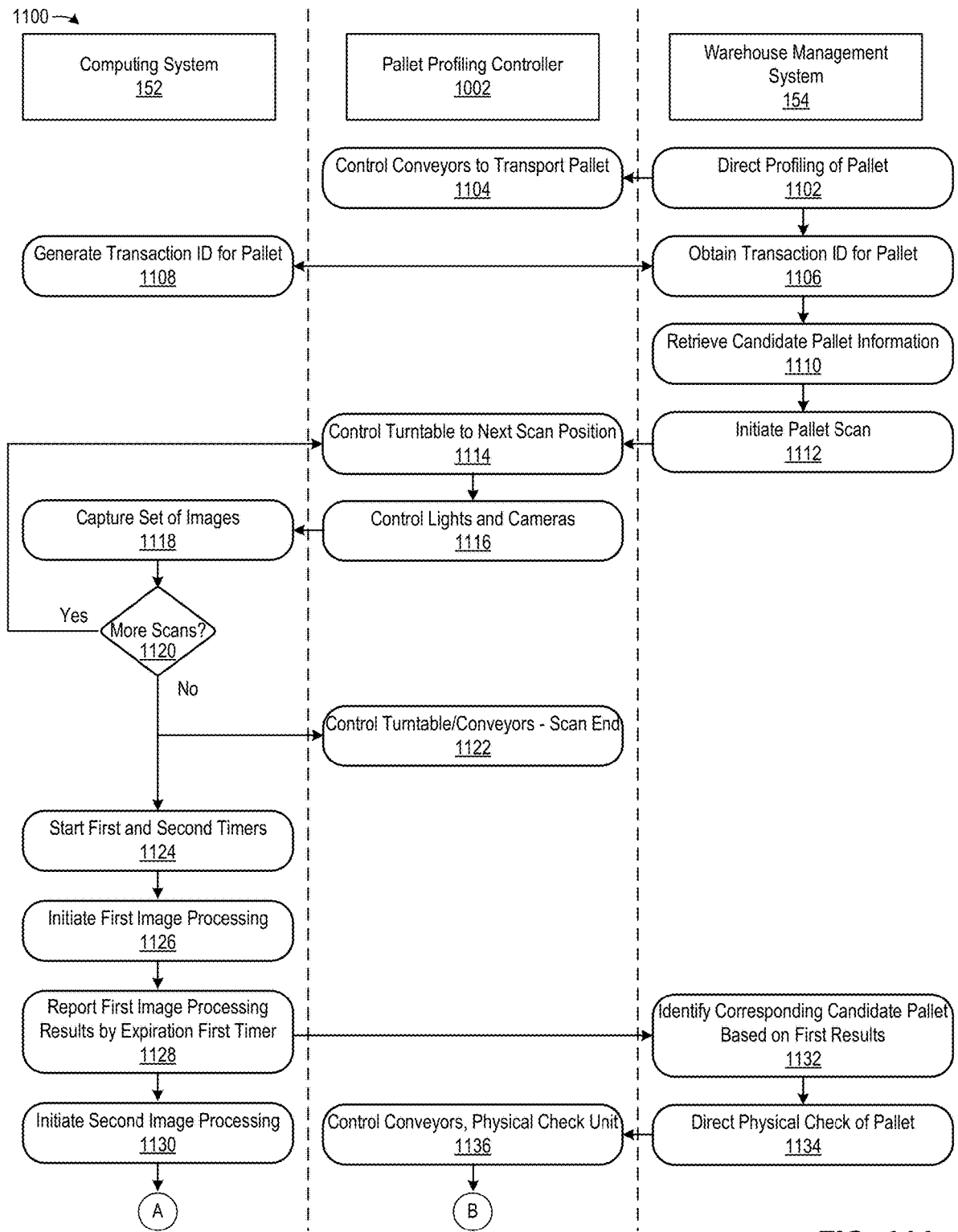
FIGS. 11A and 11B are swimlane diagrams of an example process for profiling a pallet.
Figure 11B:
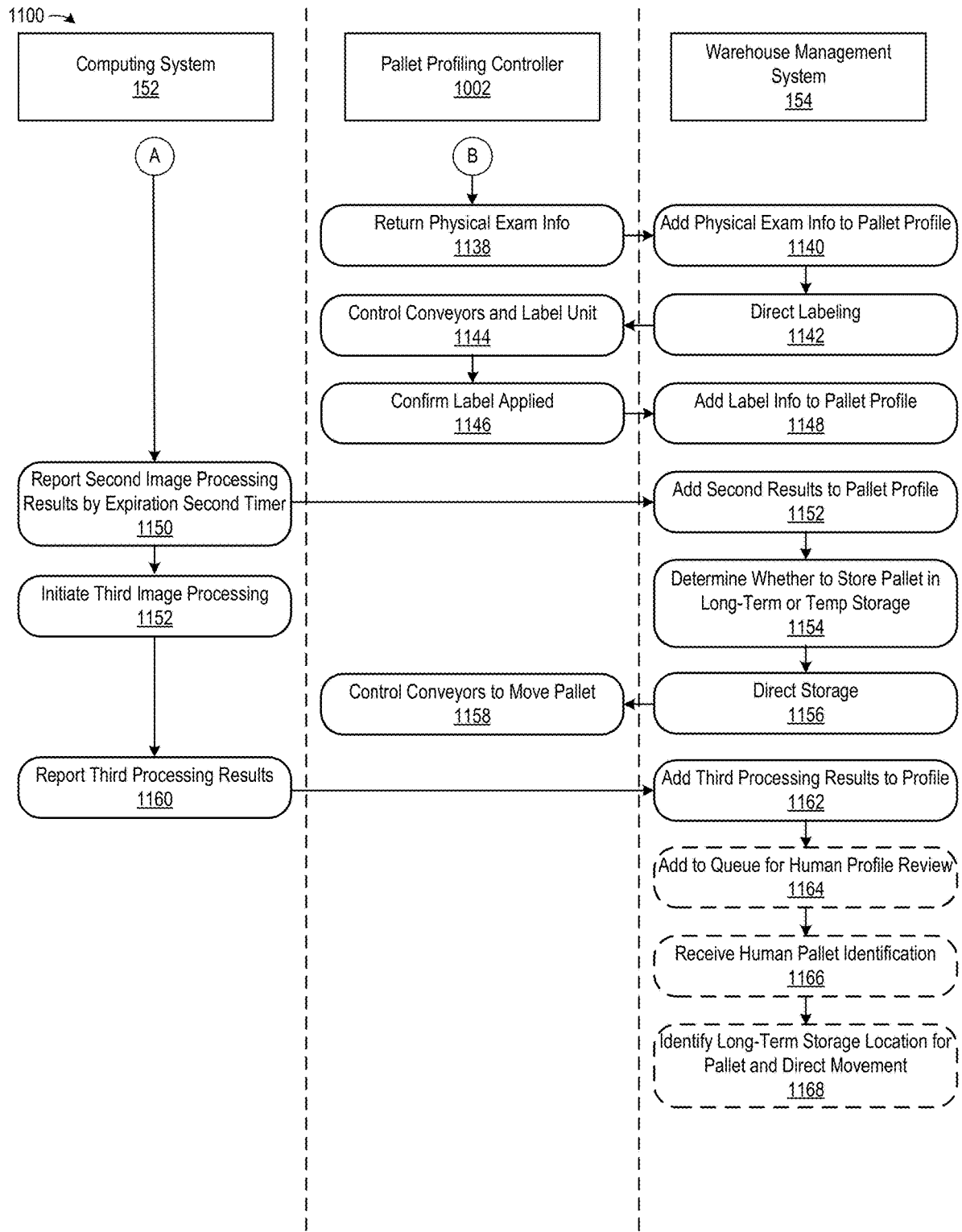

FIGS. 11A-B are swimlane diagrams of an example process 1100 for profiling a pallet. The process 1100 is described in reference to the systems described throughout this document, such as the system 100 described above with regard to FIG. 1 and the system 1000 described above with regard to FIG. 10. One or more blocks of the process 1100 can be performed by the computing system 152, the WMS 154, and pallet profiling controller(s) 1002. One or more blocks of the process 1100 can be performed by other computing systems, servers, and/or computing devices, such as those described throughout this document.

Referring to FIG. 11A, the WMS 154 directs the profiling of a pallet (1102), such as a pallet that is received at warehouse and that has not yet bene profiled. To do this, the WMS 154 can direct the pallet profiling controllers 1002 to control conveyors to transport the pallet to the pallet profiler (1104), which can include centering pallet on the conveyors, moving the pallet onto the turntable, and centering the pallet on the turntable in preparation for performing a scan. The WMS 154 can obtain a transaction ID for the pallet (1106) that is generated by the computing system 152 (1108), which the computing system 152 can use to temporarily identify the pallet and information determined for the pallet that the WMS 154 can use to ultimately identify and profile the pallet. The WMS 154 can retrieve candidate pallet information (1110), such as a manifest of pallets from an inbound truck that has been unloaded at a warehouse. The information provided on a manifest for a pallet can vary significantly across different providers and carriers, ranging from simply listing the number of pallets provided at for individual skus to more detailed information with unique identifiers associated with each pallet, identification of the specific items contained on the pallet (e.g., list of the number of cases of each sku included in pallet), date information for the contents of the pallet (e.g., date for each case, date for lot of cases included in pallet), and/or other details. The pallet profiling can attempt to pair individual pallets with preexisting information for the pallets (e.g., manifest information), to supplement or further flesh out the preexisting information (e.g., fill in unknown details, such as expiration information for cases included in pallet), and to correct any inaccurate or otherwise incorrect information included in the preexisting pallet information.

The WMS 145 can initiate a pallet scan for the pallet (1112), which can include directing the pallet profiling controller 1002 to initiate the scan. The pallet profiling controller 1002 can control the turntable to position and orient the pallet for the first scan (1114). As discussed throughout this document, that can include centering the pallet on the turntable 104 and positioning it so that a first side face of the pallet is perpendicular to the orientation of the cameras 110A-D attached the vertical pole 108. Other initial orientations are also possible, such as having the first side face at some degree of rotation askew from perpendicular, such as 15°, 20°, 30°, 45°, 60°, 85°, and/or other degrees of rotation. With the pallet positioned, the controller 1002 can control operation of the lights and cameras (1116), such as sending coordinated and synchronous control instructions to both the lights and the cameras to initiate capturing of a first set of images. The first set of images can include, for example, multiple images of the front side of the pallet captured by the cameras 110A-D and one or more images of the top surface of the pallet captured by the overhead camera(s) 110N. The images can be captured by the cameras and received by the computing system 152 (1118), which can then determine whether more scans are needed (1120). The determination about more scans can be a static determination, which can involve progressing through a static number of pallet positions and image set captures (e.g., one set of images for each of the four sides of the pallet and one set of images for the top of the pallet). With static determinations, the determination can involve simply determining whether each of the predetermined pallet positions have been imaged (e.g., one set of images for each side, one set of images of pallet at intervals of every 45 degrees of rotation) and, if not all positions have been imaged, the next position in the progression can be directed to the controller 1002, which can then cause steps 1114-1120 to be repeated.

In some instances, the determination (1120) about more scans can be dynamic, which can involve, for example, performing an initial and quick assessment of the most recently captured images to determine whether they are usable for image analysis. In the event that the images are not of at least a threshold quality along one or more image quality metrics, the computing system 152 can direct one or more modifications for reimaging that portion of the pallet, such as adjusting the lighting configurations (e.g., strobe duration, light intensity, light wavelength, position and/or angles of lights), camera settings (e.g., adjusting aperture, shutter speed, focal length, camera position), and/or pallet positions (e.g., rotating forward or backward by small increment, such as 5°, 10°, 15°, and/or other amounts). Such modifications can be transmitted to the controller 1002, which can prompt the performance of steps 1114-1120 with the modified settings. Further modifications can be performed up until a threshold number (e.g., 2, 3, 4, or more), after which the best set of images for a portion of the pallet may be selected and the process 1100 can proceed to imaging other portions of the pallet.

Once all images of the pallet have been captured (no more scans to be performed at step 1120), the controller 1002 can be informed that the scans are complete, which can prompt the controller 1002 to control the turntable and conveyors to further move the pallet (1122), such as transitioning the pallet from the turntable 104 to the conveyor 106 and moving the pallet out of the photo booth 126. Once the scans are complete, the computing system 152 can also initialize first and second timers for performing particular image processing operations on the captured images that can impact the physical movement, processing, and labeling of pallet. Instead of simply performing these operations until their completion, timers can be set to require performance within a threshold amount of time to ensure that the physical handling the of pallet is not delayed by the image processing operations (i.e., physical progression of pallet is halted while waiting for image processing to be completed), which can increase the throughput of pallets through the profiler and system. The first image processing operation can be initiated by the computing system 152 (1126), which can correspond to the first timer. The first image processing operation can be a first pass through the captured images of the pallet to quickly determine whether a pallet identifier for the pallet can be detected (e.g. barcode, QR code, alphanumeric code) from the images. Such a pallet identifier can be used to identify corresponding pallet information from the preexisting pallet information. If a pallet identifier is detected (and/or a pallet identifier detected with at least a threshold level of confidence) before expiration of the first timer, the first image processing operation can end and the results (e.g., pallet identifier) can be reported to the WMS 154 (1128). If the first timer expires before completion of the first image processing operation, then results indicating that no pallet identifier was detected and/or one or more candidate pallet identifiers with a threshold level of confidence can be returned. The first timer can be a static value (e.g., 0.5 seconds, 1 second, 5 seconds, 10 seconds, 20 seconds, and/or others) and/or a dynamic value (e.g., time from scan being completed until pallet passes/reaches one or more physical target locations, such as fully exiting the photo booth). After completing the first image processing operation, the computing system 152 can initiate the second image processing operation (1130).

The WMS 154 can use the results to identify a corresponding candidate pallet from the preexisting candidate pallets (1132). The identifier for the candidate pallet can be used as, correlated with, and/or used to generate a unique warehouse identifier for the pallet within the warehouse, which the WMS 154 can use to track, manage, and/or process warehousing operations with regard to the pallet. The unique warehouse identifier can be associated with a variety of details about the pallet, such as the contents of the pallet (e.g., product skus, number of cases of each sku, dates for each of the cases, size of the pallet, weight of the pallet), which can be used to select long-term storage locations for the pallet and for selecting particular pallets to fulfill orders. If no identifier is identified and/or a candidate pallet is not identified, a new unique warehouse identifier can be generated for the pallet.

The WMS 154 can direct a physical check of the pallet (1134), which can be performed by, for example, one or more apparatus that are configured to perform safety checks on the pallet (e.g., determine size, detect lean of pallet). Examples are described above with regard to 512 and 536. The controller 1002 can receive instructions from the WMS 154, and can control movement of the pallet via conveyors and/or other pallet movement components to the physical check unit (1136).

Referring to FIG. 11B, the controller returns the physical examination information (e.g., height, width, safety information) (1138) to the WMS 154, which adds the physical exam information to a profile for the pallet (1140). The WMS 154 direct labelling of the pallet (1142), and the controller 1002 can control the conveyors to move the pallet to the automatic labeler (1144), which can apply a label using the unique warehouse identifier for the pallet. The controller 1002 can verify that the label applied to the pallet is readable and located in one or more specific locations on the pallet (1146), and can return confirmation to the WMS 154 which can add the label information and confirmation to the profile for the pallet (1148).

At either expiration of the second timer or completion of the second image processing operation, whichever occurs first, the computing system 152 can return the results of the second image processing operation (1150) to the WMS 154, which can add those results to the pallet profile (1152). The second image processing operation can include, for example, identifying details on the contents and cases included on the pallet, such as text, markings, codes, and/or other labeling on the cases. The second image processing operations can aim to identify, specifically, what is included in the pallet, such as the specific skus that are contained in the pallet, the number of cases of each sku, date information associated with each case, and/or other salient information to better understand and track the contents of good contained in the warehouse. The second image processing operation can process all images captured of the pallet for a second time, but with using differing image processing techniques, such as using OCR and/or machine learning models, and/or other text/object detection algorithms. The second timer can be a static value (e.g., 0.5 seconds, 1 second, 5 seconds, 10 seconds, 20 seconds, and/or others) that is either started at the same time as the first timer or after completion of the first operation/timer. The second timer can, alternatively, be a dynamic value (e.g., time until pallet completes labeling confirmation).

The WMS 154 can analyze the accumulated pallet information and determine, for any contradictory or inconsistent information (e.g., conflict between preexisting pallet information from manifest and detected pallet information), which information to keep and use for the pallet. In some instances, the detected information can be selected over preexisting information. In other instances, a conflict can result in the pallet being flagged for human review and placed into temporary storage. The WMS 154 can use the pallet information to determine whether to route the pallet into long-term storage and/or temporary storage (1154). If the accumulated pallet information does not include sufficient details and/or confidence associated therewith to determine the contents of the pallet, it can be flagged for temporary storage. The WMS 154 can direct the storage determination (1156), which the controller 1002 can use to control the conveyors to route the pallet along a path to either long term storage or temporary storage (1158).

After completing the second image process operation, the computing system 152 can initiate a third image processing operation (1152), which can perform additional processing of the images to determine and/or detect other details about the pallet that were either cut off via the timers for the first and second image processing operations, and/or performing additional/alternate image processing (i.e., processing of images using one or more machine learning models to more accurately and/or consistently detect pallet contents, performing image manipulation/modification operations to improve image quality that can then be used to reprocess the first and/or second image processing operations). The third image processing operation may not be time limited, and may be permitted to process until it reaches its conclusions. The third image processing results can be returned (1160) and added to the profile for the pallet (1162). In instances where the pallet is routed to temporary storage, the pallet can be added to queue for the accumulated pallet profile, including the captured images, to undergo a human review (1164), which can result in human identification and/or correction of the pallet information (1166) and can permit for a long-term storage location to be determined and used for storing the pallet (1168).

Figure 12:
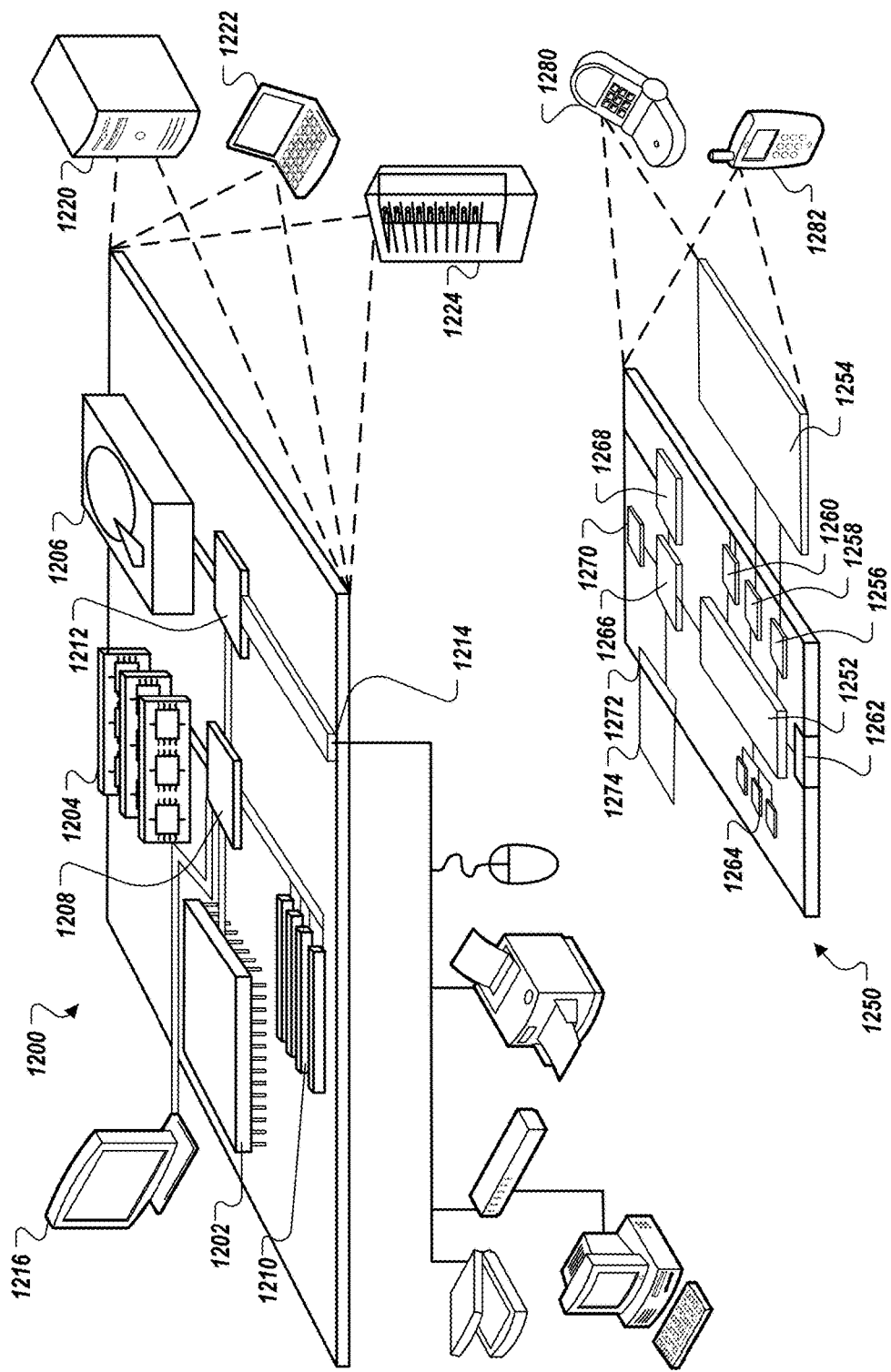
FIG. 12 is a block diagram of computing devices that may be used to implement the systems and methods described herein.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a computer-readable medium. In one implementation, the memory 1204 is a volatile memory unit or units. In another implementation, the memory 1204 is a non-volatile memory unit or units.

The storage device 1206 is capable of providing mass storage for the computing device 1200. In one implementation, the storage device 1206 is a computer-readable medium. In various different implementations, the storage device 1206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of duties is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can process instructions for execution within the computing device 850, including instructions stored in the memory 1264. The processor may also include separate analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD display or an OLED display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication (e.g., via a docking procedure) or for wireless communication (e.g., via Bluetooth or other such technologies).

The memory 1264 stores information within the computing device 1250. In one implementation, the memory 1264 is a computer-readable medium. In one implementation, the memory 1264 is a volatile memory unit or units. In another implementation, the memory 1264 is a non-volatile memory unit or units. Expansion memory 1274 may also be provided and connected to device 1250 through expansion interface 1272, which may include, for example, a SIMM card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS receiver module 1270 may provide additional wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for profiling a pallet, the system comprising:
a turntable configured to rotate a pallet;
a light source positioned adjacent the turntable that is configured to illuminate the pallet as the pallet rotates on the turntable;
a camera positioned relative to the light source that is configured to capture images of the pallet as the pallet rotates on the turntable; and
a photo booth that encloses an area that includes the turntable, the light source, and the camera, wherein the photo booth includes sides and a top to reduce an amount of ambient light that enters the enclosed area,
wherein the camera is configured to transmit the images of the pallet to a computing system that detects damage associated with the pallet based on processing the images of the pallet.

2. The system of claim 1, wherein the system further comprises a vertical profiling structure in a stationary position proximate to a side of the turntable inside the photo booth, wherein the vertical profiling structure comprises the light source and the camera.

3. The system of claim 1, wherein the system comprises a plurality of cameras positioned at a plurality of different locations proximate the turntable, wherein the plurality of cameras comprise the camera and are configured to capture the images of the pallet from a plurality of different views based on the plurality of cameras being positioned at the plurality of different locations.

4. The system of claim 1, wherein the system further comprises a computing system configured to profile the pallet, the computing system performing operations comprising:
receiving, from the camera, image data for the captured images of the pallet; and
applying a machine learning model to the image data to detect the damage associated with the pallet, wherein the model was trained, using test images of pallets with damage and test images of pallets without damage, to determine probabilities that features in the test images are indicative of the damage to the pallets.

5. The system of claim 4, wherein the damage comprises at least one of a broken deck board of the pallet, a warped frame of the pallet, and damage to one or more items on the pallet.

6. The system of claim 4, wherein the computing system is further configured to perform operations comprising: applying the machine learning model to the image data to identify a lean of the pallet, wherein the model was trained, using test images of pallets with different amounts of lean, to determine probabilities that features in the test images are indicative of the different amounts of lean.

7. The system of claim 1, wherein the light source is a red light.

8. The system of claim 1, wherein the light source comprises a polarizing filter that causes the camera to capture light having wavelengths between 620-650 nanometers (nm).

9. The system of claim 1, wherein the light source is configured to emit red light having a wavelength between 610 nm-750 nm, orange light having a wavelength between 595 nm-610 nm, and yellow light having a wavelength between 580 nm-595 nm.

10. The system of claim 1, wherein the light source is configured to emit infrared light having a wavelength greater than 750 nm.

11. The system of claim 1, wherein the light source is configured to emit ultraviolet light having a wavelength between 100 nm-400 nm.

12. A system for profiling a pallet, the system comprising:
conveyors for automatically moving the pallet for imaging and throughout a facility;
a light source positioned adjacent to the conveyors that is configured to illuminate the pallet as the pallet is automatically rotated or moved by the conveyors;
a camera positioned relative to the light source that is configured to capture images of the pallet as the pallet is automatically rotated or moved by the conveyors; and
a photo booth that encloses an area that includes a portion of the conveyors, the light source, and the camera, wherein the photo booth includes sides and a top to reduce an amount of ambient light that enters the enclosed area,
wherein the camera is configured to transmit the images of the pallet to a computing system that detects damage associated with the pallet based on processing the images of the pallet using a machine learning model that was trained to identify characteristics in the images of the pallet that are indicative of damage to the pallet.

13. The system of claim 12, wherein the system further comprises a computing system configured to perform operations comprising:
receiving, from the camera, image data for the captured images of the pallet; and
applying the machine learning model to the image data to detect the damage associated with the pallet, wherein the model was trained, using test images of pallets with damage and test images of pallets without damage, to determine probabilities that features in the test images are indicative of the damage to the pallets.

14. The system of claim 12, wherein the light source is configured to emit red light having a wavelength between 610 nm-750 nm, orange light having a wavelength between 595 nm-610 nm, and yellow light having a wavelength between 580 nm-595 nm.

15. A system for profiling a pallet, the system comprising:
a light-controlled environment that encloses an area, wherein the light-controlled environment comprises:
a conveyor that is configured to automatically move the pallet in the light-controlled environment to view the pallet for imaging from a plurality of different angles;
a light source positioned adjacent to the conveyor that is configured to illuminate the pallet as the pallet is moved by the conveyor;
a camera positioned relative to the light source that is configured to capture images of the pallet as the pallet is moved by the conveyor, wherein the camera is configured to transmit the images of the pallet to a computing system that detects damage associated with the pallet based on processing the images of the pallet; and a computing system configured to perform operations comprising:

receiving, from the camera, image data for the captured images of the pallet; and applying a machine learning model to image data to detect the damage associated with the pallet, wherein the model was trained, using test images of pallets with damage and test images of pallets without damage, to determine probabilities that features in the test images are indicative of the damage to the pallets.

16. The system of claim 15, wherein the light-controlled environment comprises a photo booth.

17. The system of claim 15, wherein the camera is offset from and adjacent to the light source.

18. The system of claim 15, wherein the light-controlled environment comprises a room in a facility.

19. The system of claim 15, wherein the light source is configured to emit red light having a wavelength between 610 nm-750 nm, orange light having a wavelength between 595 nm-610 nm, and yellow light having a wavelength between 580 nm-595 nm.

20. The system of claim 15, wherein the damage comprises at least one of a broken deck board of the pallet, a warped frame of the pallet, and damage to one or more items on the pallet.

* * * * *